(12) United States Patent  
Moldaschel et al.

(10) Patent No.: US 12,479,371 B2
(45) Date of Patent: *Nov. 25, 2025

(54) ACCESSORY ATTACHMENT SYSTEM

(71) Applicant: Arctic Cat, Inc., Thief River Falls, MN (US)

(72) Inventors: Marcus Moldaschel, Thief River Falls, MN (US); David Vigen, Thief River Falls, MN (US); Dayne Efta, Newfolden, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,332

(22) Filed: Mar. 29, 2024

(65) Prior Publication Data

US 2024/0239273 A1 Jul. 18, 2024

Related U.S. Application Data

(63) Continuation of application No. 18/085,968, filed on Dec. 21, 2022, now Pat. No. 11,970,141.

(Continued)

(51) Int. Cl.
*B60R 9/06* (2006.01)
*B62M 27/02* (2006.01)

(52) U.S. Cl.
CPC .............. *B60R 9/06* (2013.01); *B62M 27/02* (2013.01); *B62M 2027/028* (2013.01)

(58) Field of Classification Search
CPC ... B60R 9/06; B62M 27/02; B62M 2027/028; B62J 7/08; B62J 9/27
See application file for complete search history.

(56) References Cited

U.S. PATENT DOCUMENTS 3,762,736 A 10/1973 Johnson et al.
3,781,038 A 12/1973 Bachel et al.
(Continued)

FOREIGN PATENT DOCUMENTS

CA 2456088 C 3/2005
CA 2411964 C 7/2005
(Continued)

*Primary Examiner* — Lynn E Schwenning
(74) *Attorney, Agent, or Firm* — Billion & Armitage

(57) ABSTRACT

An attachment system includes a connector that is removably securable to a vehicle body or a mounting bracket that is securable to a vehicle body. The connector includes a housing and a connecting pin extending from a surface of the housing. The connecting pin is receivable in the mounting bracket or the vehicle body in a first position, and the connecting pin is moveable to a second position such that a portion of the mounting bracket or vehicle body is located intermediate a portion of the connecting pin and the housing. The connector further includes a locking pin moveable from a locking position to a release position. The locking pin is engaged with the mounting bracket or the vehicle body in the locking position, thereby inhibiting movement of the connecting pin from the second position. The locking pin is disengaged from the mounting bracket or the vehicle body when in the release position, thereby allowing removal of the connecting pin from the vehicle body or the mounting bracket.

19 Claims, 50 Drawing Sheets

Related U.S. Application Data

(60) Provisional application No. 63/310,264, filed on Feb. 15, 2022.

(56) References Cited

U.S. PATENT DOCUMENTS

| | | | |
|---|---|---|---|
| 5,599,002 | A | 2/1997 | Knutson |
| 5,853,187 | A | 12/1998 | Maier |
| 5,924,514 | A | 7/1999 | Bullerdick |
| 6,266,250 | B1 | 7/2001 | Foye |
| 6,749,036 | B1 | 6/2004 | Schrapp et al. |
| 6,796,607 | B2 | 9/2004 | Bertrand et al. |
| 6,880,658 | B2 | 4/2005 | Fournier et al. |
| 6,920,952 | B2 | 7/2005 | Bertrand et al. |
| 7,011,173 | B2 | 3/2006 | Cadotte et al. |
| 7,040,645 | B1 | 5/2006 | Borneman et al. |
| 7,556,114 | B2 | 7/2009 | Hanagan |
| 7,802,644 | B2 | 9/2010 | Brodeur et al. |
| 9,539,929 | B2 | 1/2017 | Vanvalkenburgh |
| 9,611,005 | B2 | 4/2017 | Tomassen |
| 9,751,592 | B2 | 9/2017 | Labbe et al. |
| 10,391,949 | B2 | 8/2019 | Labbe et al. |
| 10,744,953 | B2 | 8/2020 | Labbe et al. |
| 10,850,787 | B2 | 12/2020 | Ayala et al. |
| 10,850,806 | B2 | 12/2020 | Labbe et al. |
| 11,267,407 | B2 * | 3/2022 | Hedlund ............... B60R 9/065 |
| 11,358,661 | B2 | 6/2022 | Laugen et al. |
| 11,472,347 | B2 | 10/2022 | Labbe et al. |
| 11,970,141 | B2 * | 4/2024 | Moldaschel ............ B62J 9/27 |
| 2004/0021295 | A1 | 2/2004 | Westerdale |
| 2017/0174145 | A1 * | 6/2017 | Labbe ................... B65D 43/16 |
| 2020/0231239 | A1 | 7/2020 | Visenzi |
| 2020/0339040 | A1 | 10/2020 | Labbe et al. |
| 2021/0039749 | A1 | 2/2021 | Labbe et al. |
| 2021/0188182 | A1 | 6/2021 | Edwards et al. |
| 2021/0188185 | A1 | 6/2021 | Hedlund et al. |
| 2021/0188376 | A1 | 6/2021 | Laugen et al. |
| 2021/0188382 | A1 | 6/2021 | Hedlund |
| 2022/0144182 | A1 | 5/2022 | Hedlund et al. |
| 2022/0234670 | A1 | 7/2022 | Cyr et al. |
| 2022/0234685 | A1 | 7/2022 | Labbe et al. |
| 2022/0274534 | A1 | 9/2022 | Labbe et al. |
| 2022/0340233 | A1 | 10/2022 | Edwards et al. |

FOREIGN PATENT DOCUMENTS

| | | |
|---|---|---|
| CA | 2371477 C | 7/2006 |
| CA | 2363856 C | 1/2008 |
| CA | 2639857 A1 | 6/2009 |
| CA | 2877554 A1 | 1/2014 |
| CA | 2987534 A1 | 12/2016 |
| CA | 2925800 A1 | 10/2017 |
| CA | 2925822 A1 | 10/2017 |
| CA | 3117886 A1 | 5/2020 |
| CA | 2863952 C | 6/2020 |
| CA | 3030691 C | 10/2020 |
| CA | 3103308 A1 | 6/2021 |
| CN | 105422273 A | 3/2016 |
| JP | S55125312 A | 9/1980 |
| JP | H10217921 A | 8/1998 |
| JP | 2005193788 A | 7/2005 |
| JP | 4840406 B2 | 10/2011 |
| WO | 8607423 A1 | 12/1986 |
| WO | 2009114414 A1 | 9/2009 |

* cited by examiner

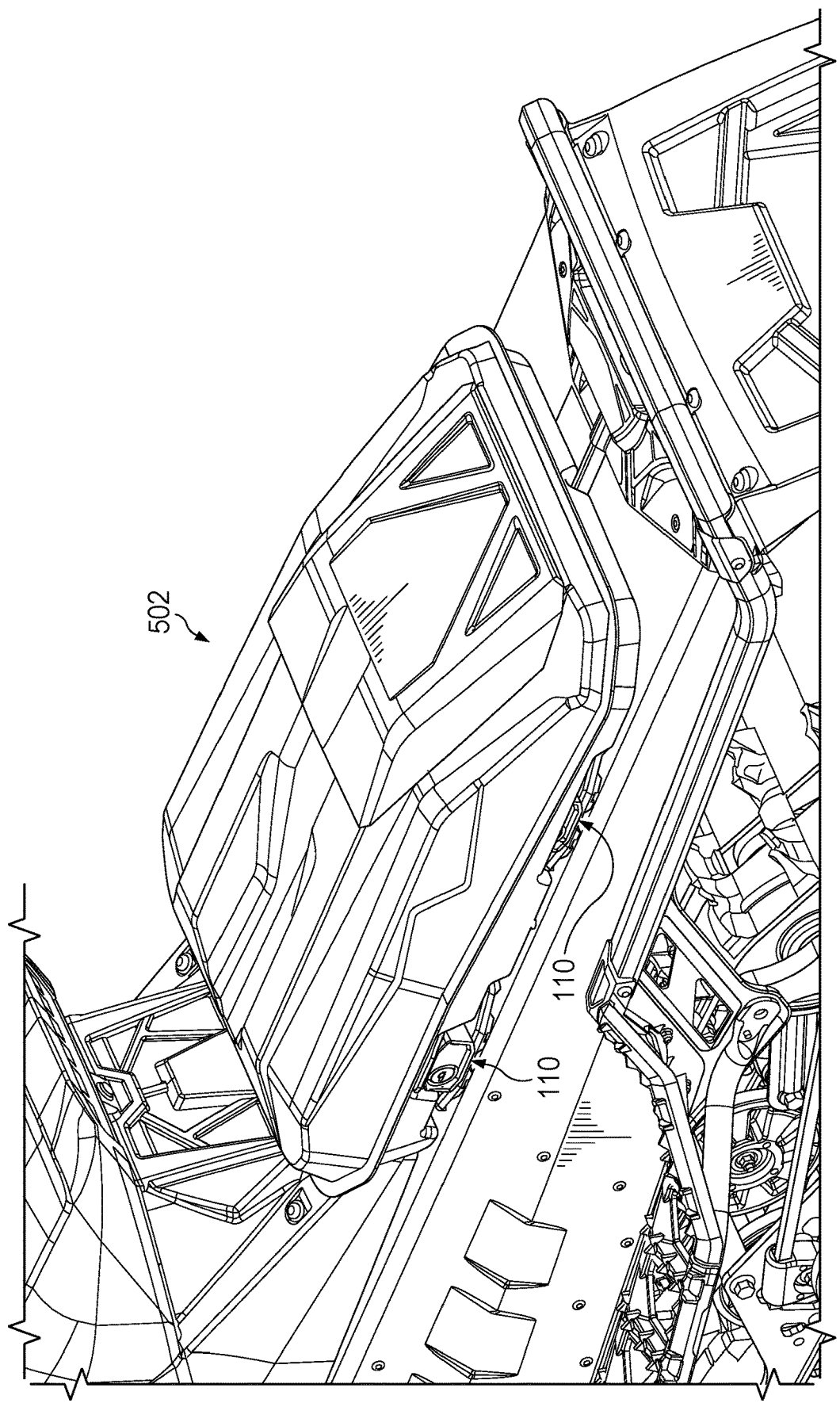

ACCESSORY ATTACHMENT SYSTEM

CROSS REFERENCE TO RELATED APPLICATIONS

This application is Continuation of U.S. application Ser. No. 18/085,968, filed Dec. 21, 2022, which claims the benefit of and priority to U.S. Provisional Application No. 63/310,264, filed Feb. 15, 2022 entitled "Accessory Attachment System". A claim of priority is made to the aforementioned application.

TECHNICAL FIELD

This disclosure generally relates to a system for attaching accessories to vehicles, e.g., snowmobiles, off-road recreation vehicles, personal watercraft.

BACKGROUND

There has been a need to securely attach accessories, such as toolboxes, spare fuel canisters, beverage coolers, storage containers, etc., to a vehicle. Previously, this had been accomplished using adjustable fabric straps or elastic cord. These attachment methods can loosen over time due, especially due to vibration and impact transmitted through the vehicle. In addition, these attachment methods typically lack locking features to prevent unauthorized removal of the accessory from the vehicle.

SUMMARY

According to one or more aspects of the present disclosure, an attachment system configured to attach an accessory to a vehicle includes a mounting bracket defining an aperture therein and a connector. The connector includes a housing and an L-shaped connecting pin perpendicularly extending from a surface of the housing and configured to be received within the aperture. The connecting pin is moveable within the aperture in a direction parallel to the surface of the connector such that a portion of the mounting bracket is located intermediate a cantilevered portion of the connecting pin and the surface of the housing, thereby securing the connector to the mounting bracket. The connector further includes a locking pin that is vertically moveable from a locking position to a release position. The locking pin is received within the aperture with the connecting pin when in the locking position, thereby inhibiting lateral movement of the connecting pin within the aperture. The locking pin is removed from the aperture when in the release position, thereby allowing lateral movement of the connecting pin within the aperture.

In one or more embodiments of the attachment system according to the previous paragraph, the locking pin can be placed in the locking position only when the portion of the mounting bracket is located intermediate the cantilevered portion of the connecting pin and the surface of the connector.

In one or more embodiments of the attachment system according to any one of the previous paragraphs, the mounting bracket further defines a plurality of apertures therein and the connector further includes a plurality of L-shaped connecting pins perpendicularly extending from a surface of the housing configured to be received within the plurality of apertures.

In one or more embodiments of the attachment system according to any one of the previous paragraphs, the plurality of L-shaped connecting pins each have a shape of a first rectangular prism surmounted by a larger second rectangular prism, and the plurality of apertures each have a rectangular shape.

In one or more embodiments of the attachment system according to any one of the previous paragraphs, the connector includes only one locking pin.

In one or more embodiments of the attachment system according to any one of the previous paragraphs, the connector further includes a release mechanism having a release actuator with a sloped surface configured to move the locking pin from the locking position to the release position.

In one or more embodiments of the attachment system according to any one of the previous paragraphs, the connector further includes a release lock having a moveable arm configured to block the release actuator from moving the locking pin to the release position.

In one or more embodiments of the attachment system according to any one of the previous paragraphs, the moveable arm of the release lock is rotatable and connected to a cylinder of a keyed lock.

In one or more embodiments of the attachment system according to any one of the previous paragraphs, the housing defines a ledge extending beyond the release mechanism when the releaser actuator engages the locking pin. The ledge is configured to provide a handle for removing the accessory from the vehicle.

In one or more embodiments of the attachment system according to any one of the previous paragraphs, the mounting bracket further includes a cover attached to the mounting bracket by a flexible strap and defining a resilient protrusion that is sized, shaped and arranged to be compressively and removably received within the aperture.

In one or more embodiments of the attachment system according to any one of the previous paragraphs, the locking pin has a cylindrical shape, the connecting pin has a shape of a first rectangular prism surmounted by a larger second rectangular prism, and the aperture has a shape of a rectangle surmounted by a semicircle.

In one or more embodiments of the attachment system according to any one of the previous paragraphs, the housing is integrally formed with the accessory.

In one or more embodiments of the attachment system according to any one of the previous paragraphs, the mounting bracket is attached to the vehicle and the vehicle is selected from a list consisting of a snowmobile, a snow bike, an off-road recreation vehicle, and a personal watercraft.

In one or more embodiments of the attachment system according to any one of the previous paragraphs, the mounting bracket defines a ridge near a distal edge of the mounting bracket. The attachment system further includes a saddle bag mounting plate defining an opening in which the ridge of the mounting bracket is received. The saddle bag mounting plate is disposed intermediate a bottom surface of the connector and the mounting bracket.

According to one or more aspects of the present disclosure, a connector configured to attach an accessory to a vehicle includes a housing and a plurality of L-shaped connecting pins perpendicularly extending from a surface of the housing configured to be received within a plurality of apertures defined in a separate substrate. The plurality of L-shaped connecting pins is moveable within the plurality of apertures in the substrate in a direction parallel to the surface of the housing such that a portion of the substrate is located intermediate a cantilevered portion of the plurality of L-shaped connecting pins and the surface of the connector, thereby securing the connector to the substrate.

In one or more embodiments of the connector according to the previous paragraph, the plurality of L-shaped connecting pins each have a shape of a first rectangular prism surmounted by a larger second rectangular prism, and the plurality of apertures each have a rectangular shape.

In one or more embodiments of the connector according to any one of the previous paragraphs, the substrate is a mounting bracket. The mounting bracket further includes a cover attached to the mounting bracket by a flexible strap and defining a plurality of resilient protrusions that are sized, shaped and arranged to be compressively and removably received within the plurality of apertures.

According to one or more aspects of the present disclosure, a connector configured to attach an accessory to a vehicle includes a housing and an L-shaped connecting pin perpendicularly extending from a surface of the housing and configured to be received within a first aperture defined in a sperate substrate. The connecting pin is moveable within the first aperture in a direction parallel to the surface of the housing such that a portion of the substrate is located intermediate a cantilevered portion of the connecting pin and the surface of the housing, thereby securing the connector to the substrate. The connector further includes a locking pin which is vertically moveable from a locking position in which the locking pin is received within a second aperture defined in the substrate thereby inhibiting lateral movement of the connector relative to the substrate. The locking pin is vertically moveable to a release position in which the locking pin is removed from the aperture, thereby allowing lateral movement of the connector relative to the substrate.

According to one or more aspects of the present disclosure, a connector configured to attach an accessory to a vehicle includes a housing and an L-shaped connecting pin perpendicularly extending from a surface of the housing and configured to be received within an aperture of a separate substrate. The connecting pin is moveable within the aperture in a direction parallel to the surface of the connector such that a portion of the substrate is located intermediate a cantilevered portion of the connecting pin and the surface of the housing, thereby securing the connector to the substrate. The connector also includes a locking pin that is vertically moveable from a locking position to a release position. The locking pin is received within the aperture with the connecting pin when in the locking position, thereby inhibiting lateral movement of the connecting pin within the aperture. The locking pin is removed from the aperture when in the release position, thereby allowing lateral movement of the connecting pin within the aperture.

According to one or more aspects of the present disclosure, a snow vehicle including a tunnel, an accessory removably secured to the tunnel, and a mounting bracket secured to the tunnel. The mounting bracket includes an aperture a cavity. The snowmobile further includes a connector secured to the accessory, the connector including a locking pin vertically moveable from a locking position to a release position and an L-shaped connecting pin configured to perpendicularly extend into the cavity in the locking position.

BRIEF DESCRIPTION OF THE DRAWINGS

The accessory attachment system will now be described, by way of example with reference to the accompanying drawings, in which:

FIG. 55 is an isometric view of an accessory secured to four connectors, according to some embodiments.

DETAILED DESCRIPTION

Figure 1:
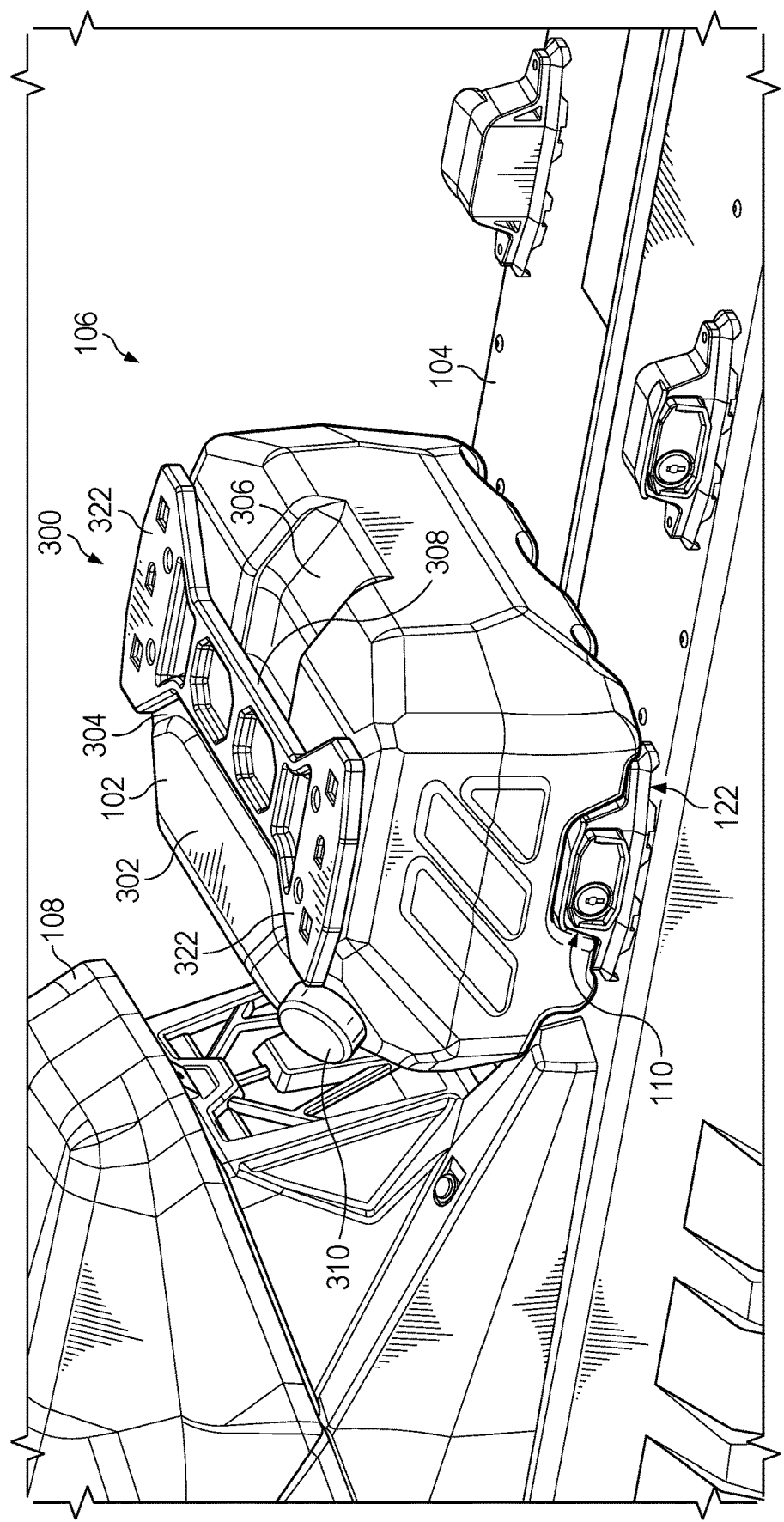
FIG. 1 is a perspective view of an accessory attached to a vehicle by an accessory attachment system according to some embodiments.
Figure 2:
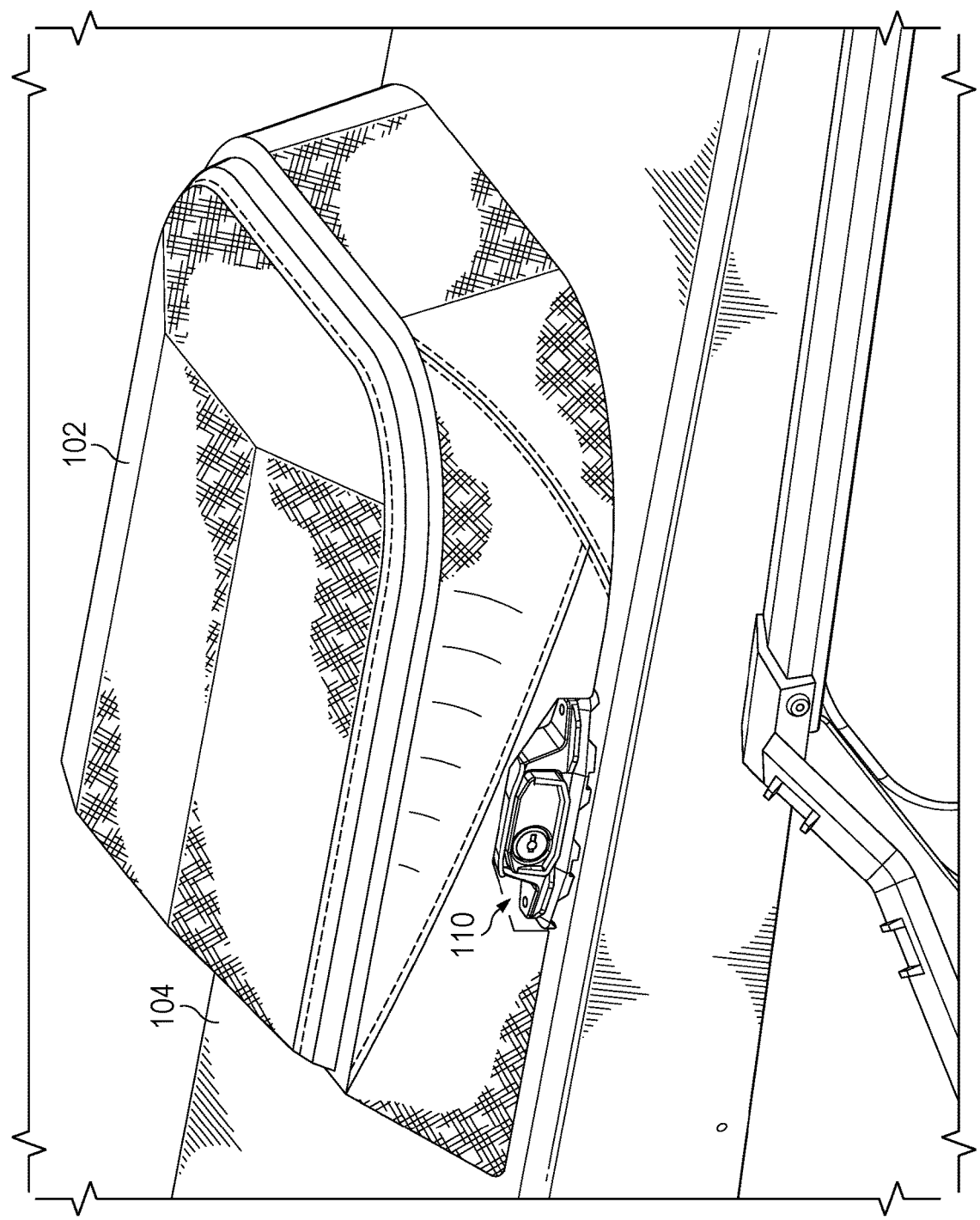
FIG. 2 is a perspective view of another accessory attached to the vehicle by the accessory attachment system according to some embodiments.

FIGS. 1-45 show a first example of an accessory attachment system used to attach an accessory 102 to a vehicle 106, such as portion of the tunnel 104 of a snowmobile located aft of the seat 108. FIG. 1 illustrates a spare fuel canister accessory 102 and FIG. 2 illustrates a soft-sided stored container accessory 102. The illustrated examples are not exhaustive of the types of accessories that may be attached to the snowmobile. The accessory attachment systems described herein may attach an accessory to a vehicle, the vehicle including but not limited to a snow vehicle, snowmobile, ATV, side-by-side, motorbike, off-road vehicle, etc.

Figure 3:
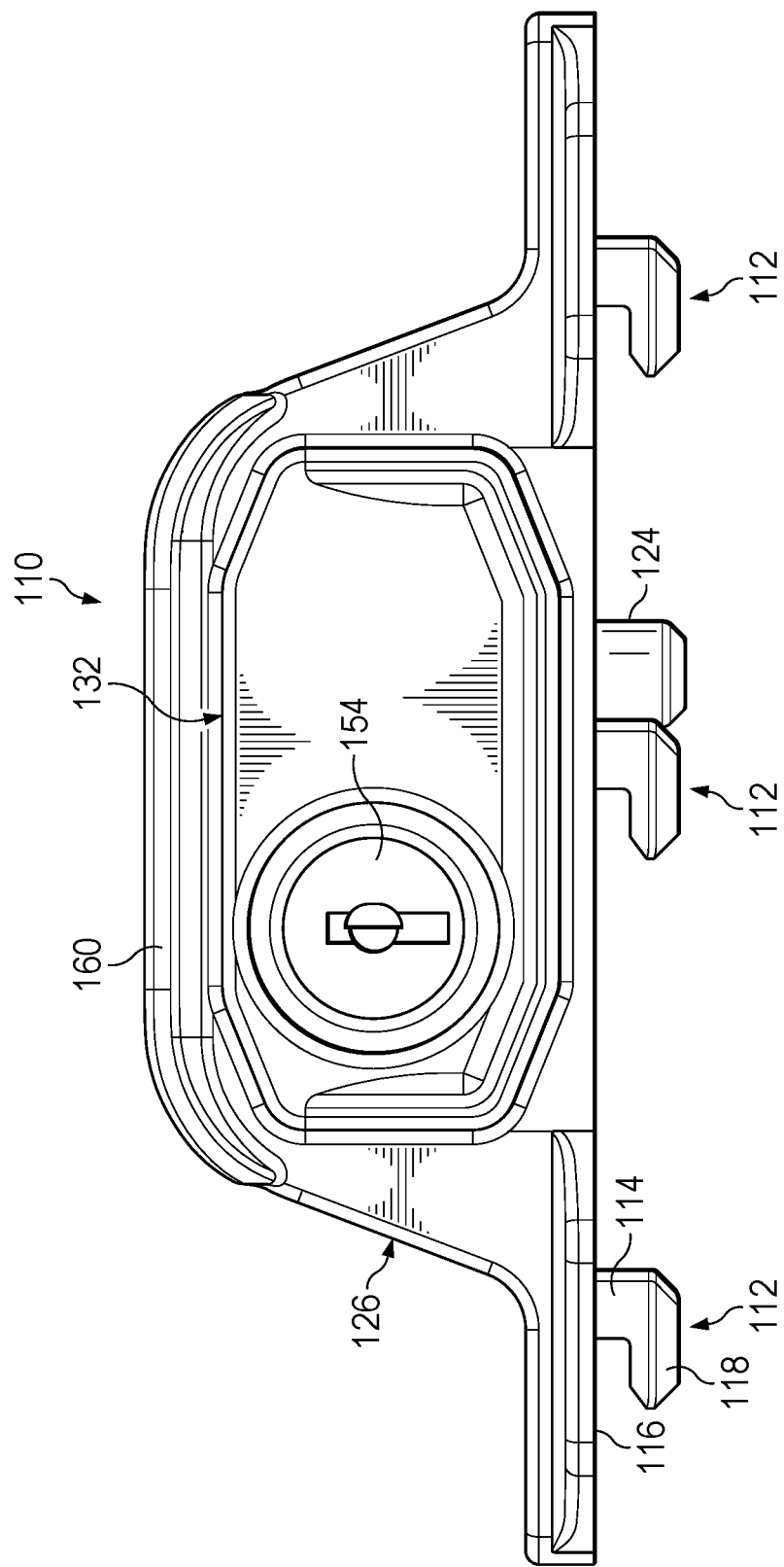
FIG. 3 is front view of the connector according to some embodiments.
Figure 4:
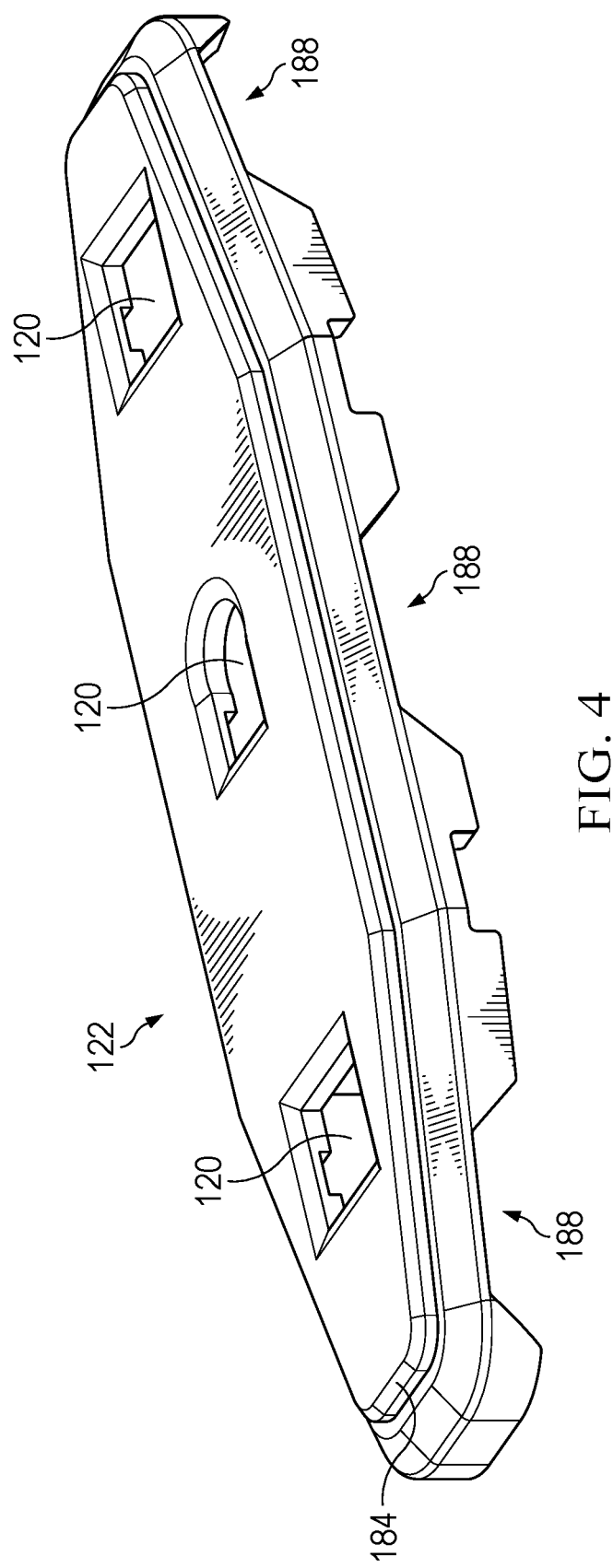
FIG. 4 is perspective view of a mounting bracket of the accessory attachment system according to some embodiments.
Figure 5:
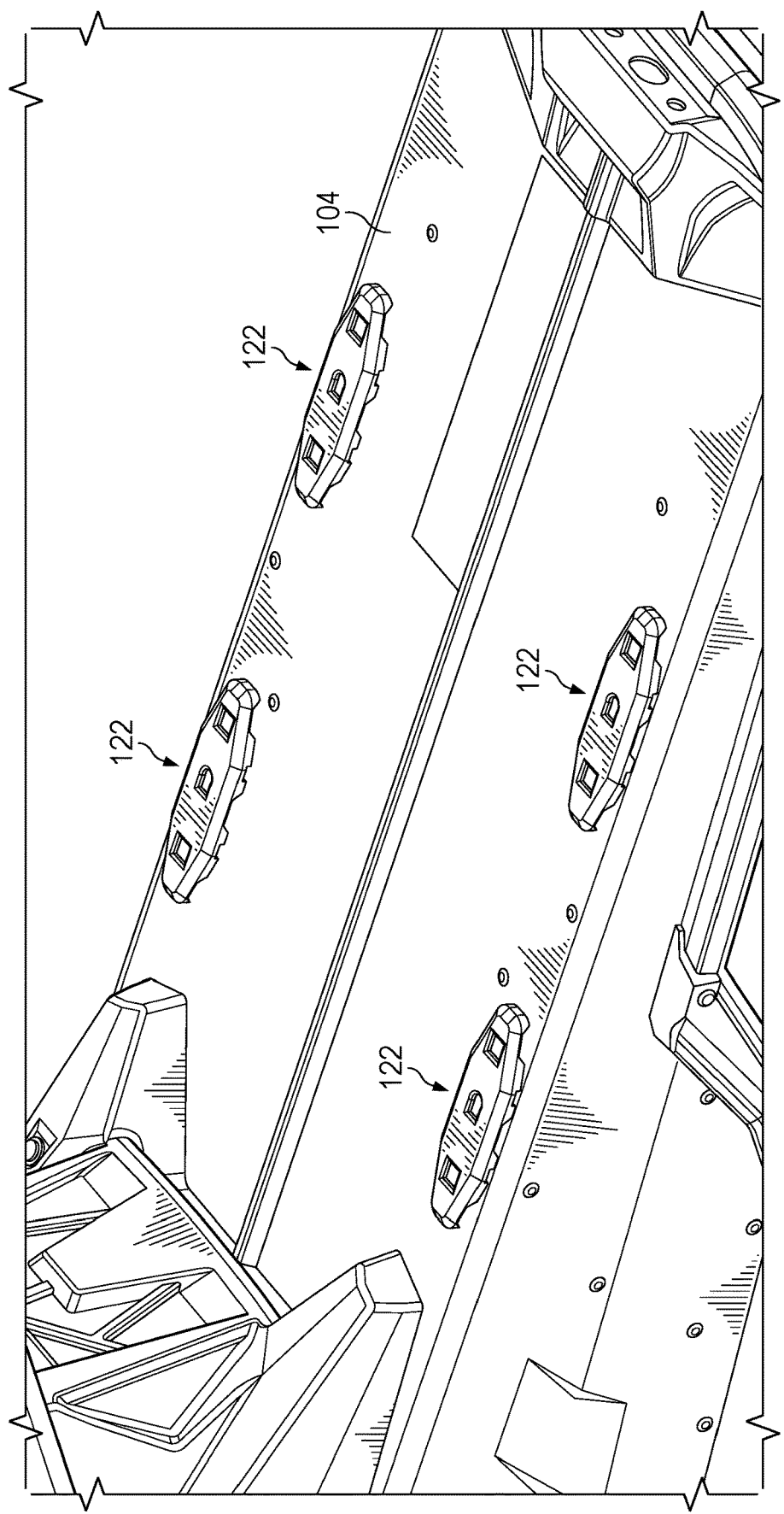
FIG. 5 is perspective view of brackets of the accessory attachment system attached to a vehicle according to some embodiments.
Figure 6:
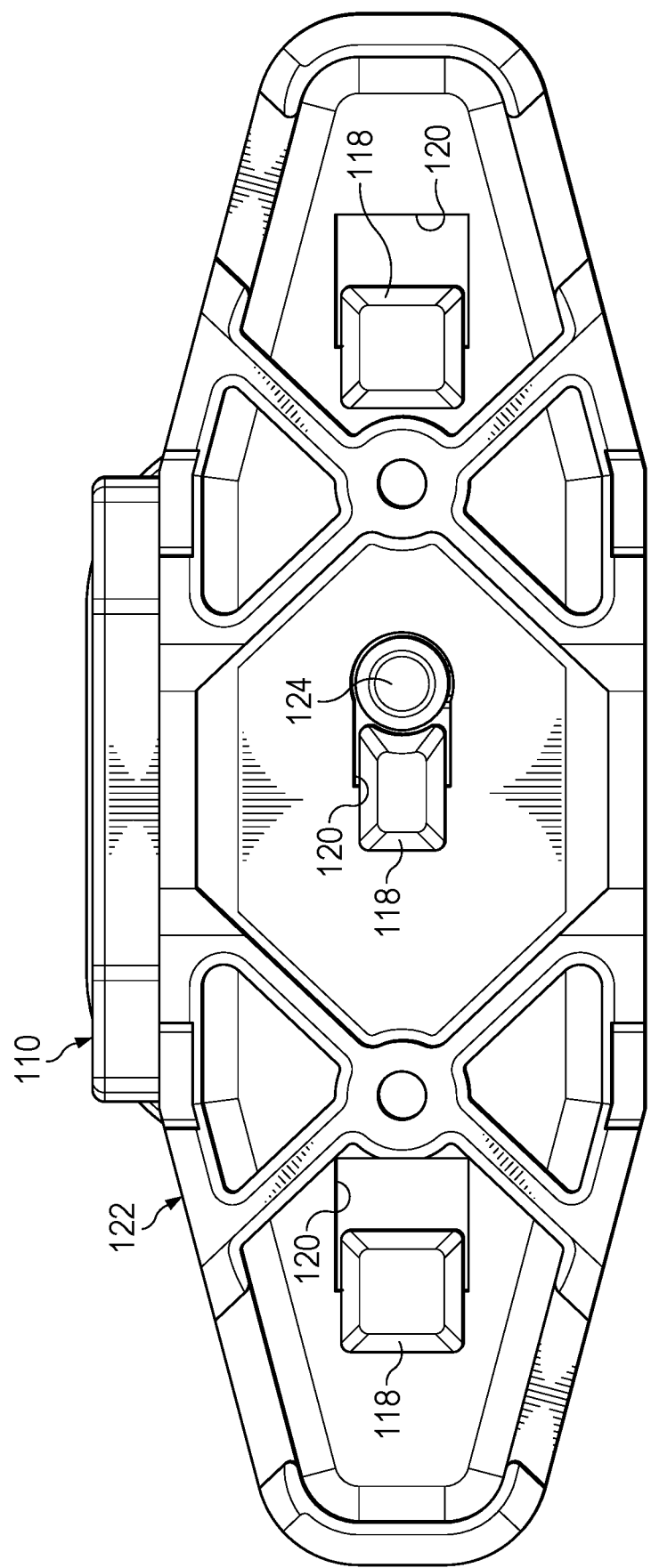
FIG. 6 is bottom view of the accessory attachment system according to some embodiments.

The accessory 102 includes a connector 110, illustrated in FIG. 3, that has one or more connecting pins 112 having post portions 114 that extend substantially perpendicularly from a bottom surface 116 of the connector 110 and cantilevered portions 118 extending substantially perpendicularly from the post portions 114, thereby forming an L-shape. The connecting pins 112 correspond to apertures 120 in a substrate in the form of a mounting bracket 122, see FIG. 4, that is attached to the vehicle 106 as shown in FIG. 5, for example by a pair of threaded fasteners. The connecting pins 112 may be referred to hereinafter as "fixed members" extending from a housing 126 of the connector 110. The bottom of the mounting bracket defines cavities 188 under the apertures 120 that extends to an outer edge of the mounting bracket 122. These cavities 188 are configured to allow evacuation of snow or other debris that may accumulate under the mounting bracket 122 which could block the connecting pins 112 from being properly received within aperture 120. The connecting pins 112 are received within the apertures 120 and moved laterally or longitudinally such that portions of the mounting bracket 122 are located between the bottom surface 116 of the connector 110 and the cantilevered portions 118 of the connecting pins 112 as shown in FIG. 6, thereby attaching the accessory 102 to the vehicle 106.

In some embodiments, the accessory 102 may include a top surface 302 configured to secure a mounting plate 300. The mounting plate 300 may include one or more mounting bracket portions 322 configured to secure to the connector 110, thereby attaching an additional accessory to the accessory 102. The top surface 302 of the accessory 102 may include a recess 304 to receive the mounting plate therein. The top surface 302 may include a channel 306 configured to form a handle portion 308 on the mounting plate 300. In some embodiments, a fuel inlet port 310 may be positioned on the top surface 302 such that a substantially flat plane is formed. The position of the fuel inlet port 310 may be configured to allow an additional accessory feature to be attached on the top surface 302 of the accessory 102.

Figure 7:
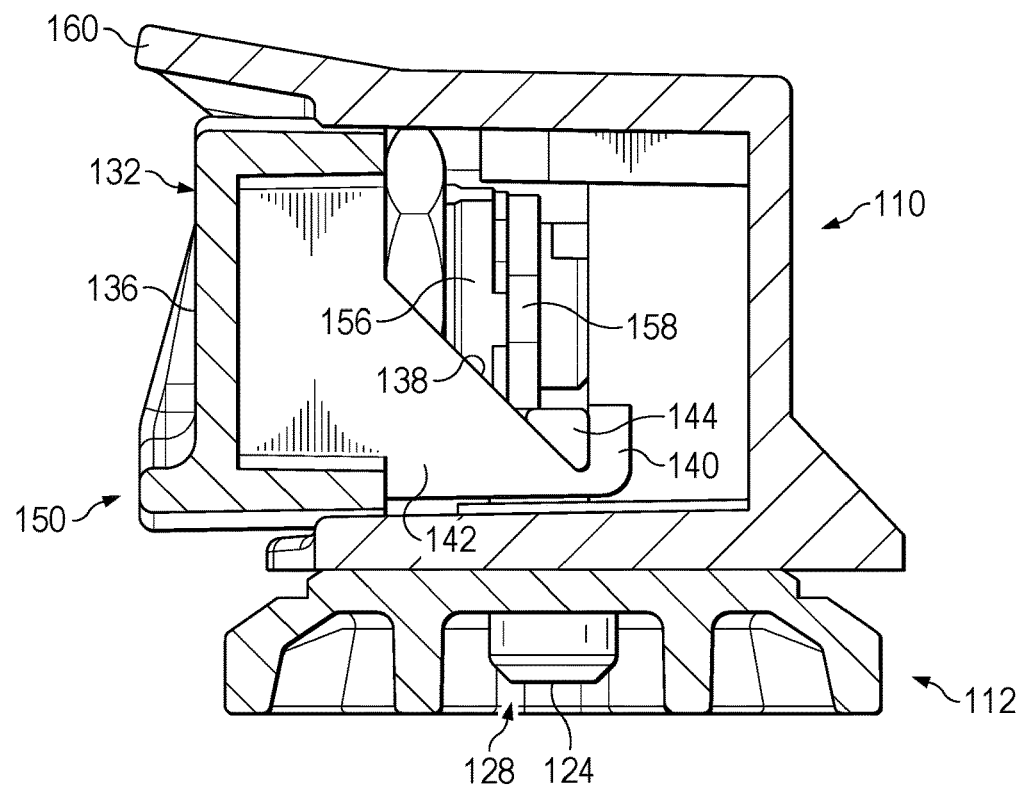
FIG. 7 is a cross section view of the accessory attachment system with a locking pin in a locking position according to some embodiments.
Figure 8:
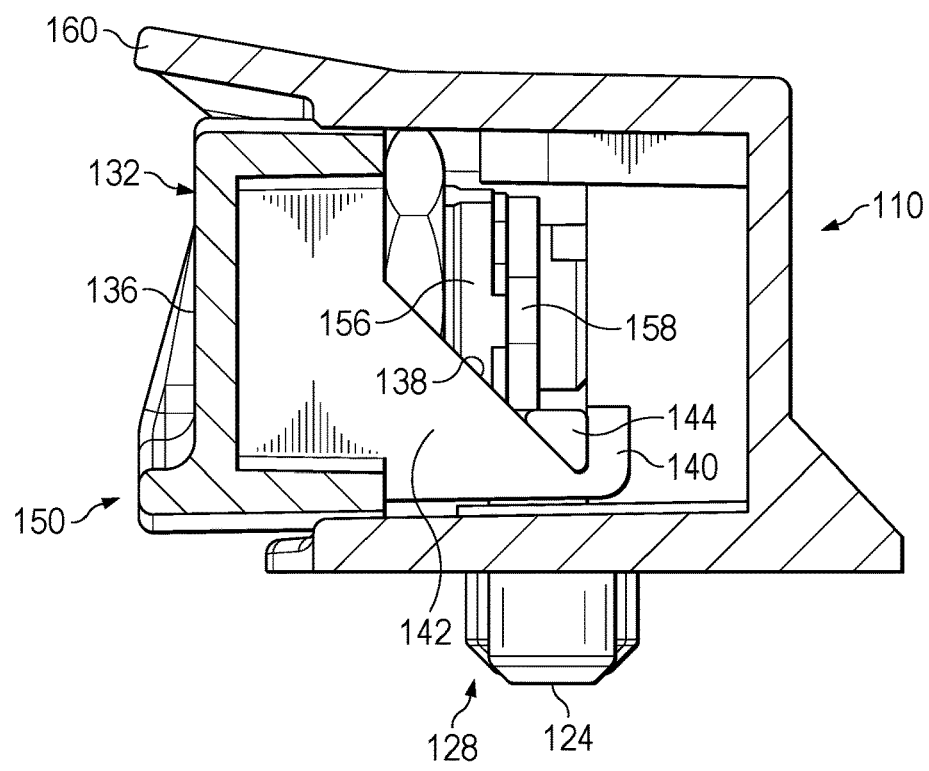
FIG. 8 is a cross section view of the connector with the locking pin in the locking position according to some embodiments.
Figure 9:
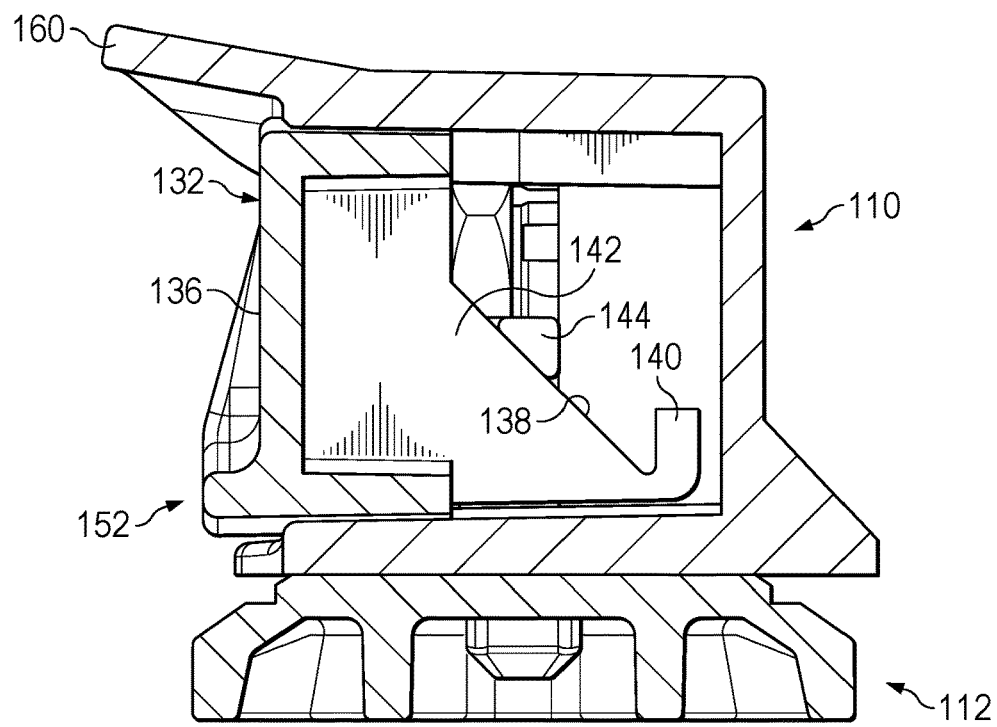
FIG. 9 is a cross section view of the accessory attachment system with the locking pin in a release position according to some embodiments.
Figure 10:
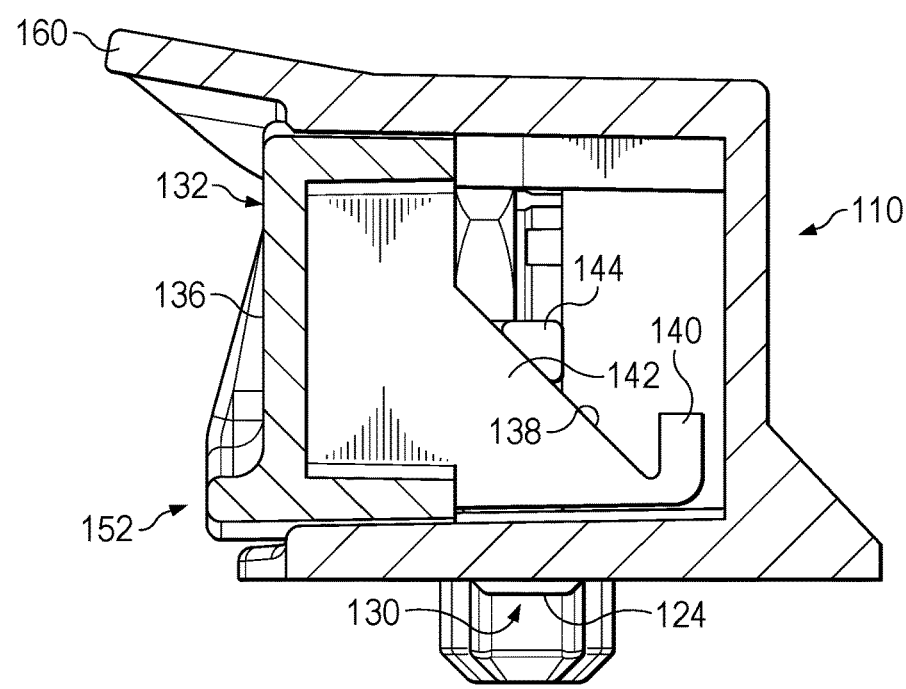
FIG. 10 is a cross section view of the connector with the locking pin in the release position according to some embodiments.

The connector 110 further includes a locking pin 124 that inhibits lateral movement of the connector 110 relative to the mounting bracket 122, thereby holding the connecting pins 112 in the apertures 120 so that the portions of the mounting bracket 122 remain between the bottom surface 116 of the connector 110 and the cantilevered portions 118 of the connecting pins 112. The locking pin 124 is configured to move vertically within the connector housing 126 from a locking position 128 in which it extends from the bottom surface 116 as shown in FIGS. 7 and 8 to a release position 130 in which it is located above the bottom surface 116 of the connector housing 126 as shown in FIGS. 9 and 10. The locking pin 124 is normally pushed into the locking position 128 shown in FIGS. 7 and 8 by a resilient biasing member 129. A first end of the biasing member 129 is received in a chamber defined in the upper portion of the connector housing 126. A second end of the biasing member is received in a chamber defined by the locking pin 124. In certain embodiments, the biasing member 129 is a coil spring. However, as should be understood by those of ordinary skill in the pertinent art, the biasing member 129 can take the form of any type of spring, such as a coil spring, leaf spring, elastomeric spring, etc., or alternatively, any biasing member, capable of biasing the locking pin into the aperture.

As shown in FIGS. 7-10, a release actuator 132 is provided within a channel 134 defined within the connector housing 126. The release actuator 132 includes a proximal surface 136 which may be engaged and pressed by the user to detach the connector 110 from the mounting bracket 122. The release actuator 132 further includes a sloped surface 138 having two tabs 140 at the distal end of the release actuator 132. The sloped surface 138 may have two rails 142 running substantially parallel to each other with the locking pin 124 fitting between the two rails 142.

Figure 35:
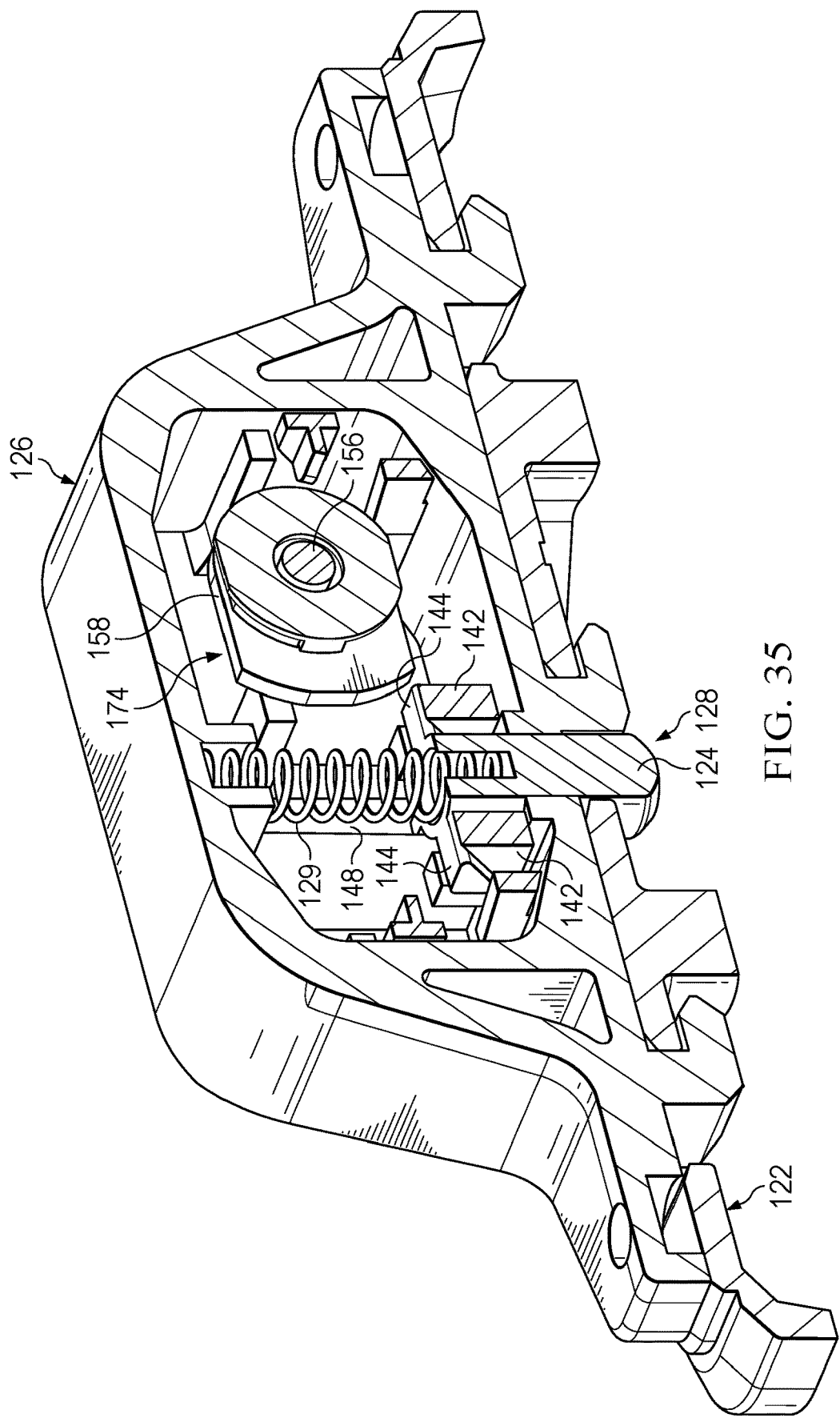
FIG. 35 is cross-section perspective view of the locking connector in a locked condition according to some embodiments.

As shown in FIG. 35, the sloped surface 138 of the release actuator 132 engages a protrusion on the locking pin 124, such as a circumferential protrusion about the locking pin, or one or more protrusions 144 that extend from the sides of the locking pin 124. In the illustrated embodiment, the locking pin 124 has two protrusions 144 extending from opposing sides of the locking pin 124. The locking pin 124 may further include an anti-rotation protrusion 146 which engages a locking pin slot 148 in the connector housing 126 that receives the anti-rotation protrusion 146 to prevent the locking pin 124 from rotating on its axis.

The release actuator 132 is manually movable within the channel 134 between a resting position 150 shown in FIGS. 7 and 8 and a clearance position 152 shown in FIGS. 9 and 10. In the resting position 150, the protrusions 144 of the locking pin 124 engage the sloped surface 138 of the release actuator 132 at the distal end of the release actuator 132 adjacent to the tabs 140, and the biasing member 129 biases the locking pin 124 into the aperture 120 to hold the connector 110 in place when attached to the mounting bracket 122. As the release actuator 132 is pressed into the channel 134 by the user, the protrusions 144 of the locking pin 124 move along the sloped surface 138 of the release actuator 132, compressing the biasing member 129 and retracting the locking pin 124 into the connector 110. When the release actuator 132 is in the clearance position 152, the locking pin 124 is substantially entirely contained within the connector housing 126 so that the connector 110 can be detached from the mounting bracket 122.

When the release actuator 132 is released, the biasing member 129 rebounds to move the locking pin 124 back to the locking position 128 and pushes the release actuator back 132 to the resting position 150. Accordingly, unless the release actuator 132 is manually moved into the clearance position 152, or the locking pin 124 is moved into the release position 130, the release actuator 132 resides in the resting position 150.

Figure 31:
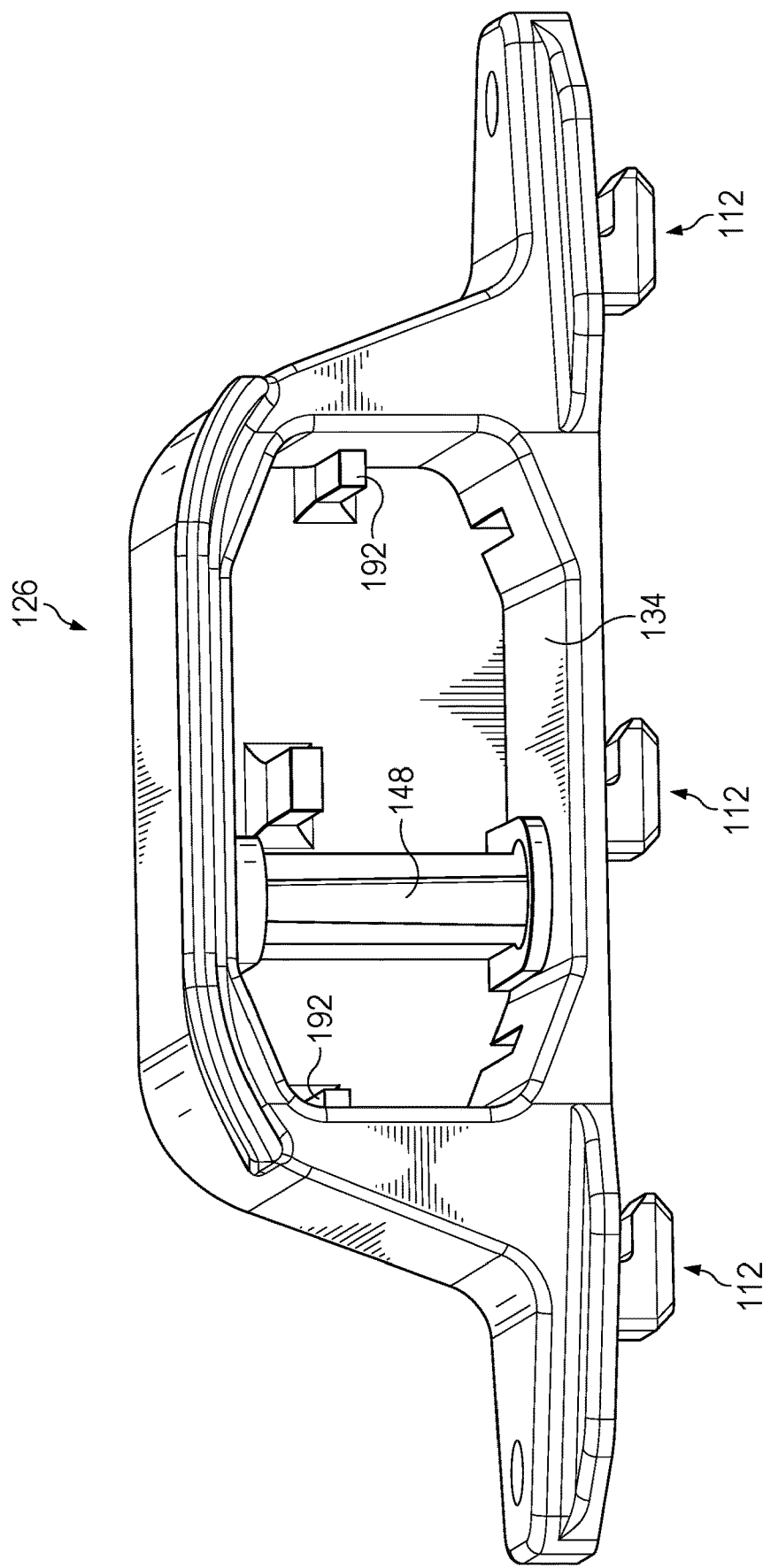
FIG. 31 is a front perspective view of the connector housing according to some embodiments.

As best illustrated in FIG. 31, the connector housing 126 defines a pair of alignment protrusions 192 that may be vertically offset from one another. These alignment protrusions 192 are configured to cooperate with the stabilizer arms 194, and optionally the offset arrangement of the alignment protrusions 192 may prevent a right-handed release actuator 132 from being installed in a left-handed connector housing 126 and vice versa.

Figure 11:
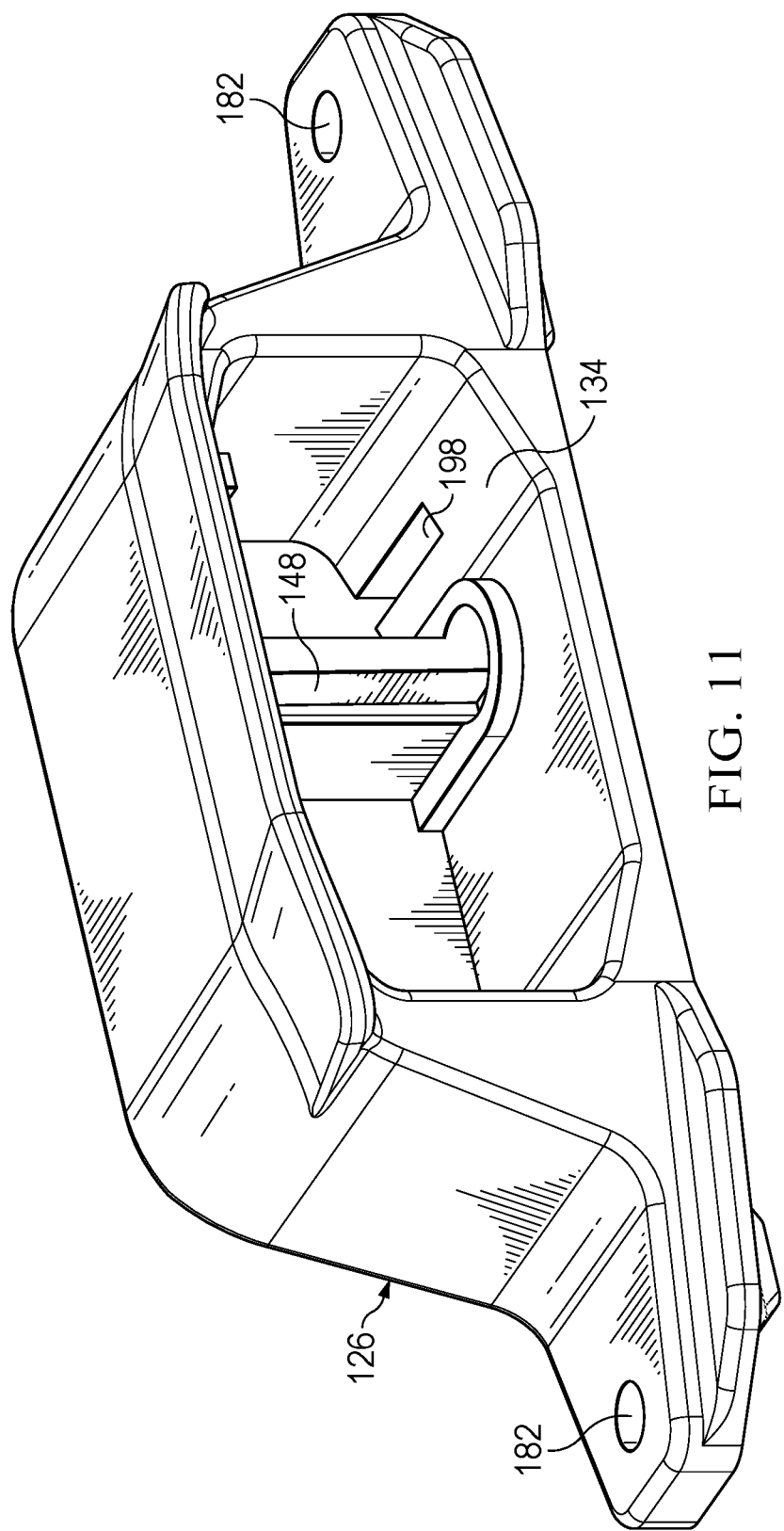
FIG. 11 is perspective view of a housing of the connector according to some embodiments.
Figure 18:
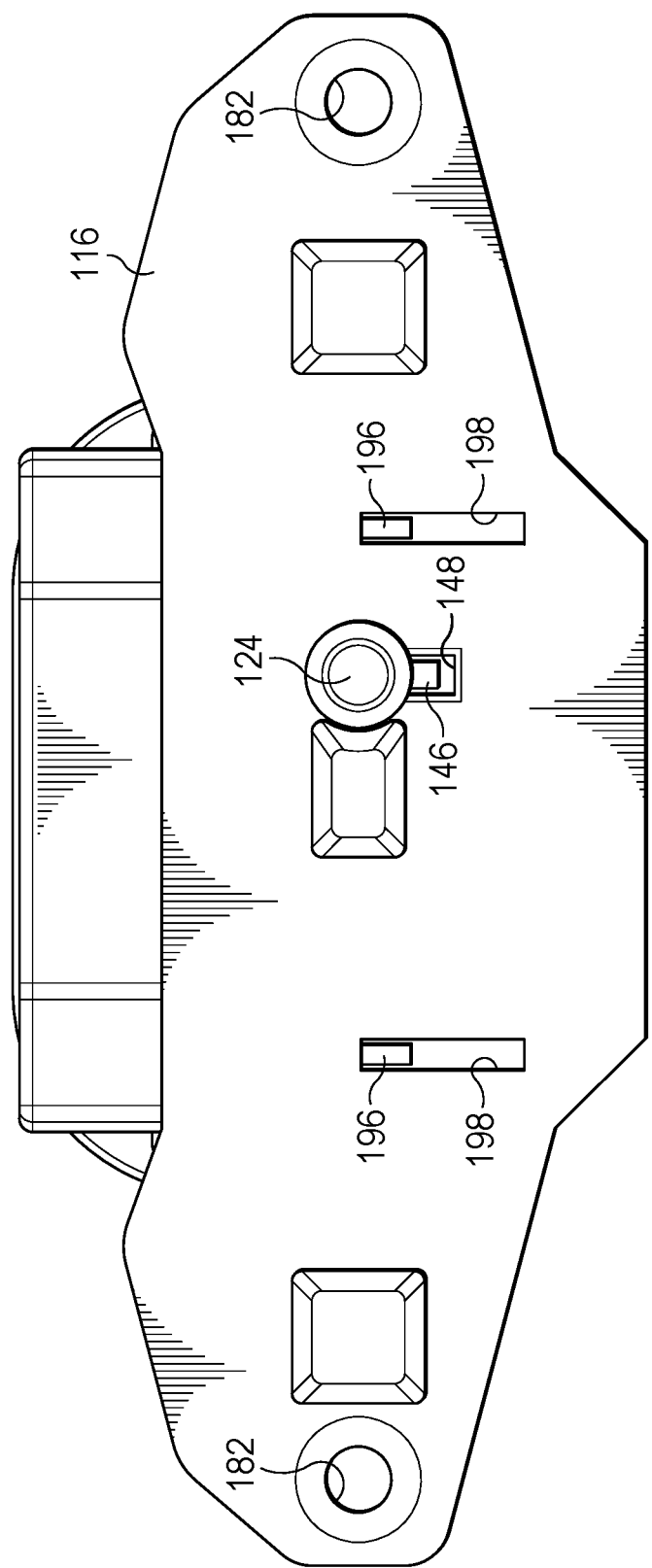
FIG. 18 is bottom view of the connector according to some embodiments.
Figure 19:
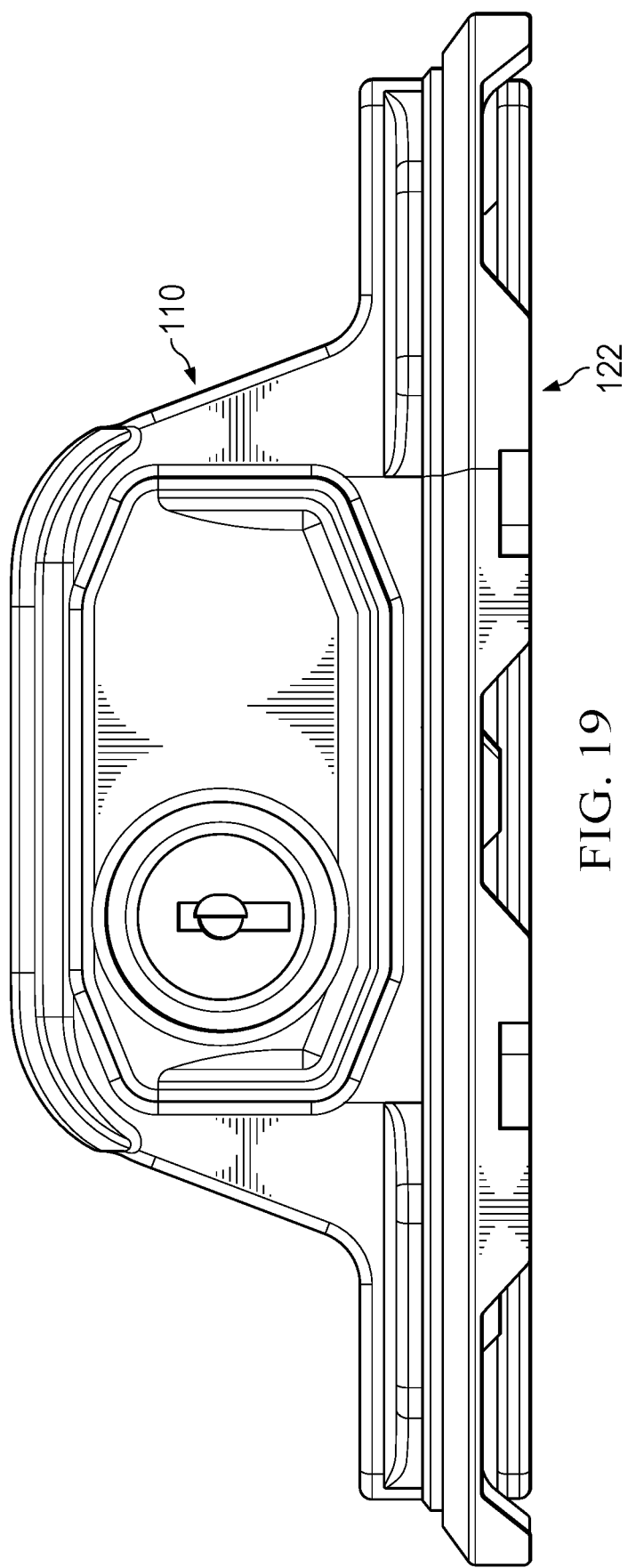
FIG. 19 is front view of the accessory attachment system according to some embodiments.
Figure 20:
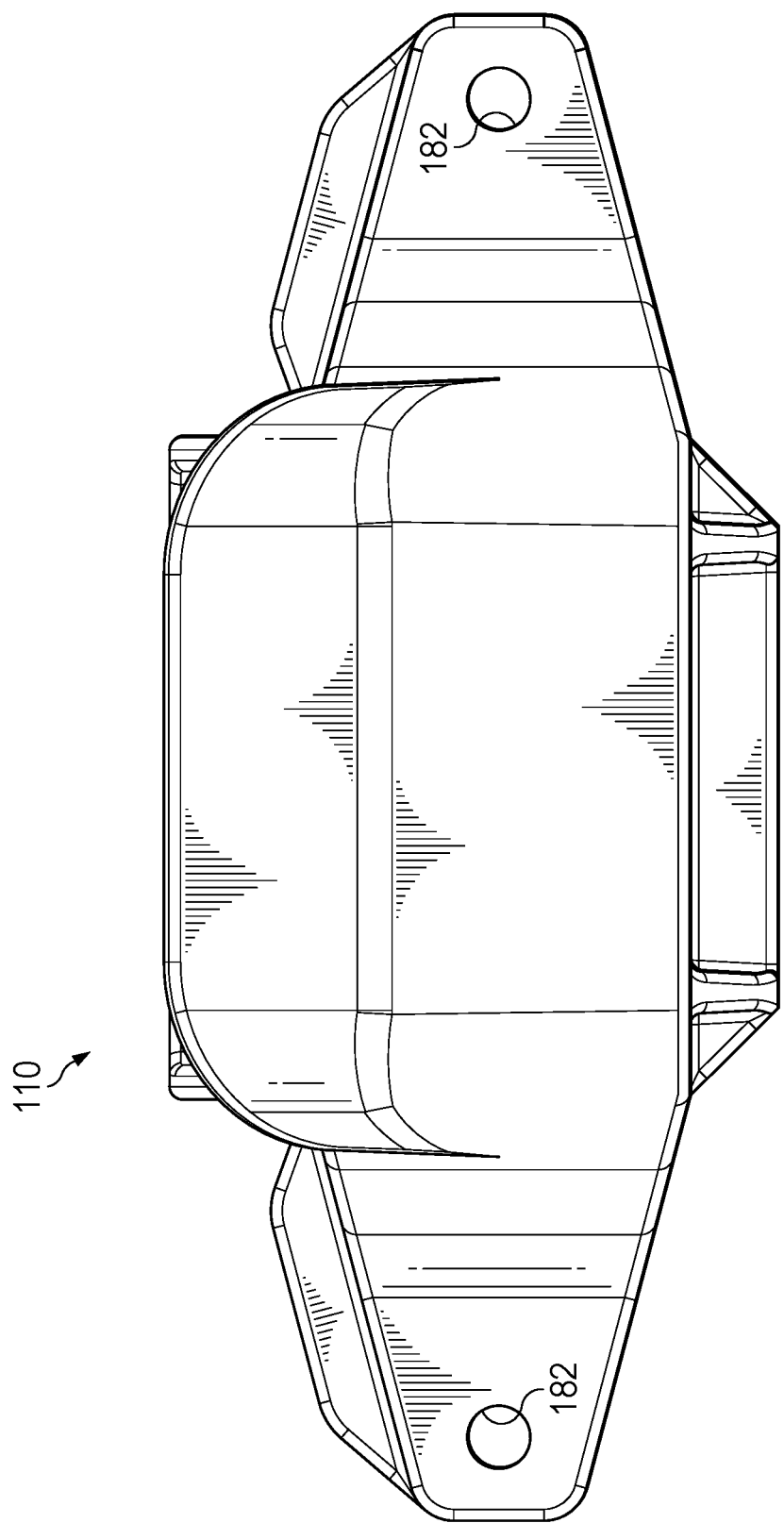
FIG. 20 is top view of the accessory attachment system according to some embodiments.
Figure 32:
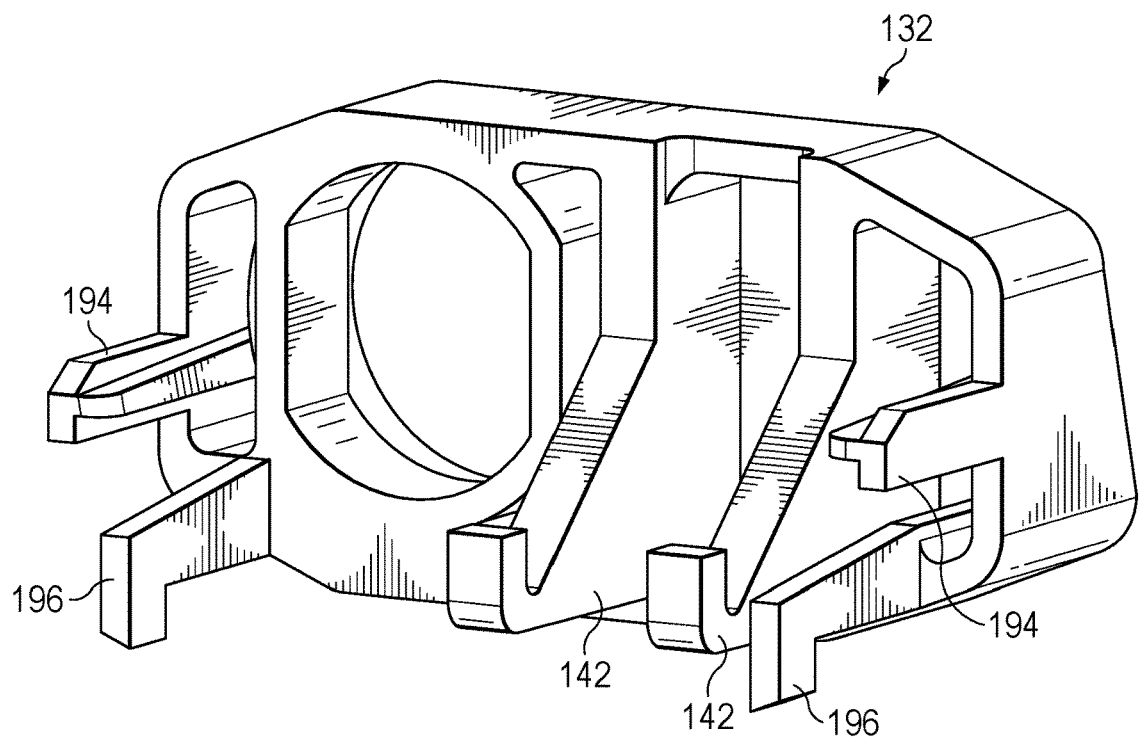
FIG. 32 is a rear perspective view of a locking release actuator according to some embodiments.
Figure 33:
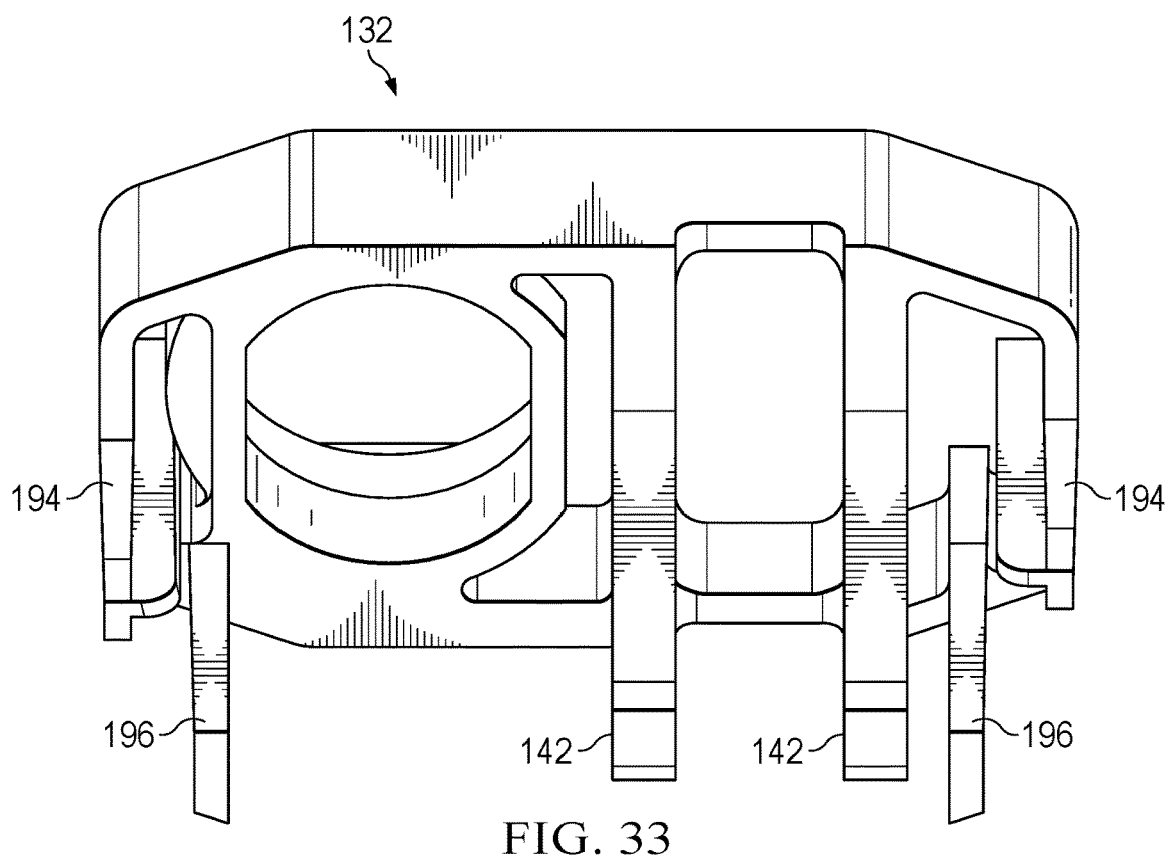
FIG. 33 is another rear perspective view of the locking release actuator according to some embodiments.

As best illustrated in FIG. 32, the release actuator 132 includes a pair of stabilizer arms 194 that are configured to inhibit the release actuator 132 from wobbling side-to-side when moving between the resting position 150 and the clearance position 152. The stabilizer arms 194 are received in the connector housing 126 underneath the alignment protrusions 192. As the release actuator 132 moves between the clearance position 152 and the resting position 150, the stabilizer arms 194 slide along the protrusions 194 to stabilize the release actuator 132. The release actuator 132 may include one or more retaining arms 196 that are configured to retain the release actuator 132 within the connector housing 126. As shown in FIGS. 11 and 18, the connector housing 126 includes slots 198 for receiving the ends of the retaining arms 196 therein. The slots 198 may be provided on an inclined surface within the channel 134 to offset the ends of the retaining arms 196 from the bottom of the connector housing 126. As the release actuator 132 moves between the clearance position 152 (FIG. 42) and the resting position 150 (FIG. 35), the retaining arms 196 slide along the slots 198. The retaining arms 196 may engage the housing in the clearance position 152 to act as a stop for the release actuator 132 when depressed by a user, and the retaining arms 196 may engage the connector housing 126 at the opposite side of the slot 198 in the resting position 150 to prevent the release actuator 132 from being entirely withdrawn from the connector housing 126 when released by the user.

As best shown in FIG. 3, the connecting pins 112 each have a post portion 114 extending from the bottom surface 116 of the connector housing 126 with at least one protruding cantilevered portion 118 at the distal end of the post portion 114 opposite the bottom surface 116. The cantilevered portion 118 is substantially perpendicular to the axis of the post portion 114.

In the illustrated example, the post portions 114 of the connecting pins 112 have a rectangular cross section and the apertures 120 in the mounting bracket 122 are also rectangular in shape. As shown in FIG. 4, the middle aperture 120 that also receives the locking pin preferably has a shape of a rectangle surmounted by a semicircle on the end receiving the locking pin 124, i.e., a Norman window shape. Other embodiments may be envisioned in which the posts of the connecting pins have a cylindrical shape and the apertures in the mounting brackets have an oblong shape. Although the middle aperture 120 shown in FIG. 4 is configured to receive both one of the connecting pins 112 and the locking pin 124, it is to be understood that a separate aperture may be provided for receiving only the locking pin 124. It is also to be understood that although the locking pin 124 is positioned adjacent the middle connecting pin 112, the locking pin 124 may be spaced apart from each connecting pin 112 so that there is a gap therebetween.

Figure 12:
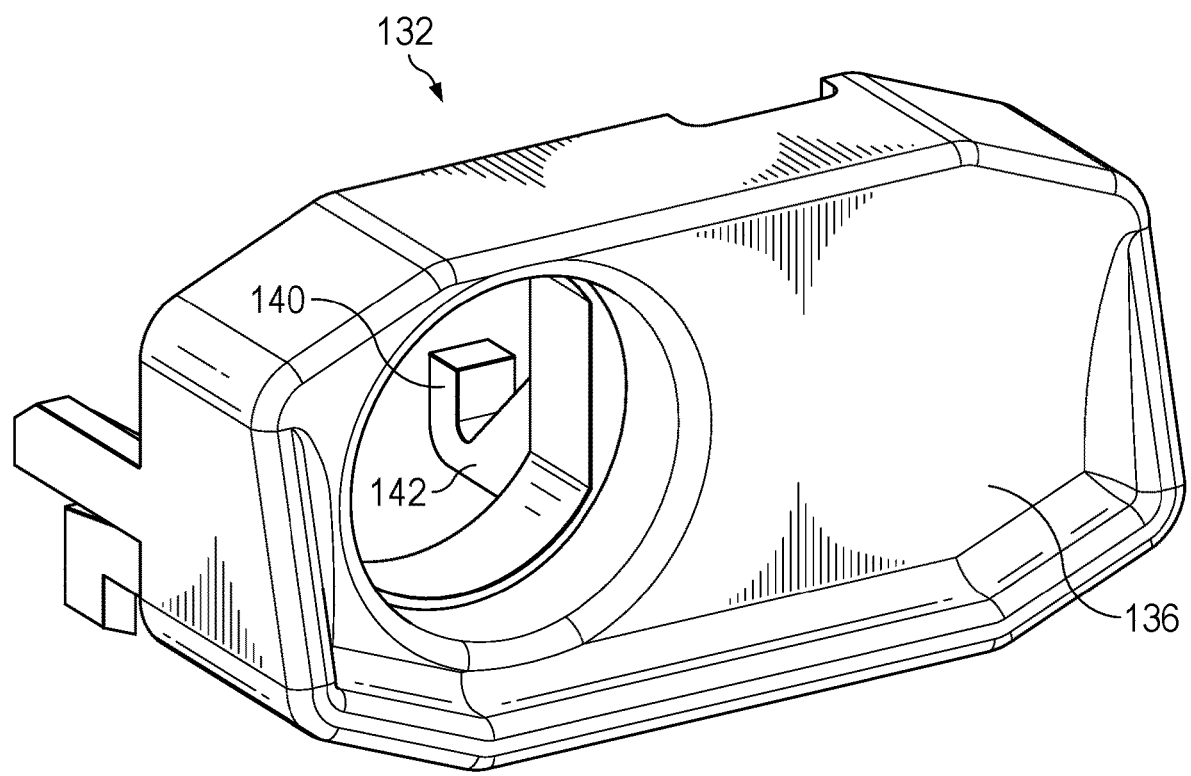
FIG. 12 is perspective view of a release actuator of the connector according to some embodiments.

The connector housing 126 shown in FIG. 11, the release actuator 132 shown in FIG. 12, and the locking pin 124 may each be formed on an engineered polymer material, such as 30% glass filled polyamide. The mounting bracket 122 may also be formed of the same engineered polymer material or any other suitable material. In certain embodiments, the substrate may be a portion of the vehicle chassis with the apertures 120 being defined in the chassis material itself, thereby eliminating the need for a separate mounting bracket.

In certain embodiments, the post portions 114 of the connecting pins 112 are oriented substantially perpendicularly with the bottom surface 116 of the connector housing 126. In certain embodiments, the shapes of the post portions 114 and cantilevered portions 118 are round, rectangular, or any other shape. In certain embodiments, the shape of the locking pin 124 is round, rectangular, or any other shape. The cantilevered portions 118 of the connecting pins 112 are fitted to the corresponding apertures 120 such that there is sufficient clearance between the connecting pins 112 and apertures 120 such that the post portions 114 may be inserted into the apertures 120. In certain embodiments, the cantilevered portions 118 are angled such that they may clear the walls of the apertures 120. In certain embodiments, the positions, shapes, dimensions and number of connecting pins 112 and their clearances are chosen such that there is little relative motion between the connector 110 and the mounting bracket 122 while the connector 110 and the mounting bracket 122 are attached, and the locking pin 124 is in the locking position 128. In certain embodiments, the positions, shapes, dimensions, and number of connecting pins 112 are chosen to reduce stresses between the connecting pins 112 of the connector 110 and the mounting bracket 122.

Figure 34:
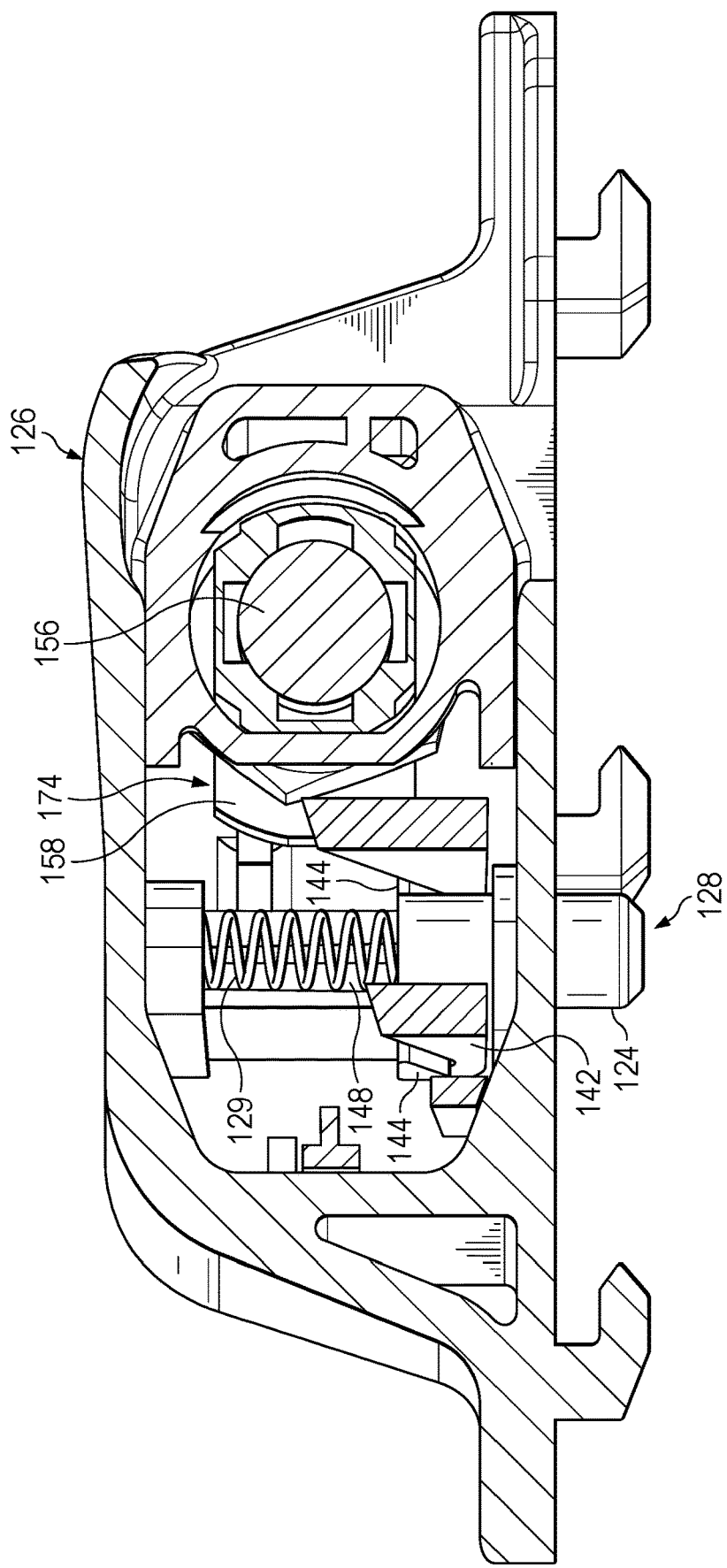
FIG. 34 is cross-section perspective view of the locking connector in a locked condition according to some embodiments.
Figure 36:
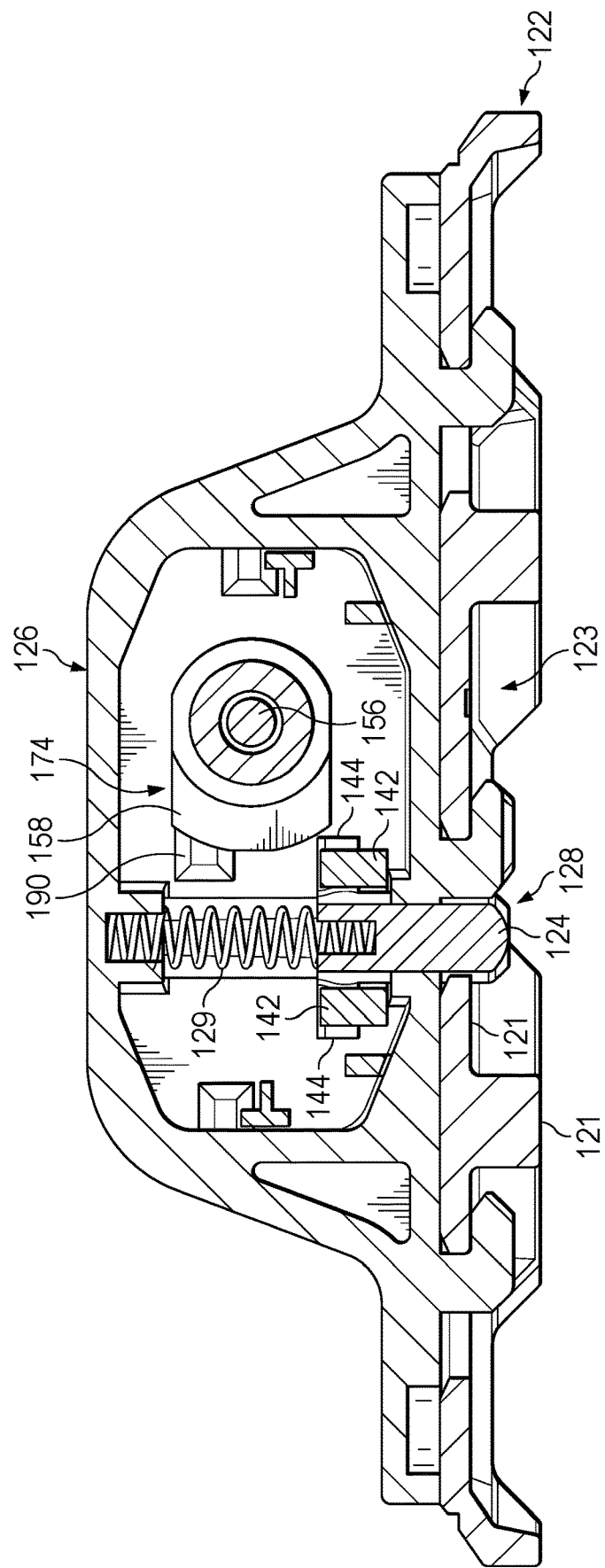
FIG. 36 is cross-section front view of the locking connector in a locked condition according to some embodiments.
Figure 37:
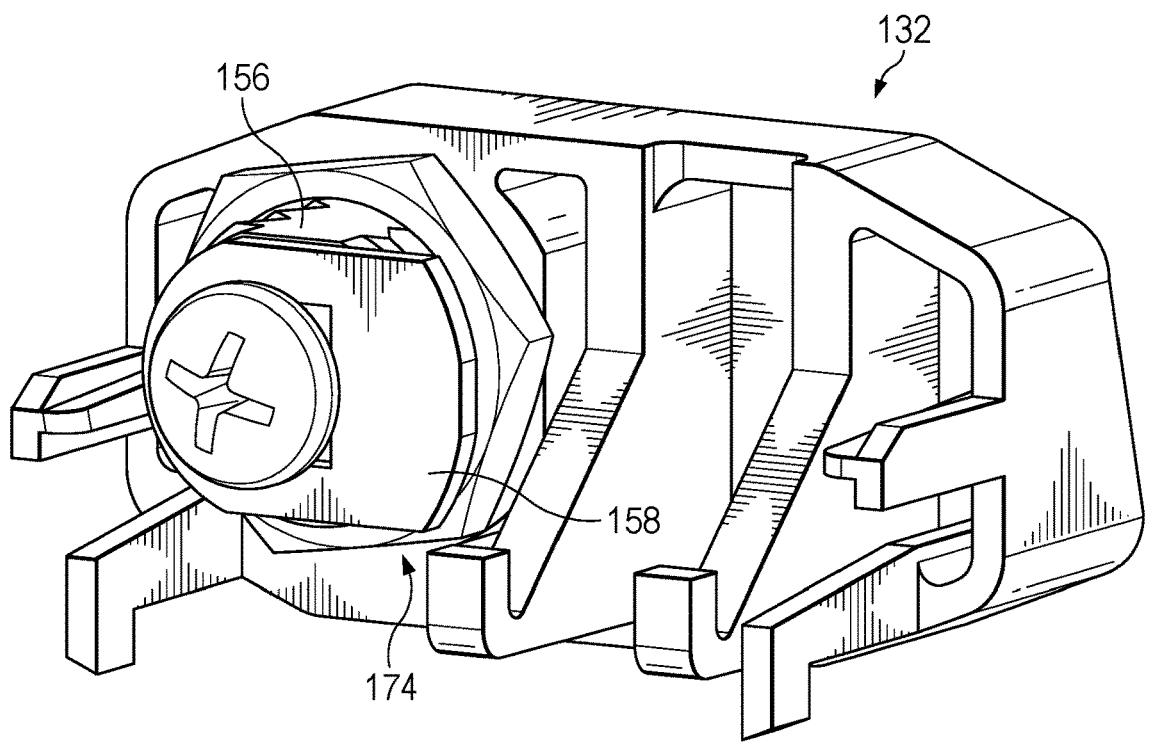
FIG. 37 is a rear perspective view of a locking release actuator with the lock in a locking position according to some embodiments.
Figure 38:
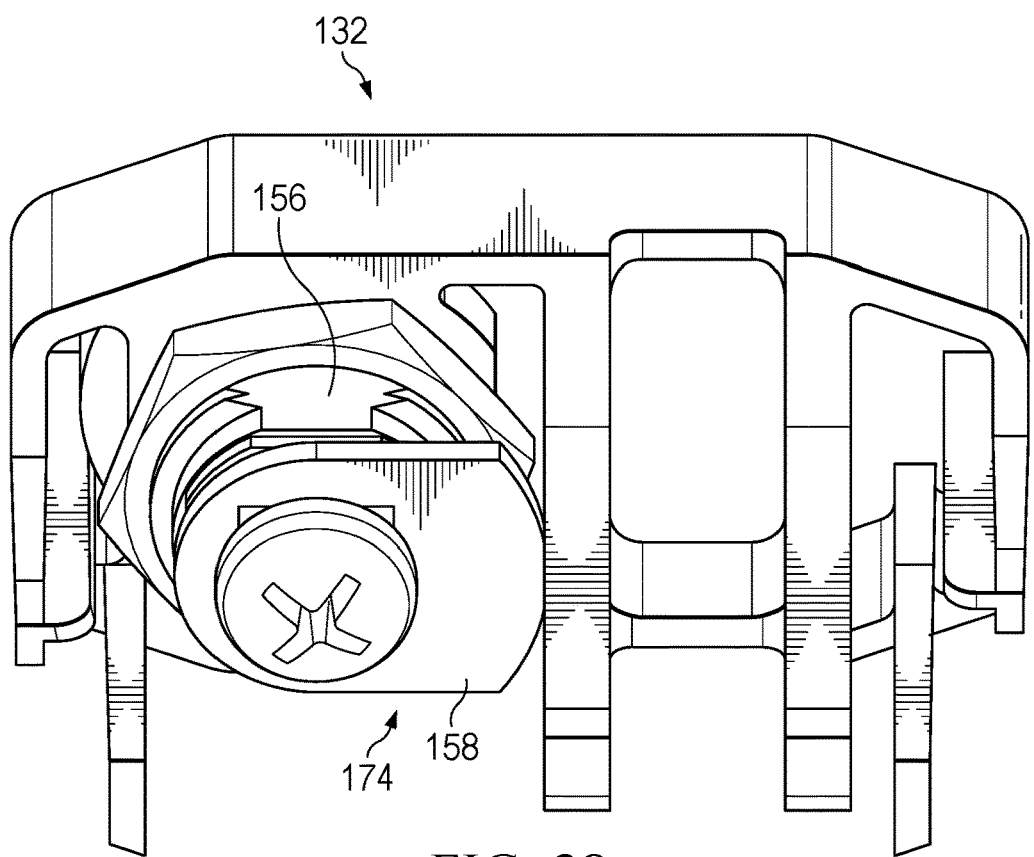
FIG. 38 is another rear perspective view of the locking release actuator with the lock in a locking position according to some embodiments.
Figure 39:
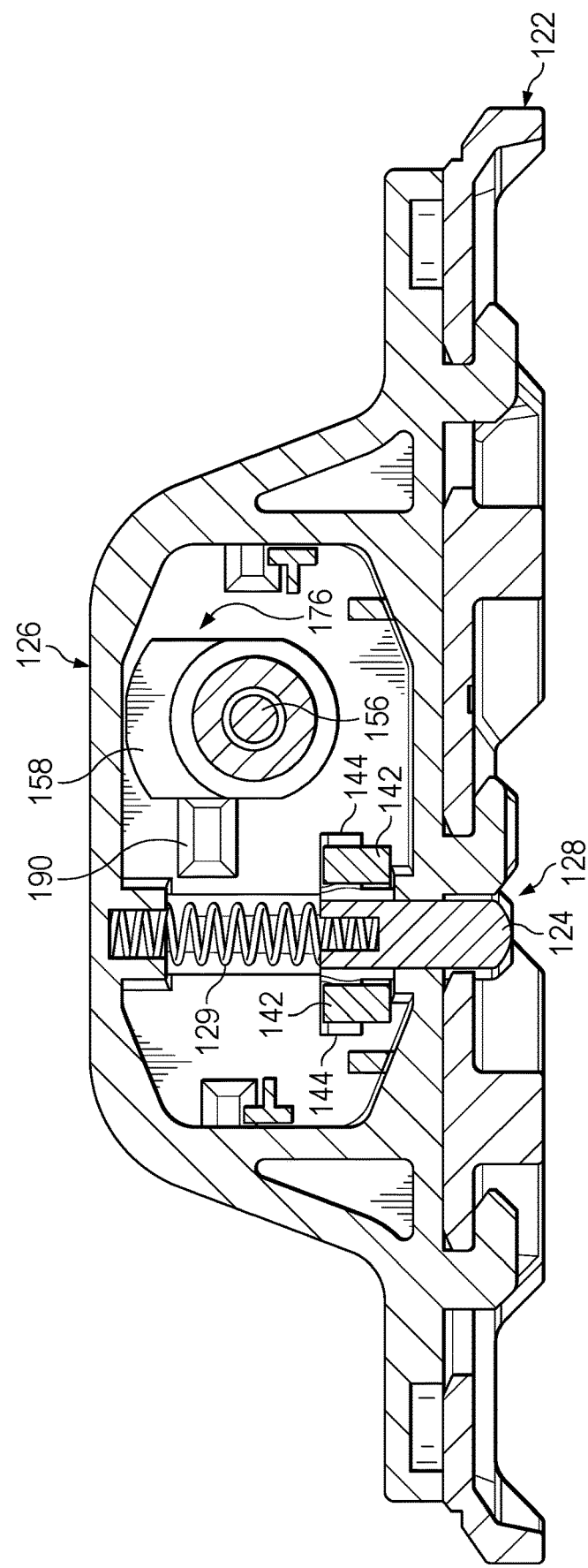
FIG. 39 is cross-section perspective view of the locking connector in an unlocked condition with a locking pin in a locking position according to some embodiments.
Figure 40:
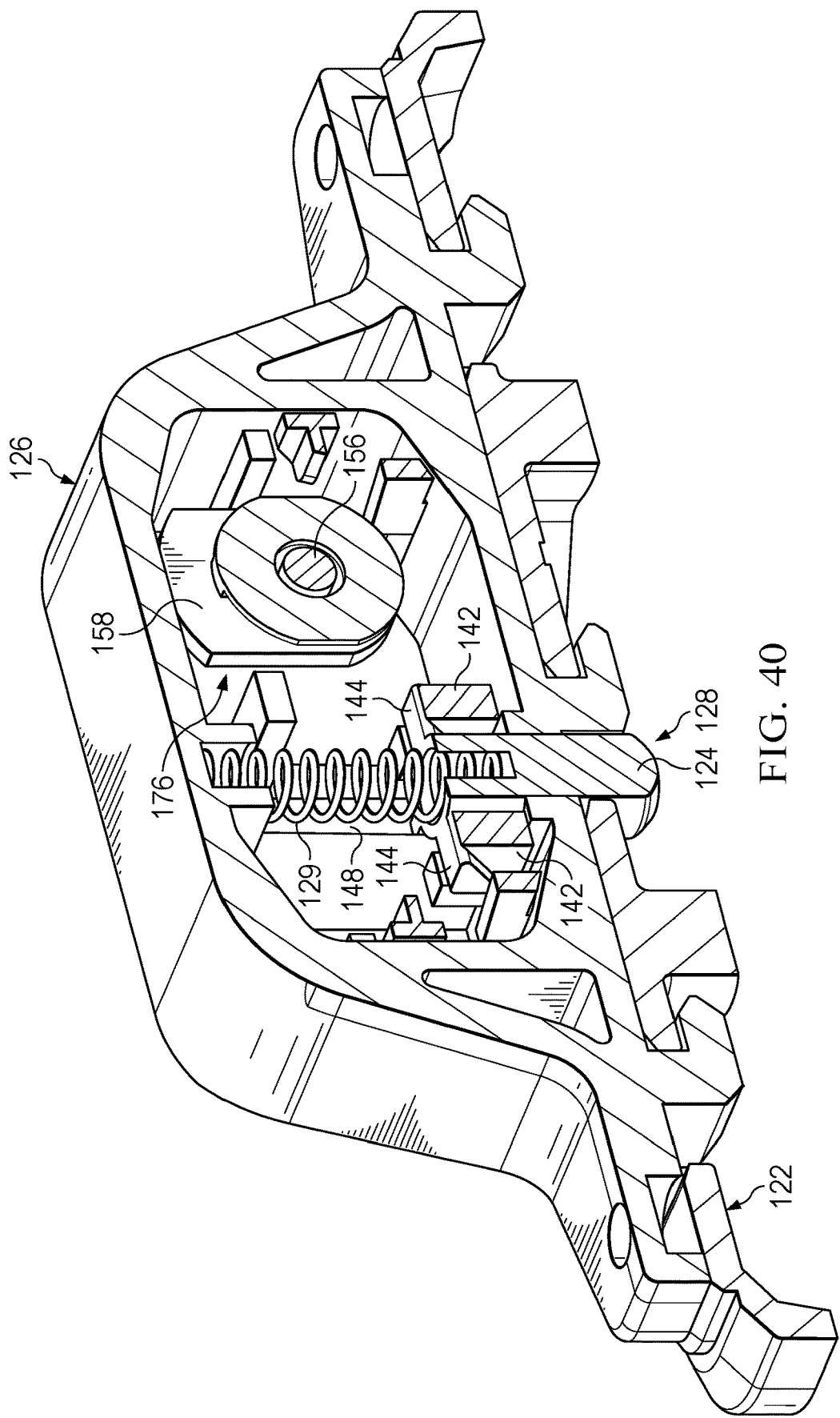
FIG. 40 is cross-section front view of the locking connector in the unlocked condition with the locking pin in the locking position according to some embodiments.
Figure 41:
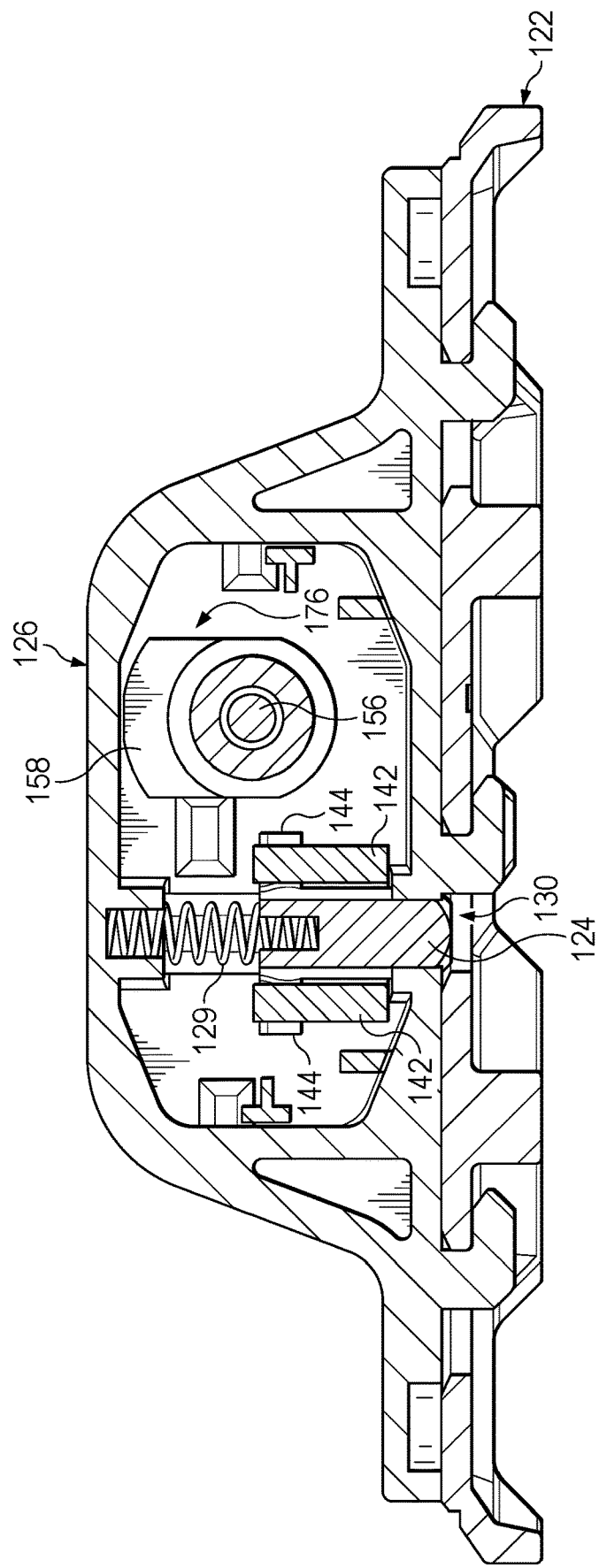
FIG. 41 is cross-section perspective view of the locking connector in an unlocked condition with the locking pin in a release position according to some embodiments.
Figure 42:
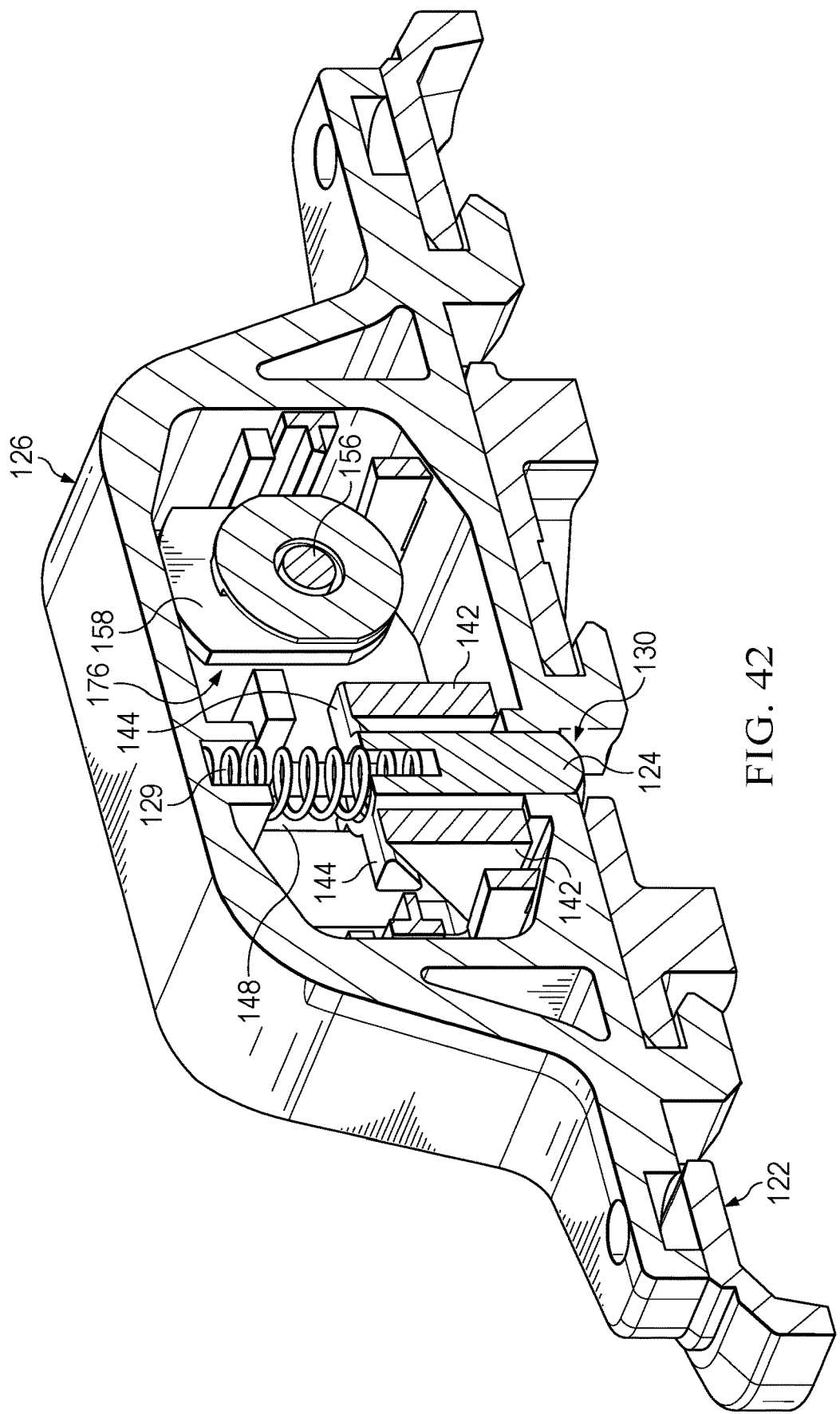
FIG. 42 is cross-section front view of the locking connector in the unlocked condition with the locking pin in the release position according to some embodiments.

The connector 110 may include a keyed lock 154, shown in FIG. 3. The cylinder 156 of the keyed lock 154 is connected to a moveable lock arm 158 that rotates to a horizontal position 174 so that it engages a locking protrusion 190 in the connector housing 126 thereby acting as a stop to prevent the release actuator 132 from moving from the resting position 150 to the clearance position 152 as shown in FIGS. 34-36. The keyed lock 154 and the lock arm 158 are configured to inhibit unauthorized activation of the connector 110 and removal of the accessory 102 from the vehicle when the lock arm 158 is in the horizontal position 174. When the lock arm 158 is moved a vertical position 176, the lock arm 158 is removed from the path of the locking protrusion 190 and the release actuator 132 may move from the resting position 150 to the clearance position 152 as shown in FIGS. 39-42.

As illustrated in FIGS. 6 and 36, a bottom surface 121 of the mounting bracket 122 may form one or more cavities 123 with the tunnel 104, according to some embodiments. The one or more cavities 123 may be configured to house the post portion 114, the connecting pin 112, and/or the locking pin 124 of the connector 110. In other words, a portion of the bottom surface 121 of the mounting bracket 122 abuts the tunnel 104 and a portion of the bottom surface 121 of the mounting bracket 122 is raised from the surface of the tunnel 104 to define a gap therebetween for receiving the connecting pin 112 and the locking pin 124. The post portion 114, the connecting pin 112, and/or the locking pin 124 of the connector 110 may engage with the bottom surface 121 of the mounting bracket 122.

Figure 43:
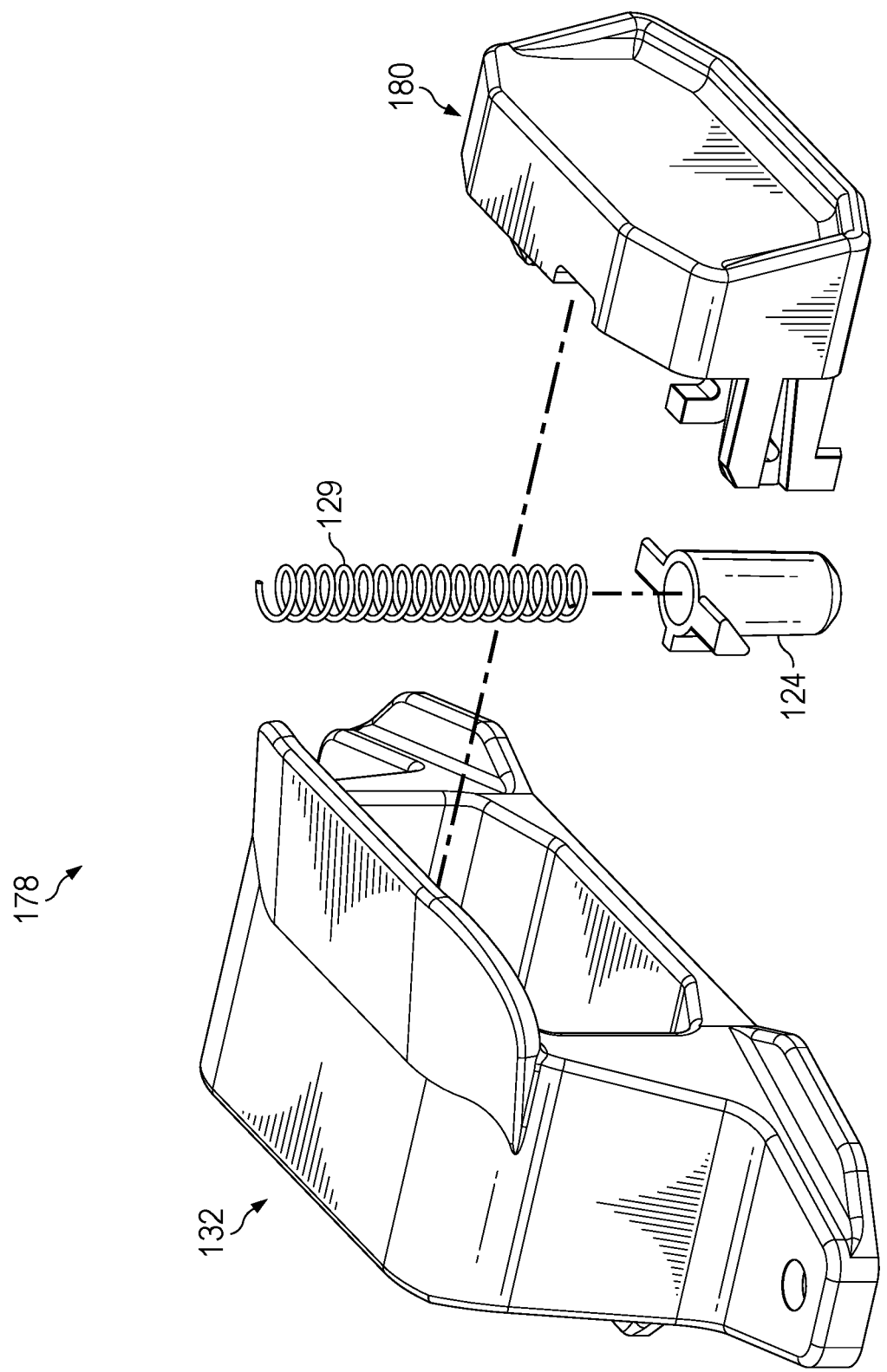
FIG. 43 is an exploded view of a nonlocking connector according to some embodiments.
Figure 44:
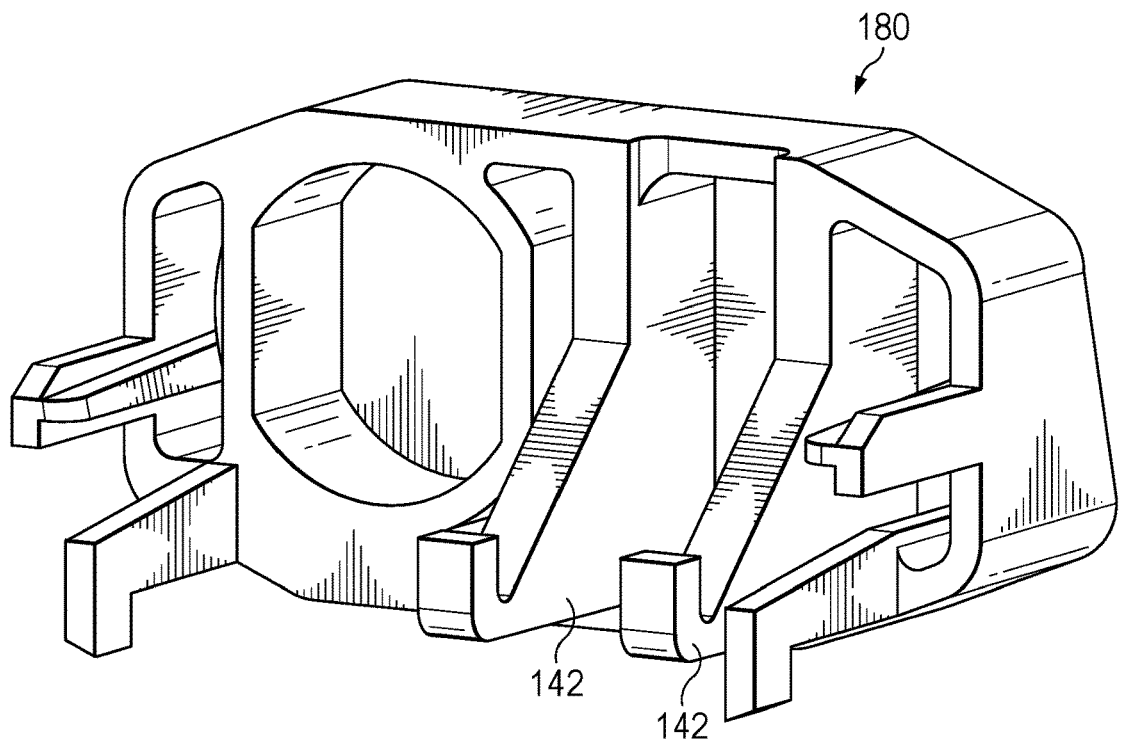
FIG. 44 is a rear perspective view of a nonlocking release actuator according to some embodiments.
Figure 45:
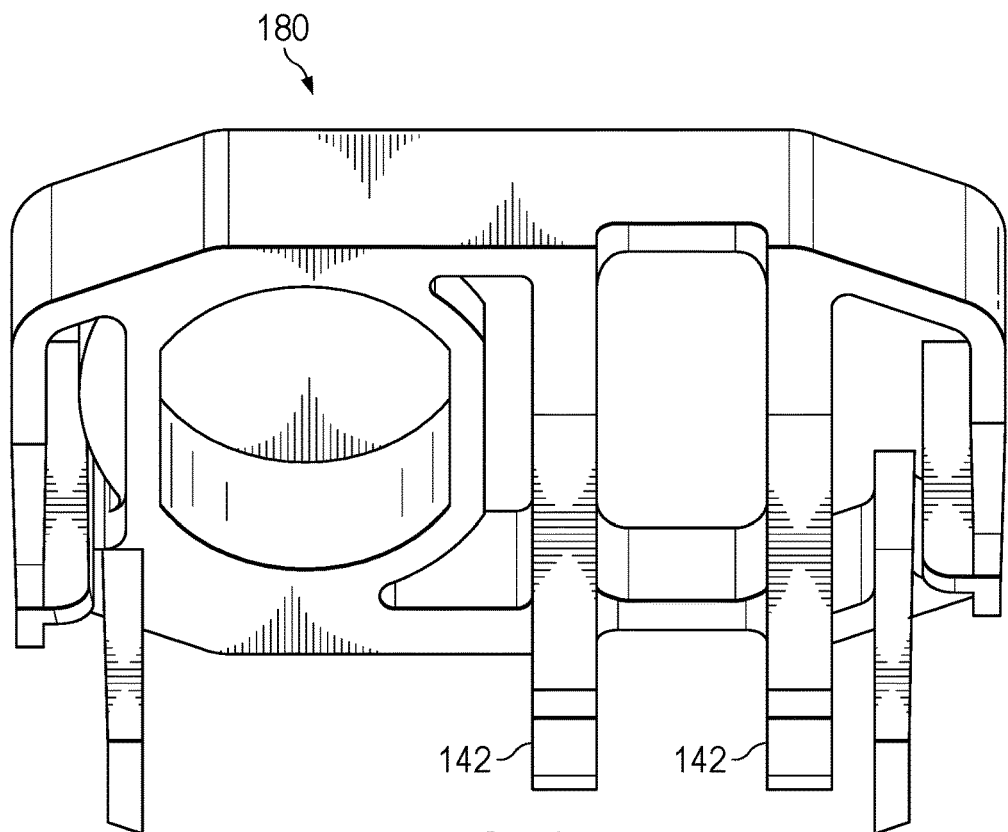
FIG. 45 is another rear perspective view of the nonlocking release actuator according to some embodiments.
Figure 46:
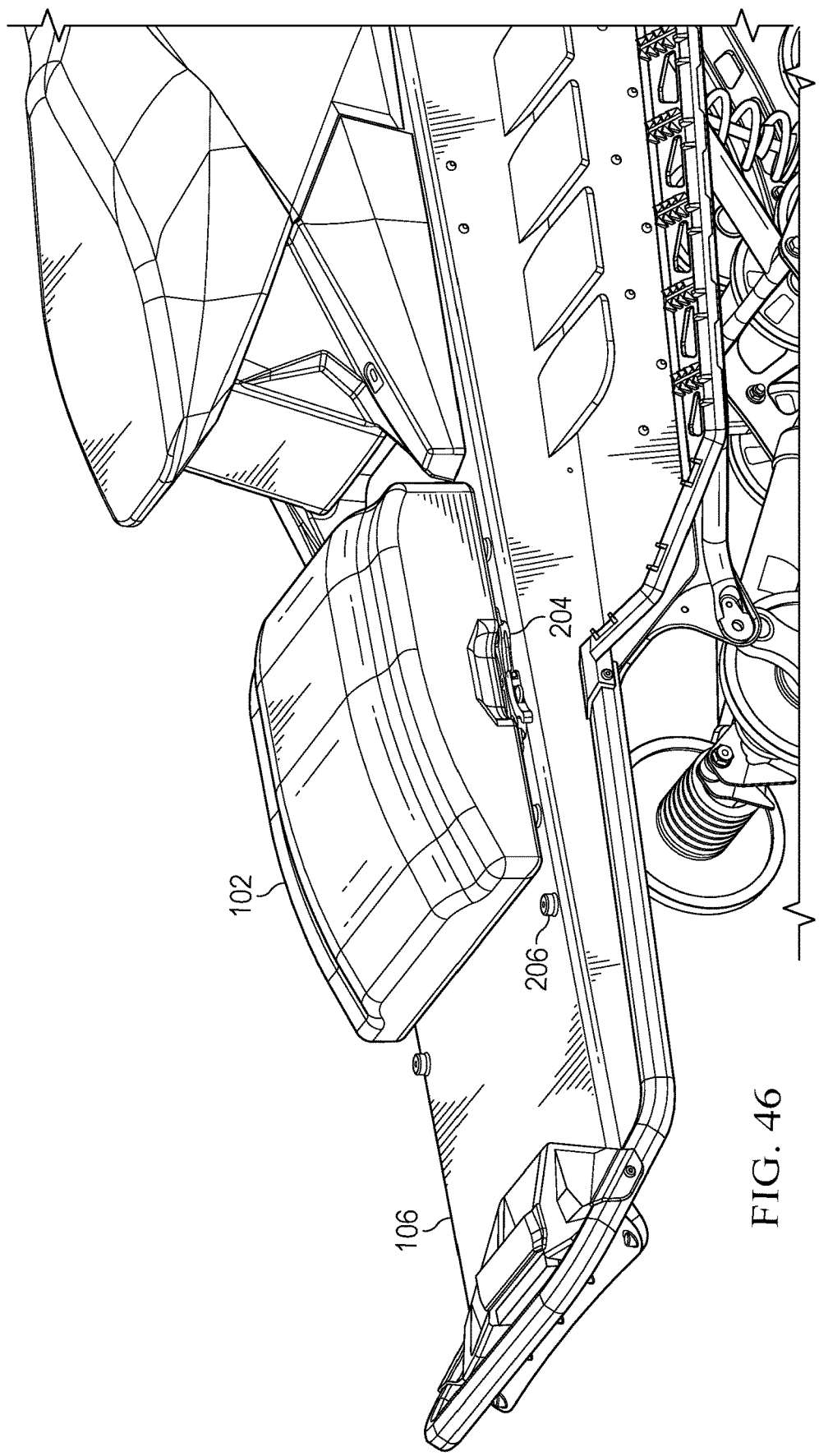
FIG. 46 is a perspective view of another accessory attached to the vehicle by the accessory attachment system according to some embodiments.
Figure 47:
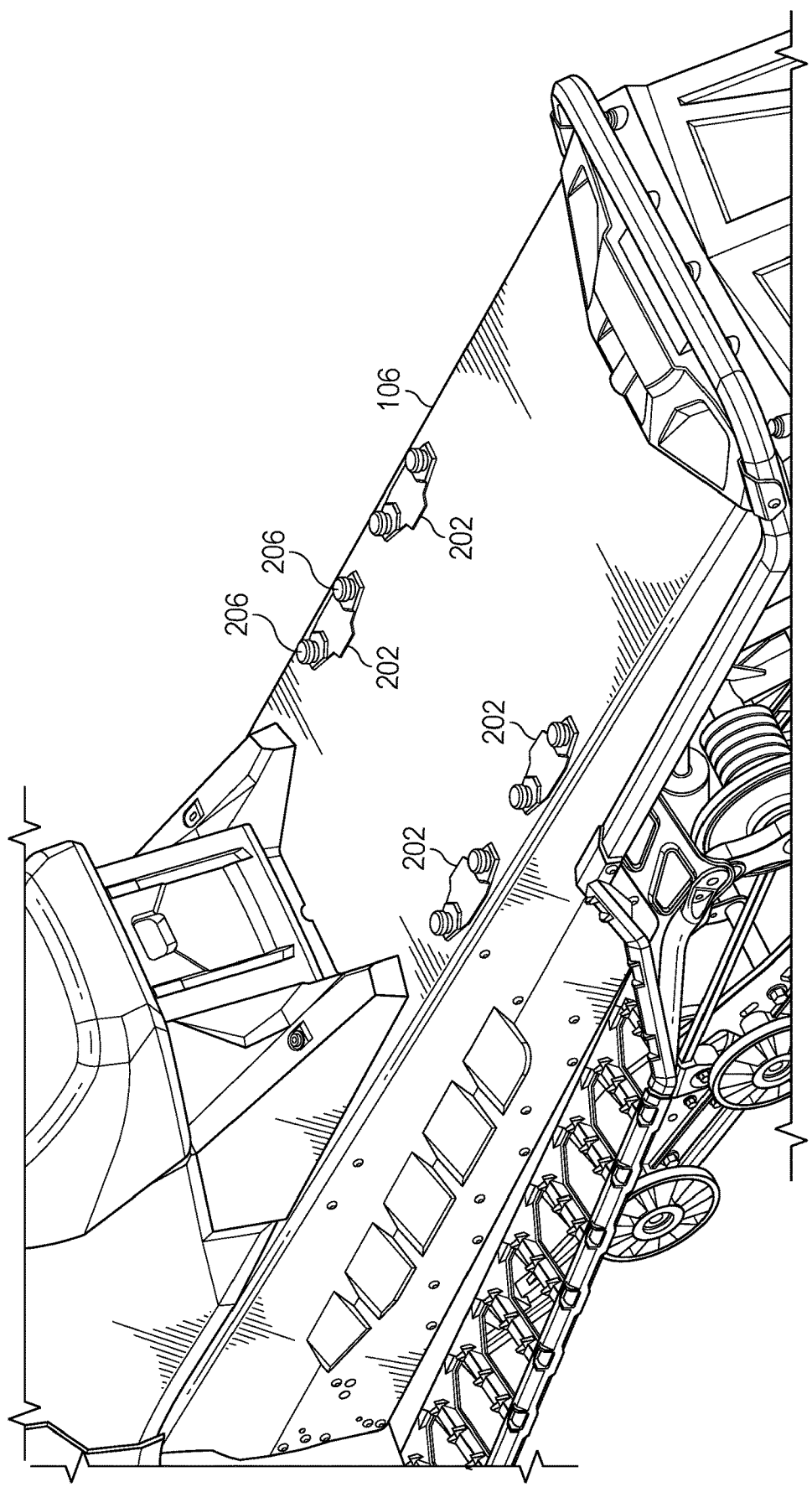
FIG. 47 is a perspective view of brackets of the accessory attachment system attached to a vehicle according to some embodiments.
Figure 48:
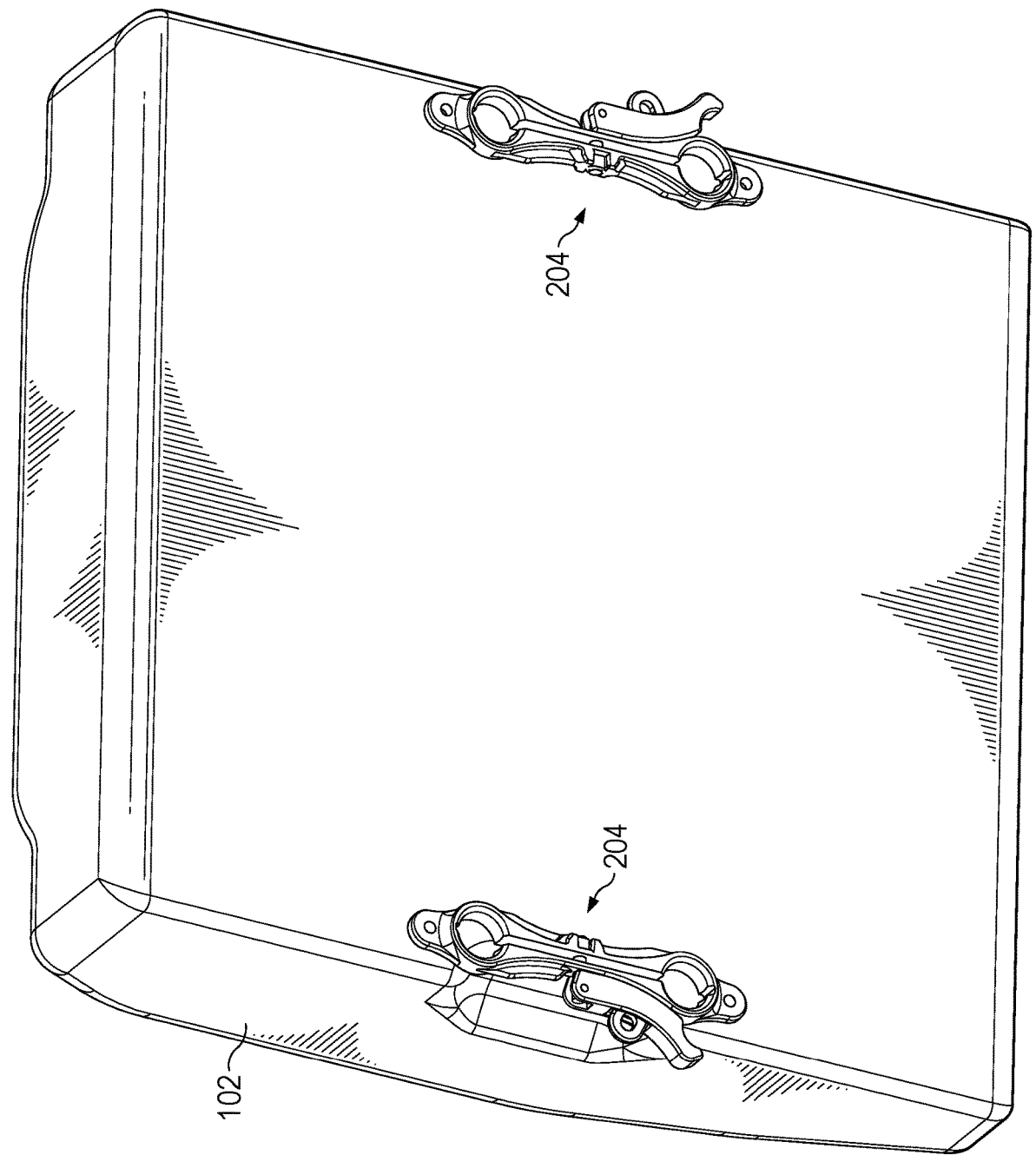
FIG. 48 is a bottom view of the accessory and connectors of the accessory attachment system according to some embodiments.
Figure 49:
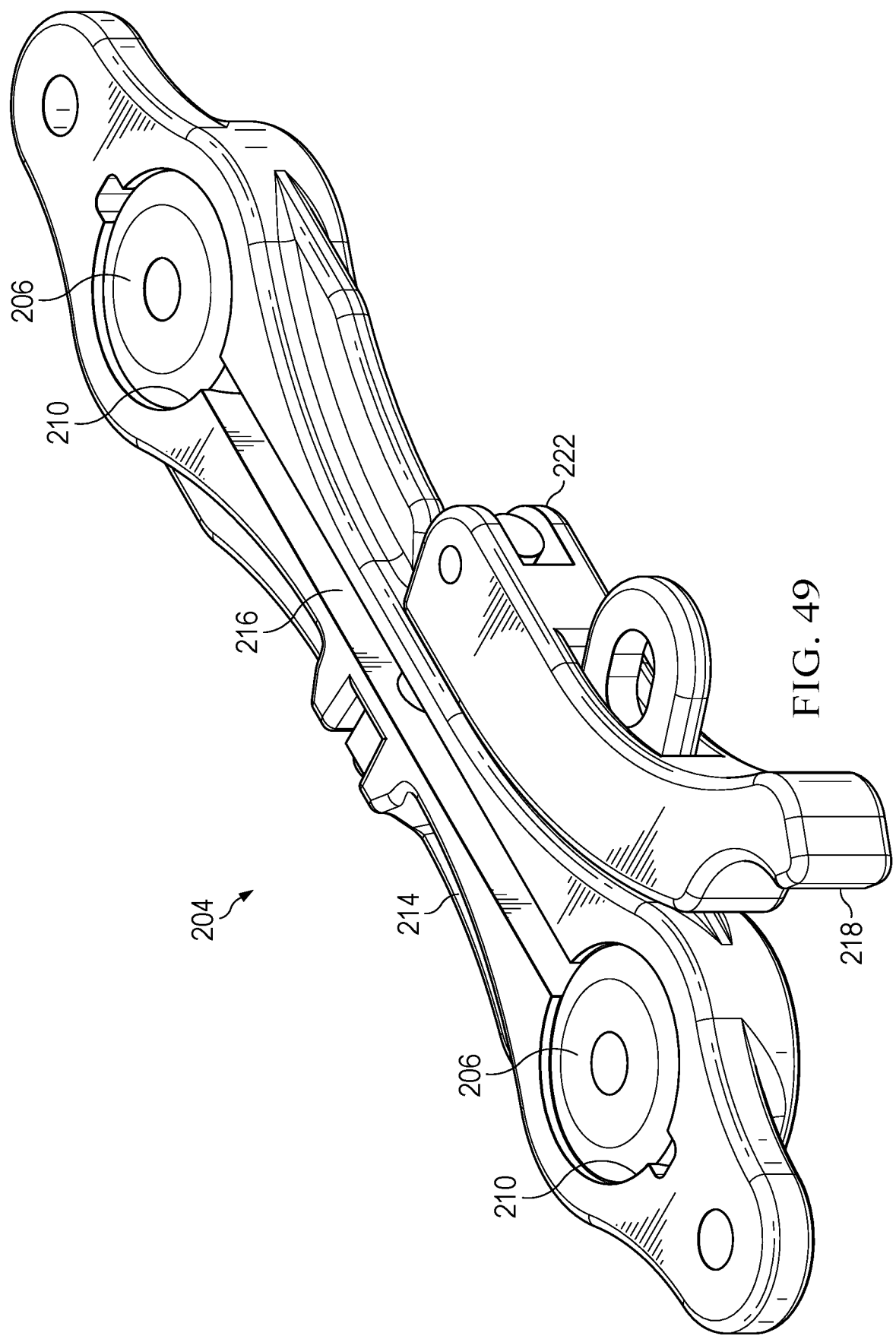
FIG. 49 is a perspective view of a connector of the accessory attachment system according to some embodiments.
Figure 50:
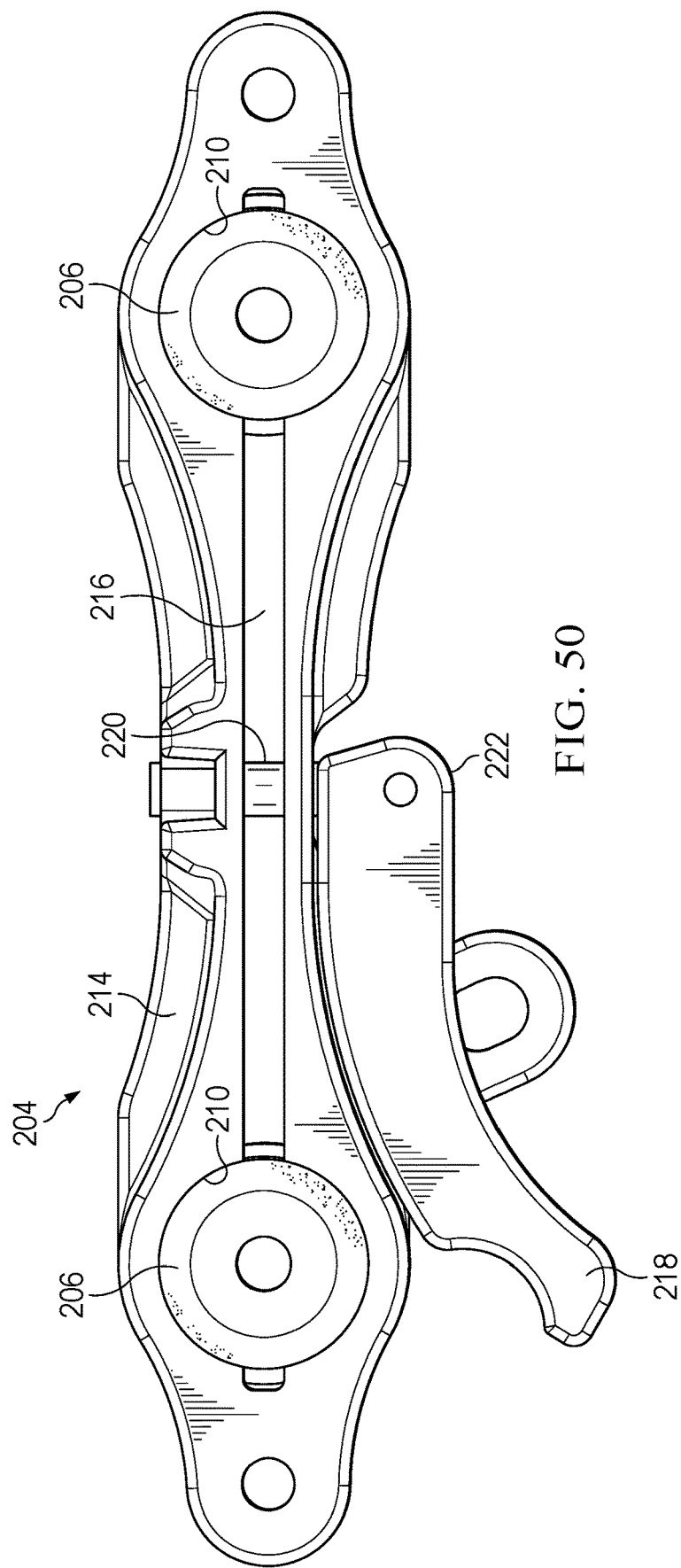
FIG. 50 is a top view of a connector according to some embodiments.
Figure 51:
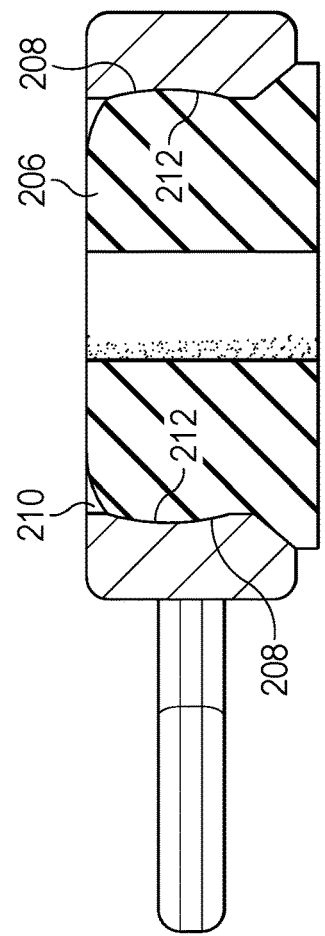
FIG. 51 is a cross-section view of the accessory attachment system according to some embodiments.

It may be desirable to use a keyed lock in only one connector in a pair of connectors to simplify operation and reduce cost of the accessory attachment system, since only one lock is needed to prevent removal of all connectors attached to a single accessory from their corresponding mounting brackets. An example of such a non-lockable connector 178 is shown in FIGS. 43-45. The connector 178 has all of the features of the connector 110 except for the keyed lock and moveable arm is missing from the release actuator 180 along with the mounting hole for the keyed lock.

The accessory attachment system may include pairs of connectors and mounting brackets 122 located on each side of the accessory 102. In a non-limiting example, to simplify operation, the lockable connector 110 having the keyed lock 154 may be installed on only one side of the accessory 102 and the non-lockable connector 178 may be installed on the other side of the accessory 102.

For embodiments having more than one pair of connectors 110, 178, the additional pairs of connectors may include the connecting pins 112 but may optionally lack a release actuator and movable pin, thereby providing additional attachment points between the accessory and the vehicle without the need to manually operate the release actuators on more than two connectors, thereby allowing two handed operation of the accessory attachment system.

In an illustrative example, the connector 110 is attached to the mounting bracket 122 by first inserting the connecting pins 112 into the apertures 120. As the connecting pins 112 are inserted into the apertures 120 of the mounting bracket 122, the locking pin 124 is depressed into the release position 130 in the connector housing 126 by the compressive force between the locking pin 124 and the upper surface of the mounting bracket 122. When the connecting pins 112 are fully inserted within the apertures 120, the connector 110 is moved, for example, slightly forward or rearward, to simultaneously position the cantilevered portion 118 underneath the bottom surface 121 of the mounting bracket and align the locking pin 124 with the aperture 120. The biasing member 129 then returns the locking pin 124 into the locking position 128 so that the locking pin 124 automatically extends into the aperture 120 when aligned therewith. This causes the connector 110 to be attached to the mounting bracket 122 by engaging the cantilevered portions 118 at the end of the post portions 114 of the connecting pins 112 with the mounting bracket 122. The locking pin 124 is engaged with the portion of the mounting bracket 122 defining the aperture 120 and thus restricts the freedom of motion of the connecting pins 112 within the apertures 120 to lock the connector 110 in place. Accordingly, while the locking pin 124 is positioned in the aperture 120 the cantilevered portions 118 of the connecting pins 112 cannot be moved into alignment with the apertures 120, thereby preventing withdrawal of the connecting pins 112 from the mounting bracket 122. When the release actuator 132 is engaged, the locking pin 124 recedes back into the release position 130, thereby allowing the connector 110 to be moved into a position freeing the motion of the connecting pins 112 and the connector 110 with respect to the mounting bracket 122 and allowing the cantilevered portions 118 to be aligned with the apertures 120. The connector 110 may then be lifted from the mounting bracket 122 to remove the connecting pins 112 from the apertures 120 thereby detaching the connector 112 from the mounting bracket 122.

Figure 13:
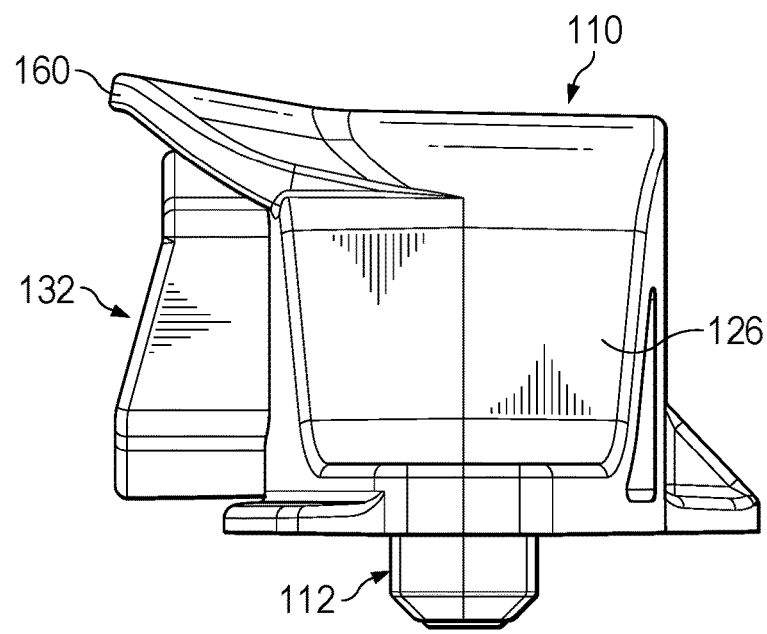
FIG. 13 is side view of a connector of the accessory attachment system according to some embodiments.
Figure 14:
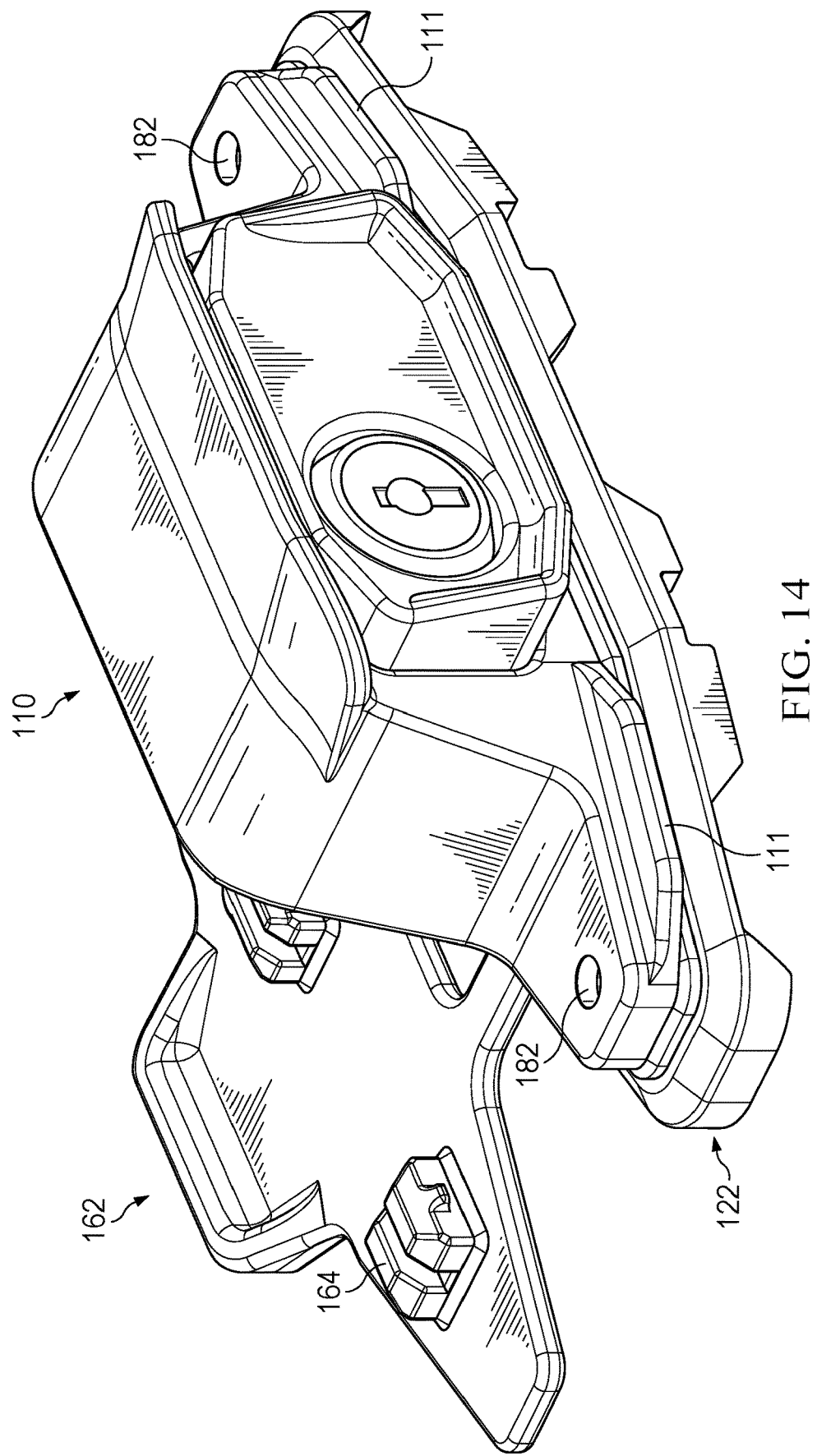
FIG. 14 is perspective view of the accessory attachment system according to some embodiments.
Figure 15:
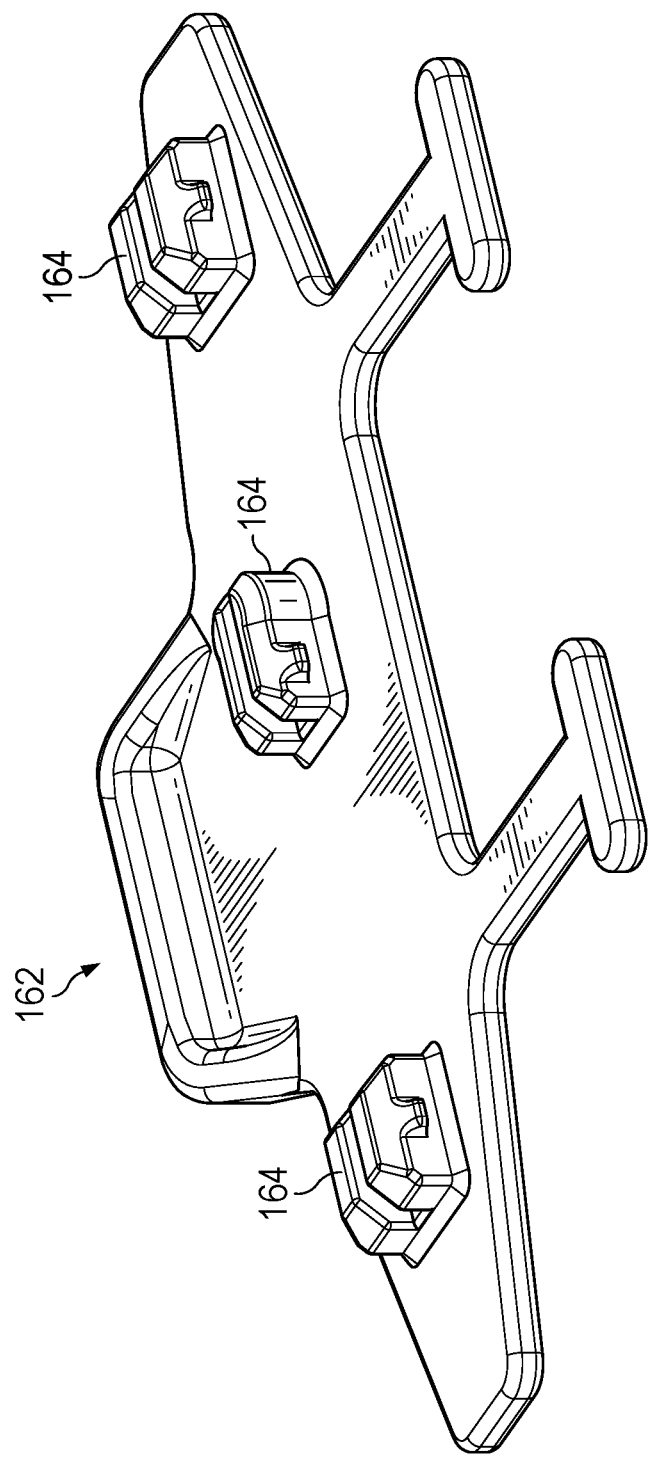
FIG. 15 is perspective view of a cover of the accessory attachment system according to some embodiments.
Figure 16:
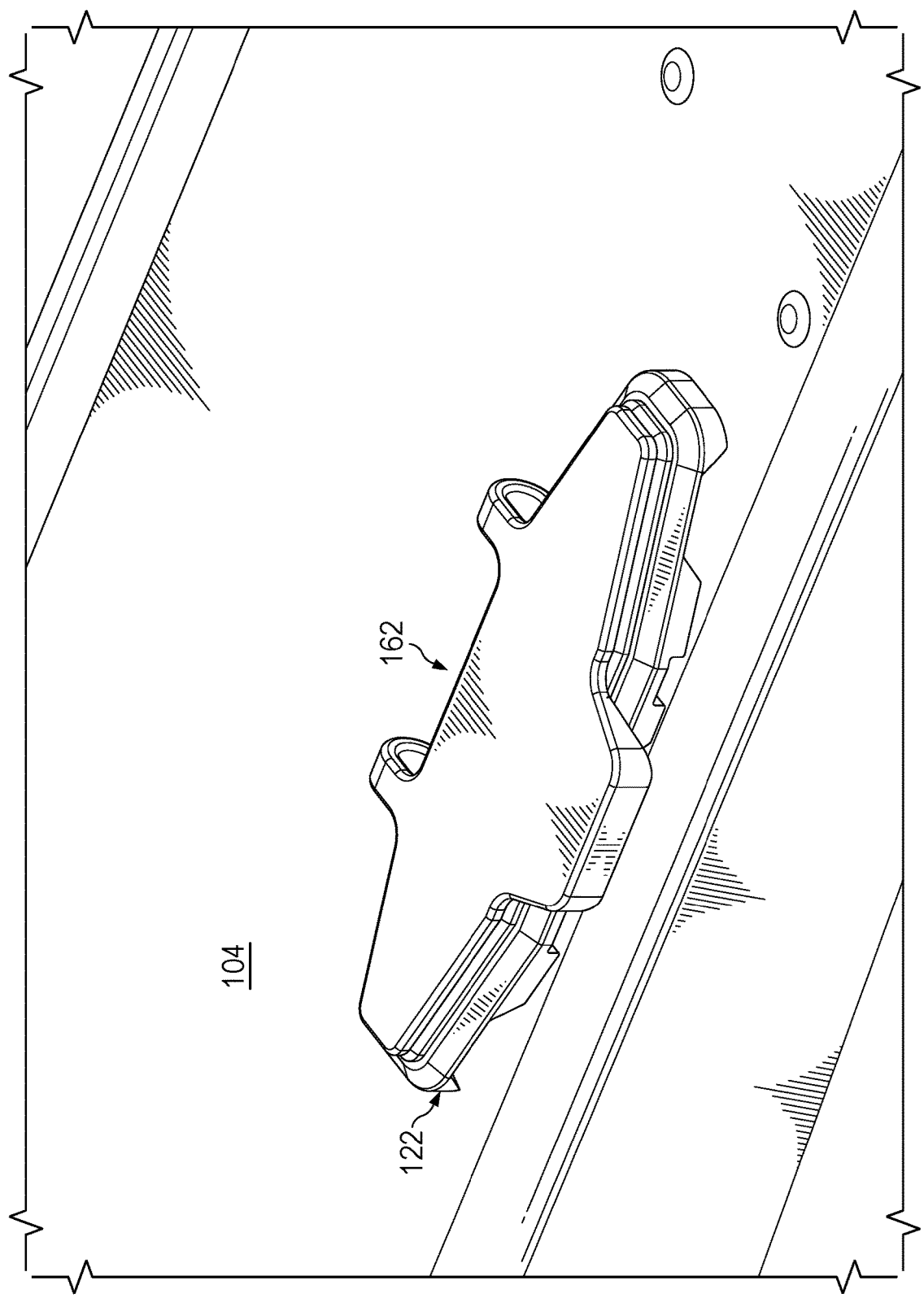
FIG. 16 is a perspective view of a cover engaged with the bracket according to some embodiments.
Figure 17:
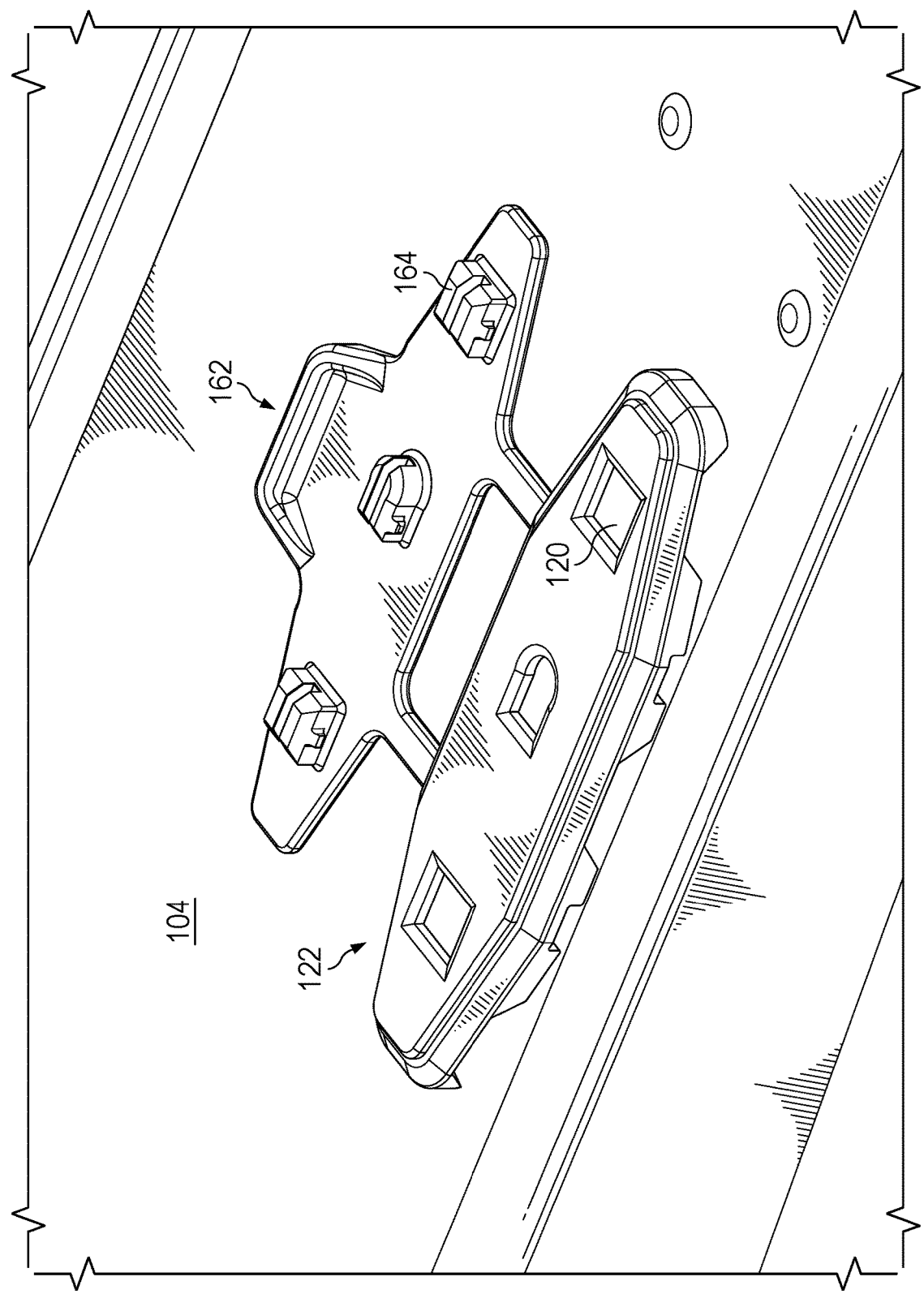
FIG. 17 is a perspective view of the cover disengaged from the bracket according to some embodiments.

The connector housing 126 may define a ledge 160, best shown in FIG. 13, that protrudes over the release actuator 132 and may be used by an operator as a grabbing surface or handle to remove the accessory 102 from the vehicle when the release mechanism is in the resting position 150 or the clearance position 152. In some embodiments, the ledge 160 may extend further outboard than the release actuator 132 and act as a shield to prevent abrasions, scuffing, or other impact forces from contacting the release actuator 132.

The mounting bracket 122 may include a cover 162, shown in FIGS. 14-17, that is made of a resilient material such as EDPM rubber. The cover 162 has posts 164 that may be inserted within the apertures 120 in the mounting bracket 122 when the mounting bracket 122 is not being used with the connector 110. The resilient material forming the posts 164 provides a compressive fit between the post 164 and the apertures 120 to help retain the cover 162 in the apertures 120 and prevent intrusion of snow, mud, dirt, or other contaminants into the apertures that may interfere with the operation of the accessory attachment system when not occupied by the connector 110. In some embodiments, the cover 162 may include one or more elongate members configured to be secured between the top surface of the tunnel 104 and the bottom surface 121 of the mounting bracket 122. In some embodiments, the one or more cavities 123 formed between the tunnel and the bottom surface 121 of the mounting bracket 122 may receive the one or more elongate members of the cover 162.

The connector housing 126 may be attached to the accessory 102 by threaded fasteners or rivets inserted through a first accessory mounting feature including, but not limited to, one or more mounting holes 182 in the connector 110. Alternatively, the connectors 110 may be attached to the accessory 102 by adhesives. In yet another alternative, the connectors 110 may be integrally formed with the accessory 102.

Figure 21:
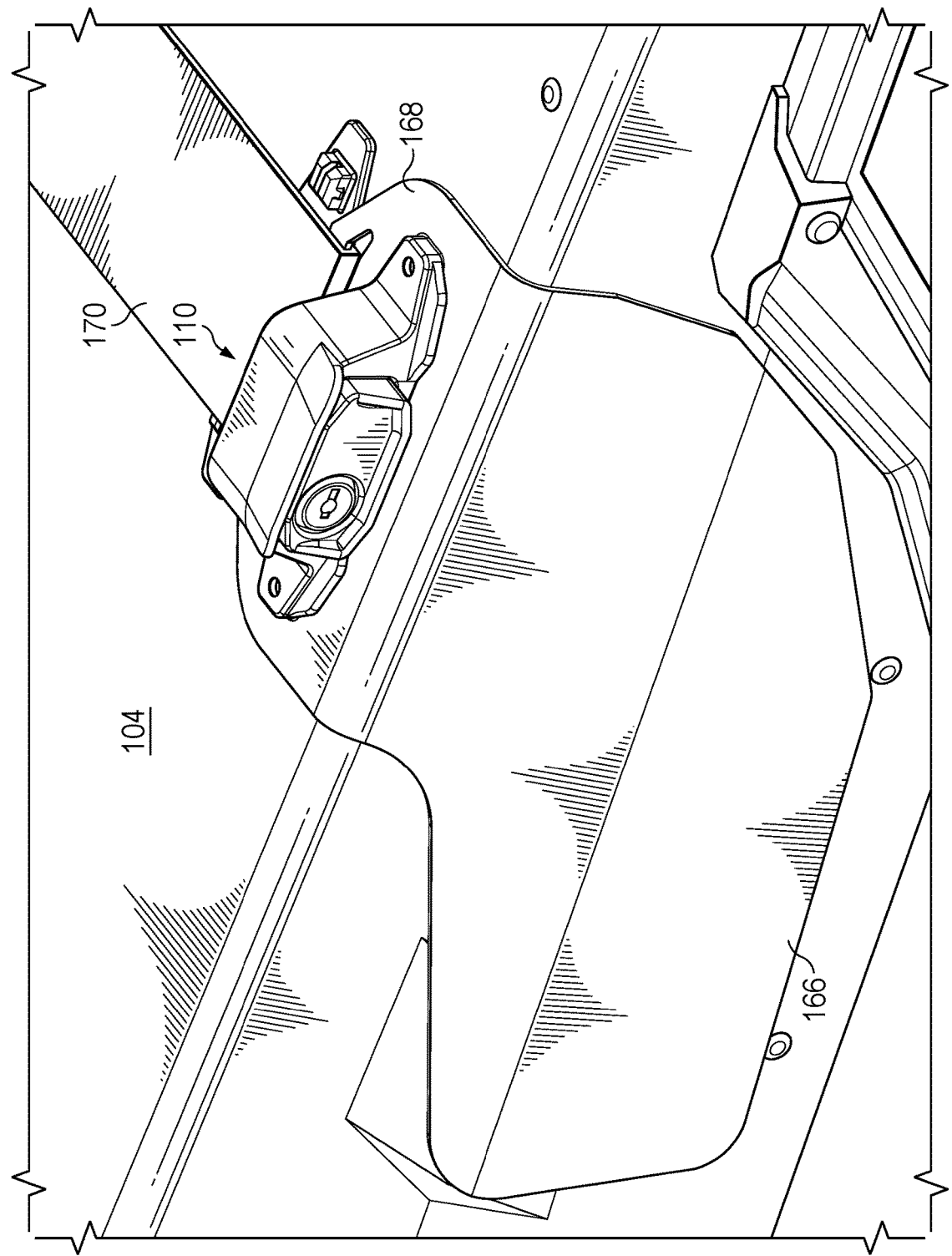
FIG. 21 is a perspective view of a frame assembly for a pair of saddlebag accessories according to some embodiments.
Figure 22:
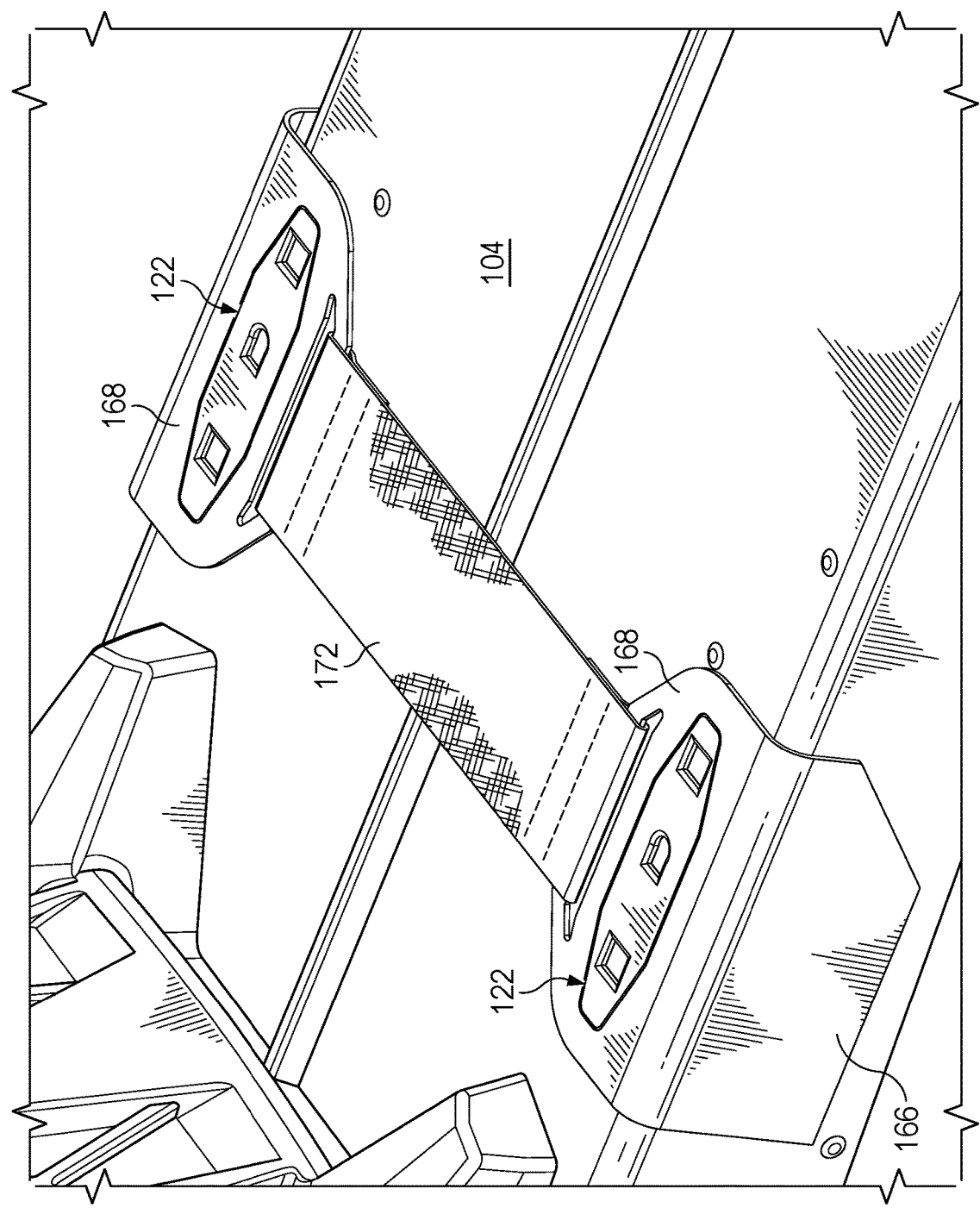
FIG. 22 is a perspective view of a frame assembly for a pair of saddlebag accessories according to some embodiments.
Figure 23:
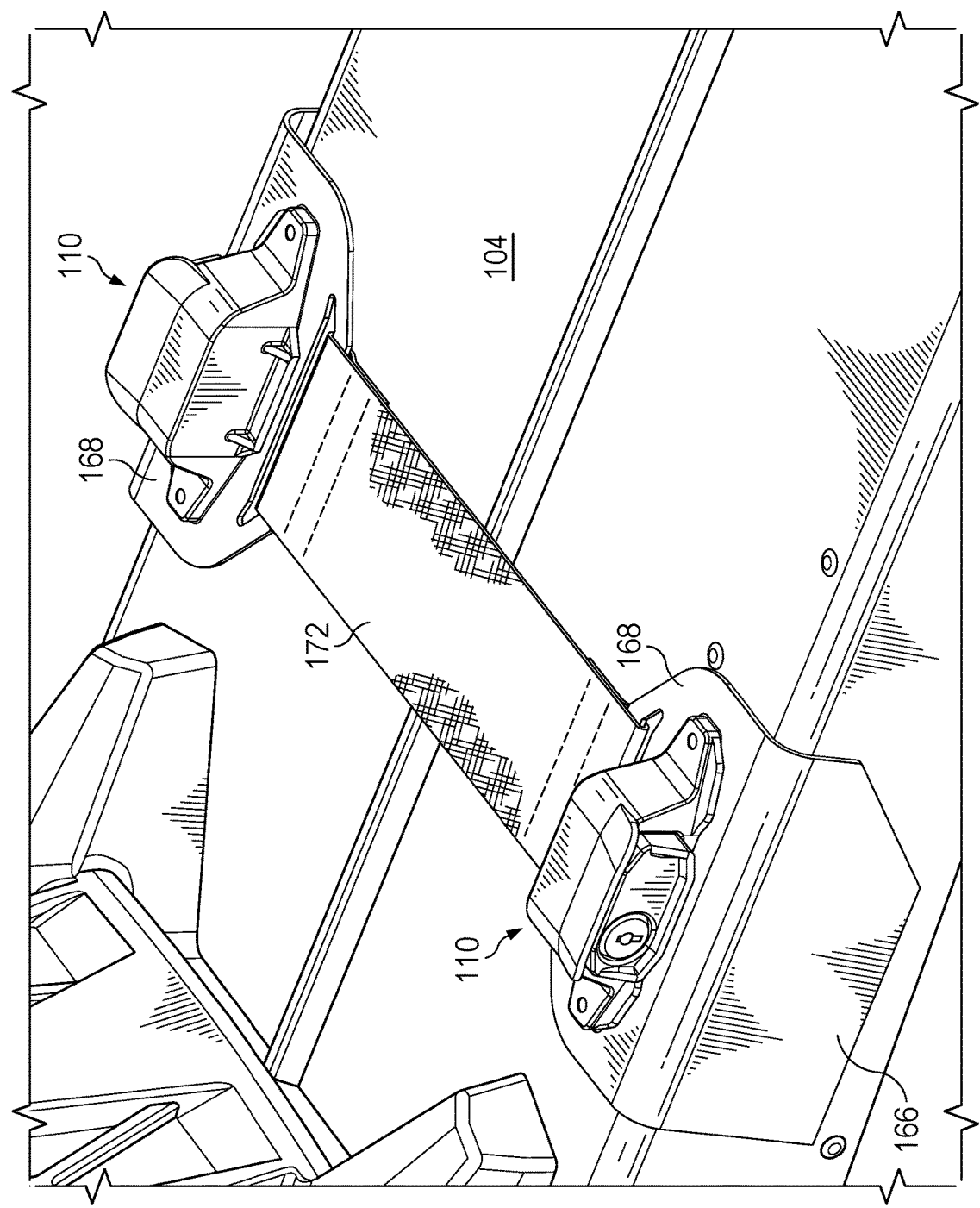
FIG. 23 is a perspective view of a frame assembly for a pair of saddlebag accessories according to some embodiments
Figure 24:
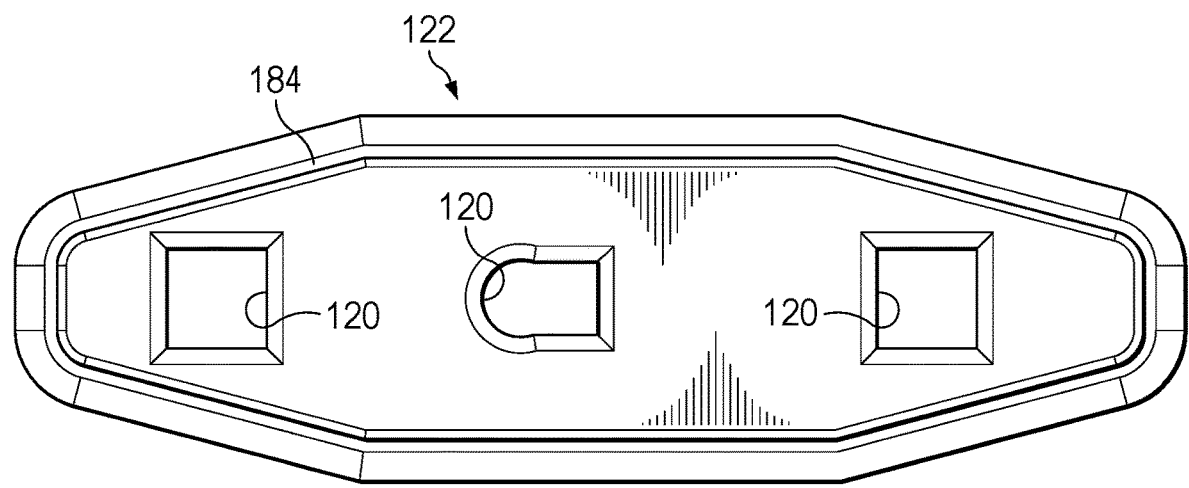
FIG. 24 is a top view of the mounting bracket according to some embodiments.
Figure 25:
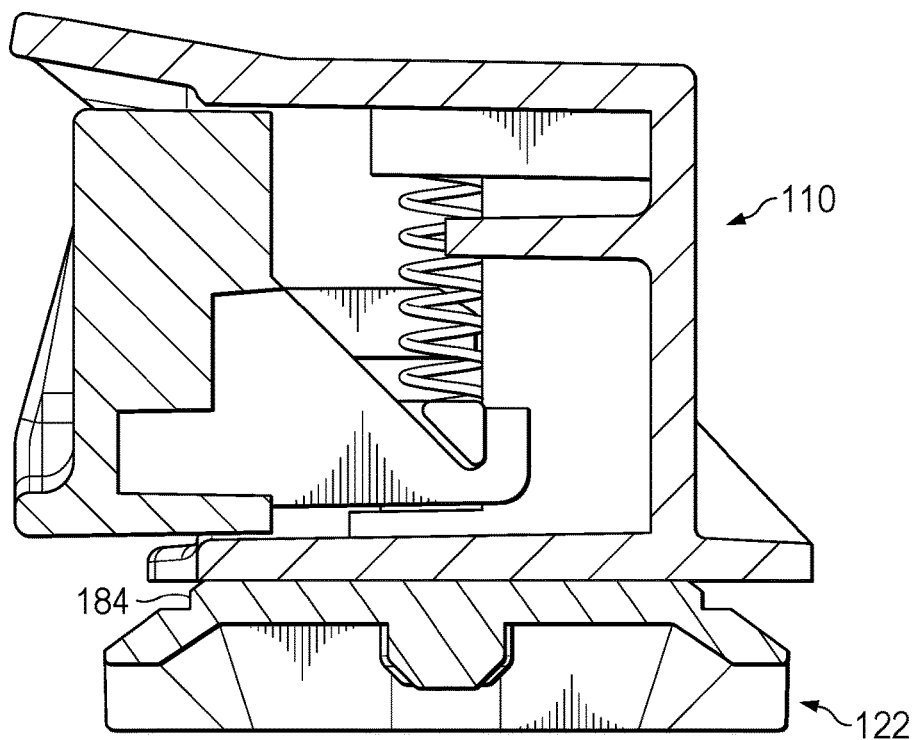
FIG. 25 is a cross section view of the connector and the mounting bracket according to some embodiments.
Figure 26:
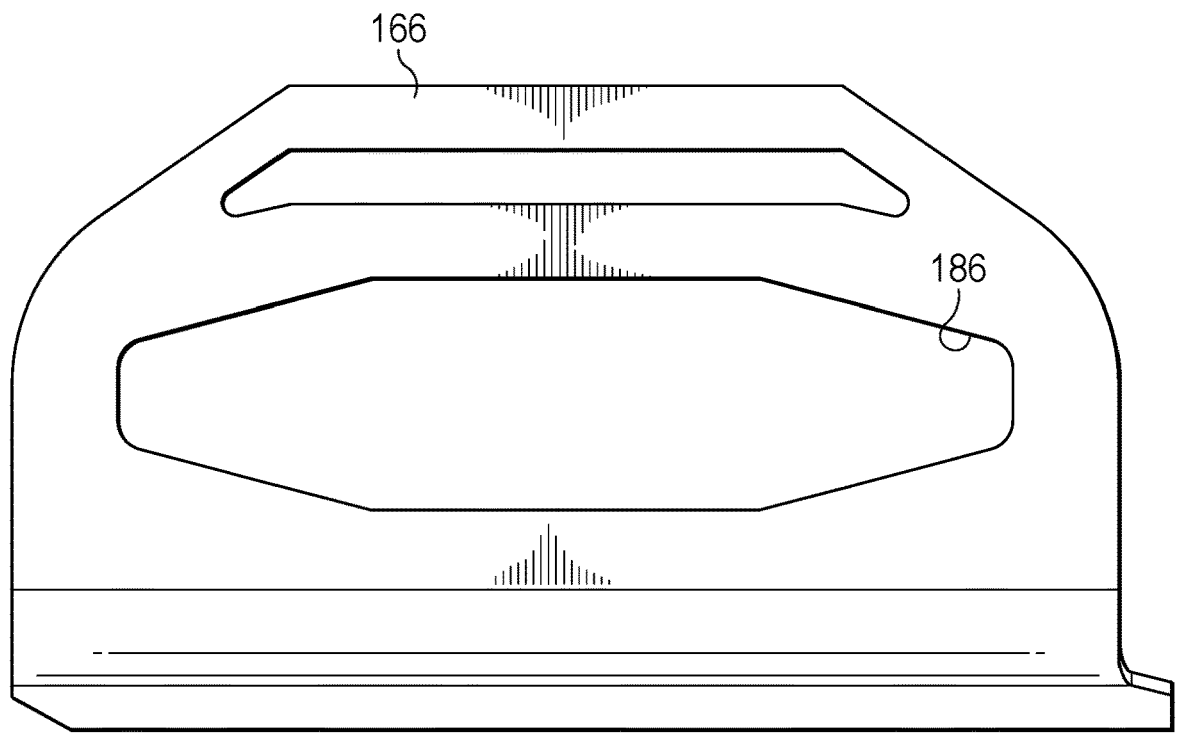
FIG. 26 is a top view of a frame assembly bracket for the pair of saddlebag accessories according to some embodiments.
Figure 27:
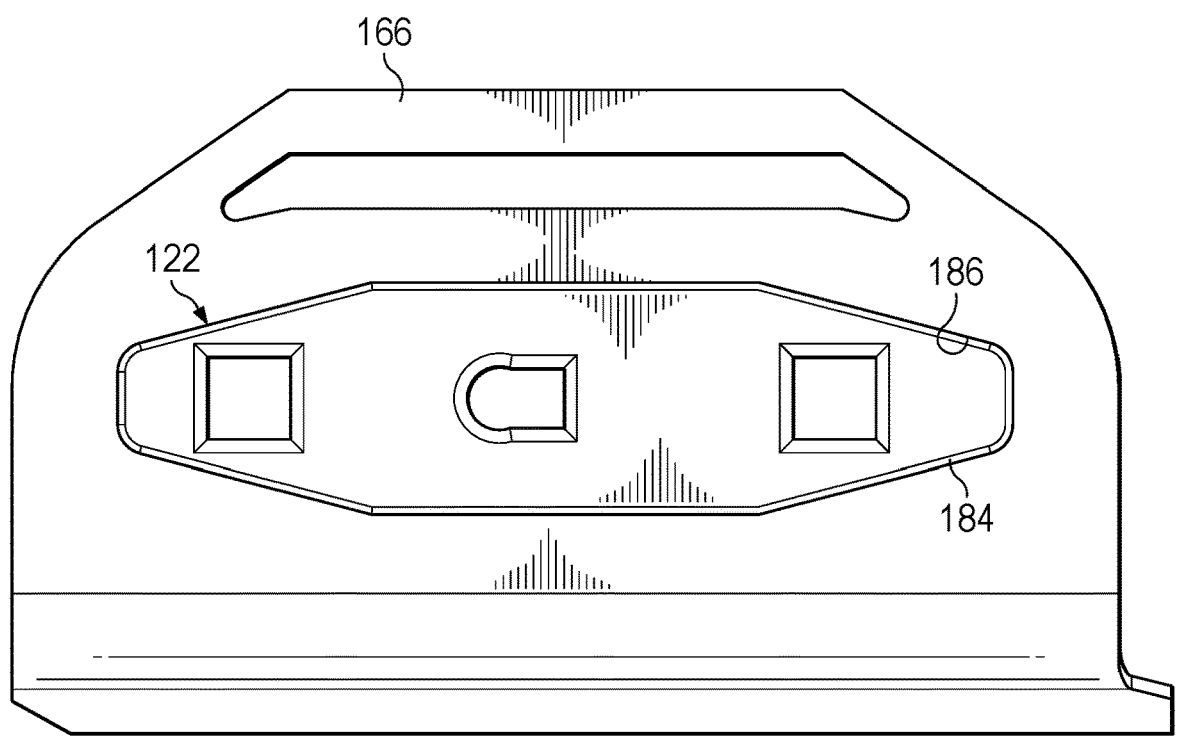
FIG. 27 is a top view of the mounting bracket disposed within an opening in the frame assembly bracket according to some embodiments.
Figure 28:
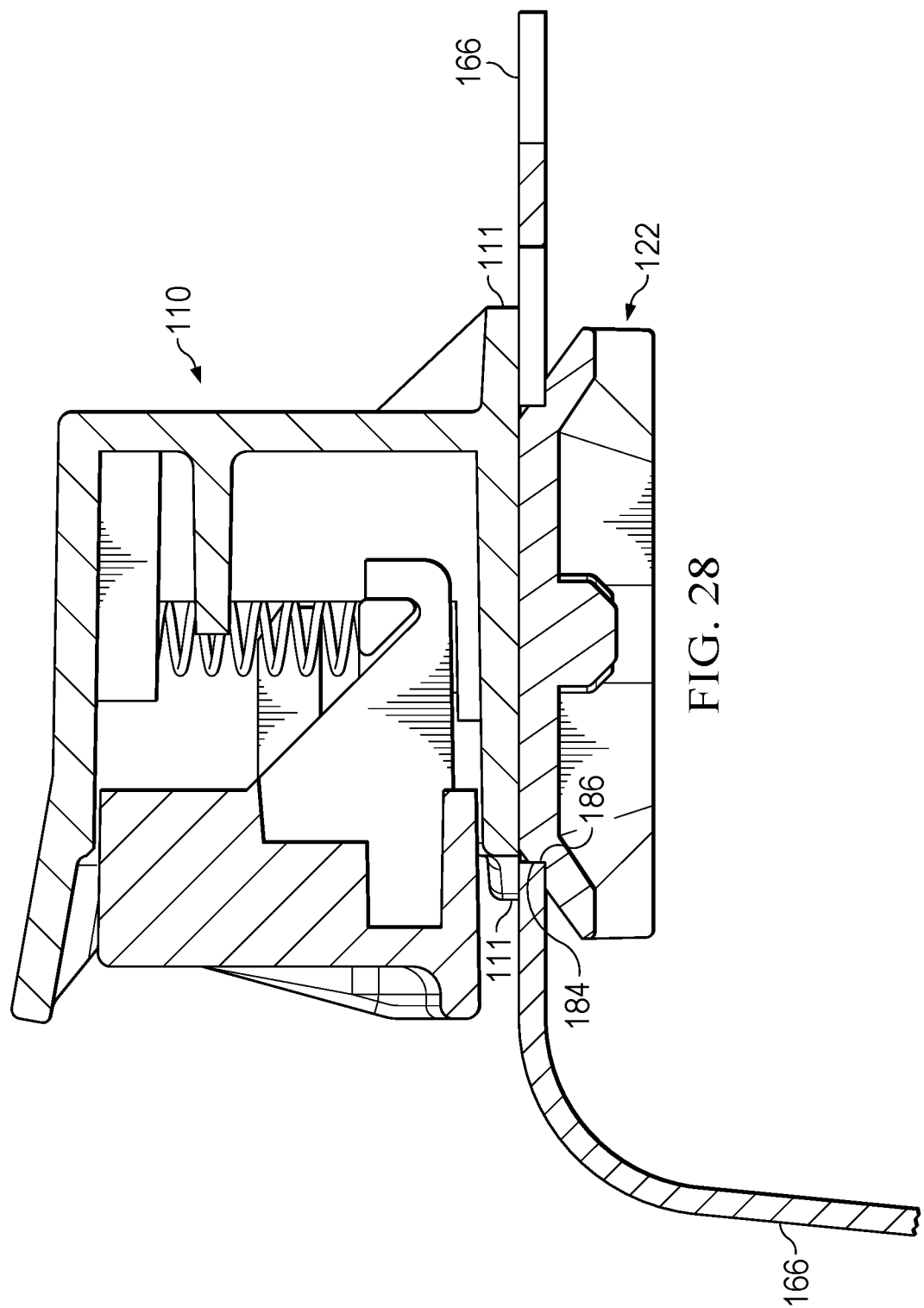
FIG. 28 is a cross section view of the frame assembly bracket located intermediate the connector and the mounting bracket according to some embodiments.
Figure 29:
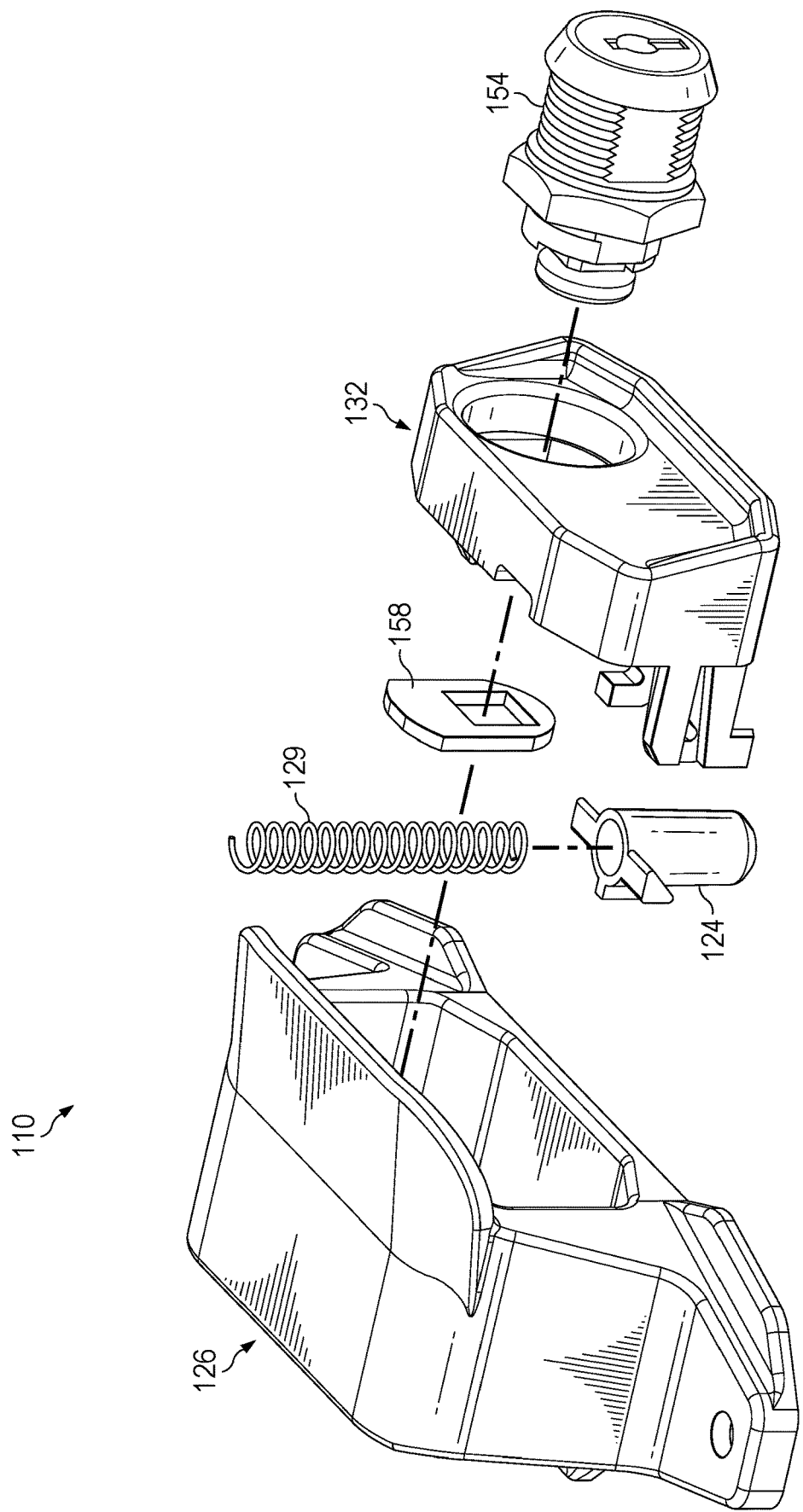
FIG. 29 is an exploded view of a locking connector according to some embodiments.
Figure 30:
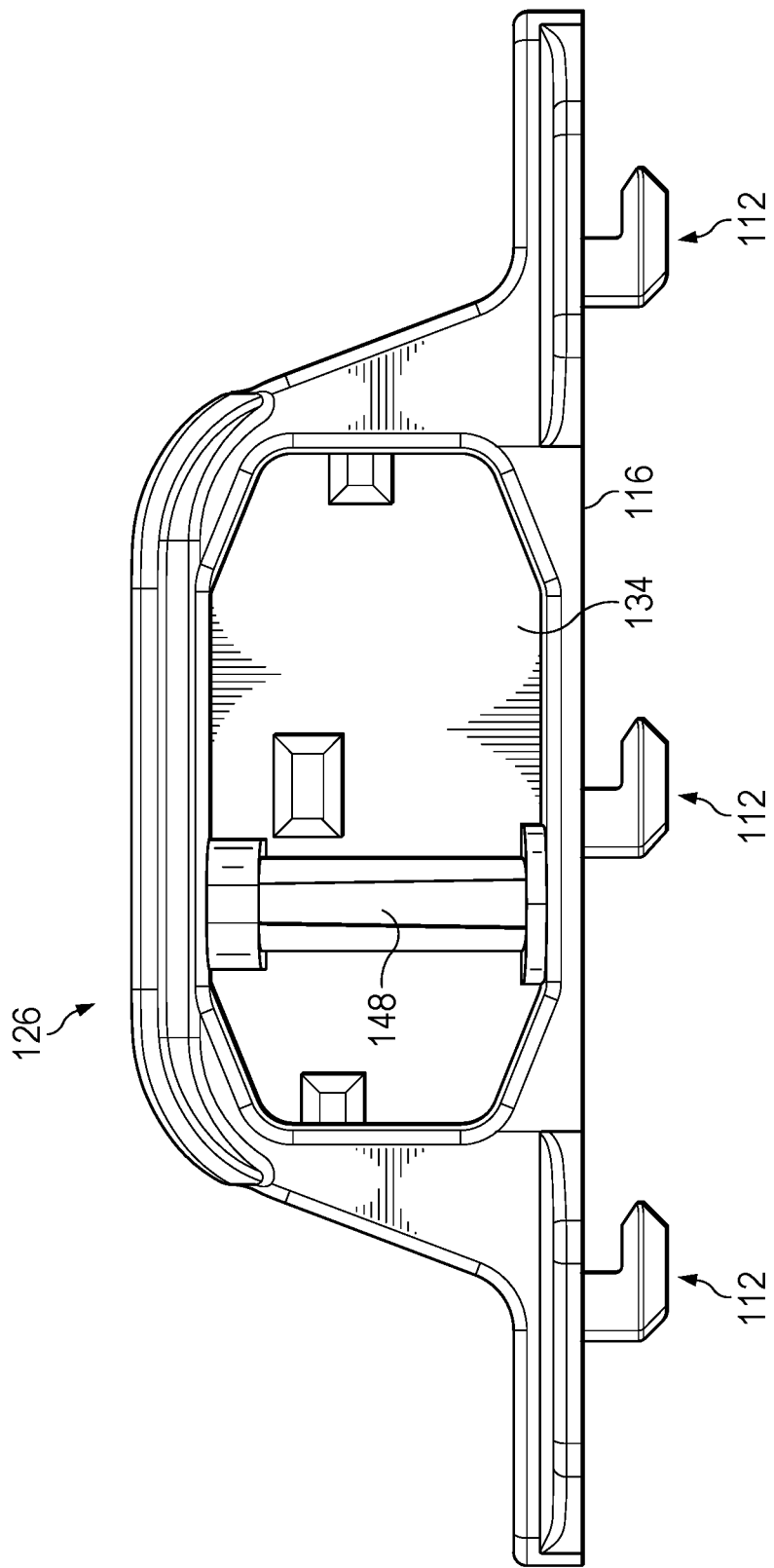
FIG. 30 is a front view of the connector housing according to some embodiments.

As shown in FIGS. 21-23, a pair of saddle bags accessories may include saddle bag mounting plates 166 attached to each other by a bracket 168 that is secured to the mounting brackets 122 by the connectors 110. As shown in FIG. 24, the mounting bracket 122 defines a ridge 184 near a distal edge of the mounting bracket 122. As shown in FIG. 26, the saddle bag mounting plates 166 each define an opening 186. As shown in FIGS. 27 and 28, the saddle bag mounting plates 166 may be positioned on top of an outer perimeter of the mounting bracket 122 with the ridge 184 of the mounting bracket 122 received in the opening 186. The connector 110 includes one or more ridges 111 that extend outward therefrom that may be positioned on top of the saddle bag mounting plates 166 to sandwich the mounting plates 166 between the connector 110 and the mounting bracket 122, thereby securing the pair of saddle bags accessories to the vehicle 106. In some embodiments, the connector 110 may include a first accessory mounting feature (i.e., the mounting holes 182 configured to secure a first accessory) extending from the housing 126 and a second accessory mounting feature (i.e., the ridges 111 configured to secure the saddle bag) extending from the housing 126. The bracket 168 may interconnect the saddle bag mounting plates 166 using a rigid frame 170 as shown in FIG. 21 or a flexible strap 172 as shown in FIGS. 22 and 23, either of which may be inserted through an opening defined in the bracket 168 for receiving the frame 170 or the strap 172. In some embodiments, a bottom surface 177 of the accessory 102 may include a channel 175 to house the flexible strap 172, the mounting plates 166, and/or the mounting bracket 168 (see e.g., FIG. 52D). The bottom surface 177 may include a second channel 179 configured to fit over a central ridge 181 on the tunnel 104. In some embodiments, the central ridge 181 may include electrical wiring (see e.g., FIG. 53).

FIGS. 46-51 show a second example of an accessory attachment system having a mounting bracket 202 attached to a vehicle 106, such as a snowmobile, and a connector 204 attached to an accessory 102 secured to the vehicle 106. The mounting bracket 202 defines a pair of generally cylindrical posts 206 having convex sides 208. The connector 204 defines a pair of cavities 210 that are generally cylindrical having concave sides 212. The cavities 210 are defined within a bar 214 having a slot 216 that extends between and into each of the cavities 210. A lever 218 is attached to a mesial portion of the bar 214 on one side of the slot 216 by a pin 220 and has an eccentric cam end 222 in contact with the bar 214 on an opposite side of the slot 216. As the lever 218 is moved from an open position to a closed position, the cam end 222 presses against the bar 214 and narrows this distance between the sides of the slot 216. This narrowing of the slot 216 then reduces the circumference of the cavities 210, thereby tightening the concave sides 212 of the cavities 210 against the convex sides 208 of the posts 206 and securing the connector 204 to the mounting bracket 202.

Figure 52A:
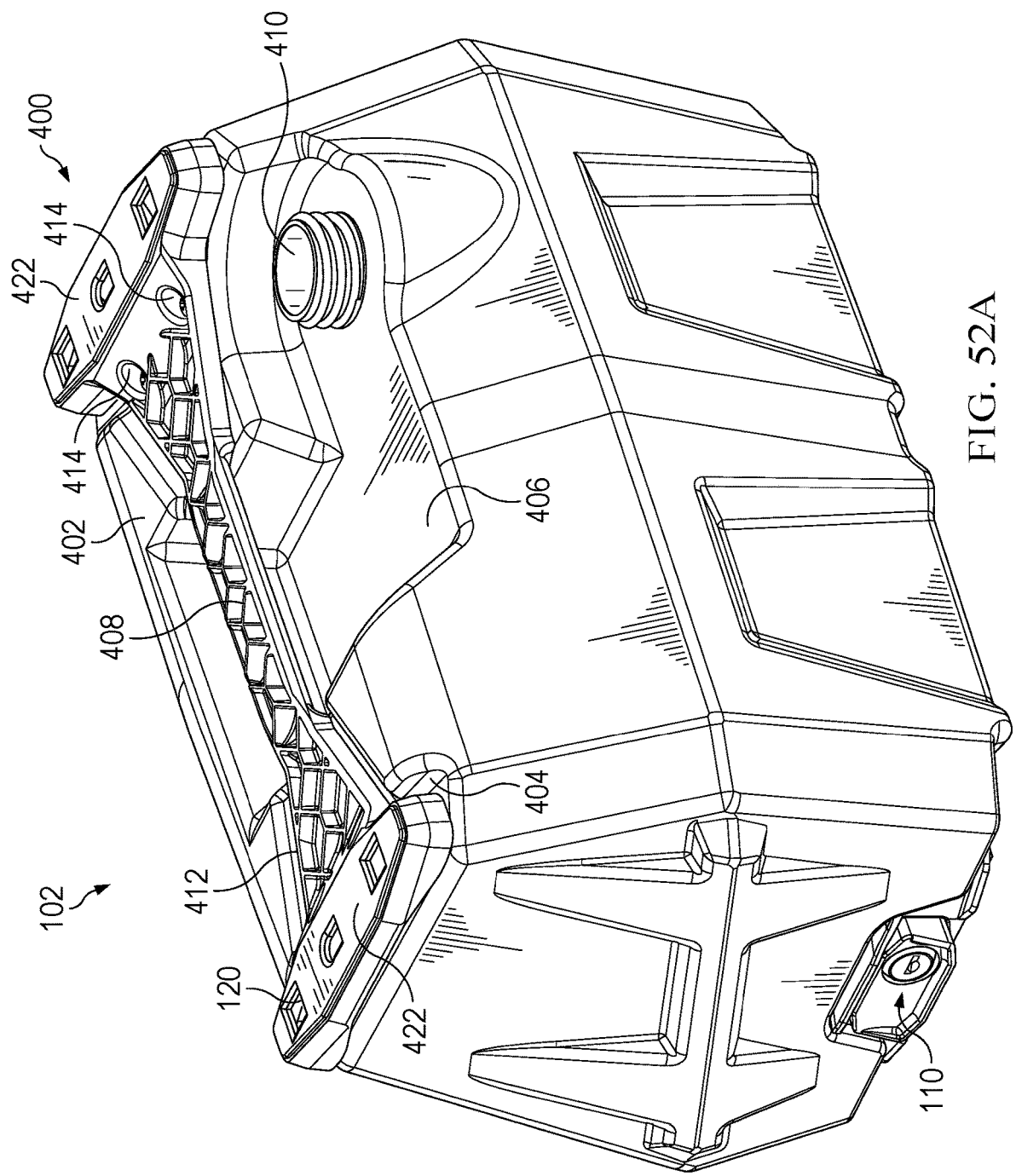
FIG. 52A is an isometric view of an accessory including a mounting plate, according to some embodiments.
Figure 52B:
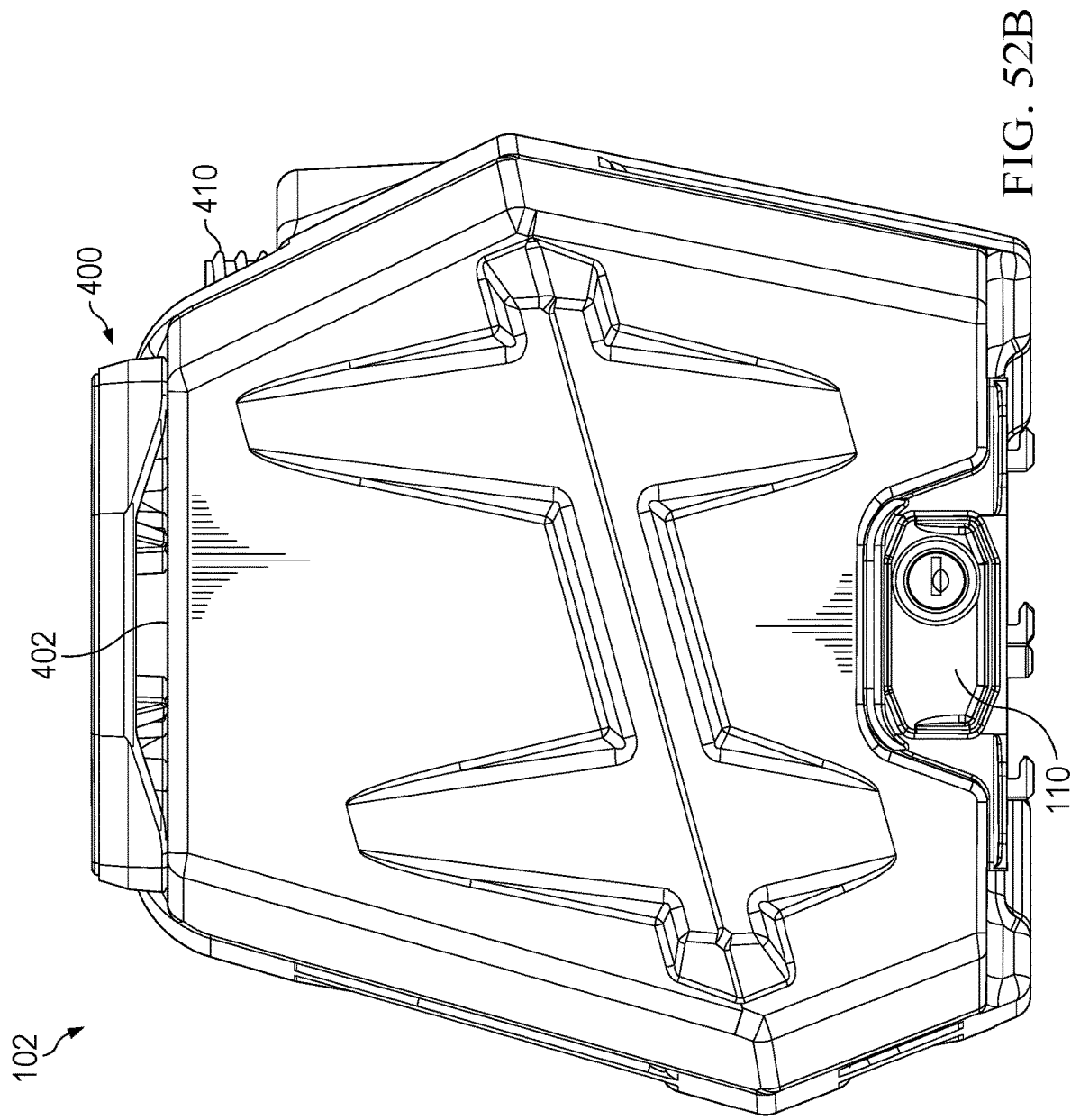
FIG. 52B is a side view of an accessory including a mounting plate, according to some embodiments.
Figure 52C:
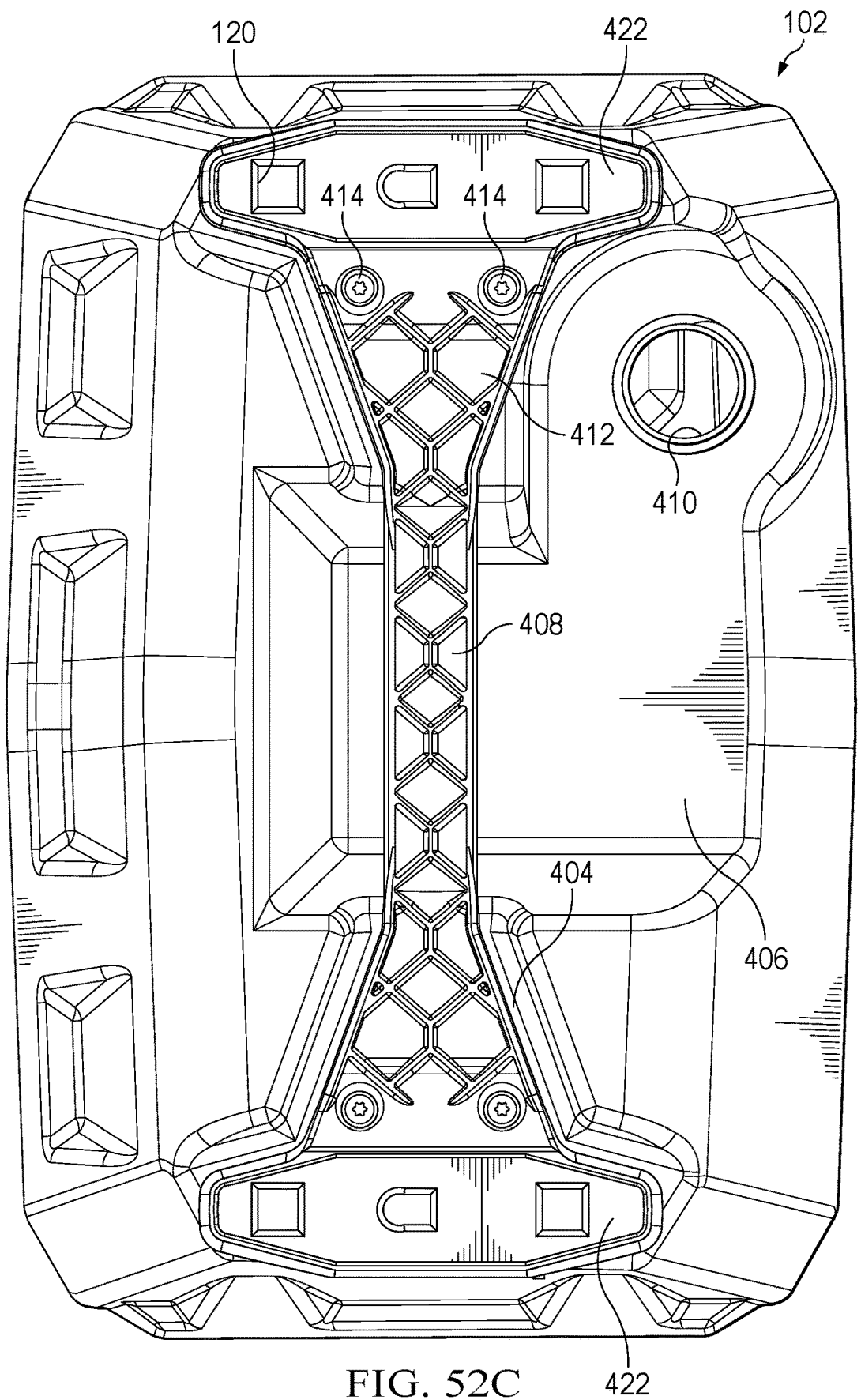
FIG. 52C is a top view of an accessory including a mounting plate, according to some embodiments.
Figure 52D:
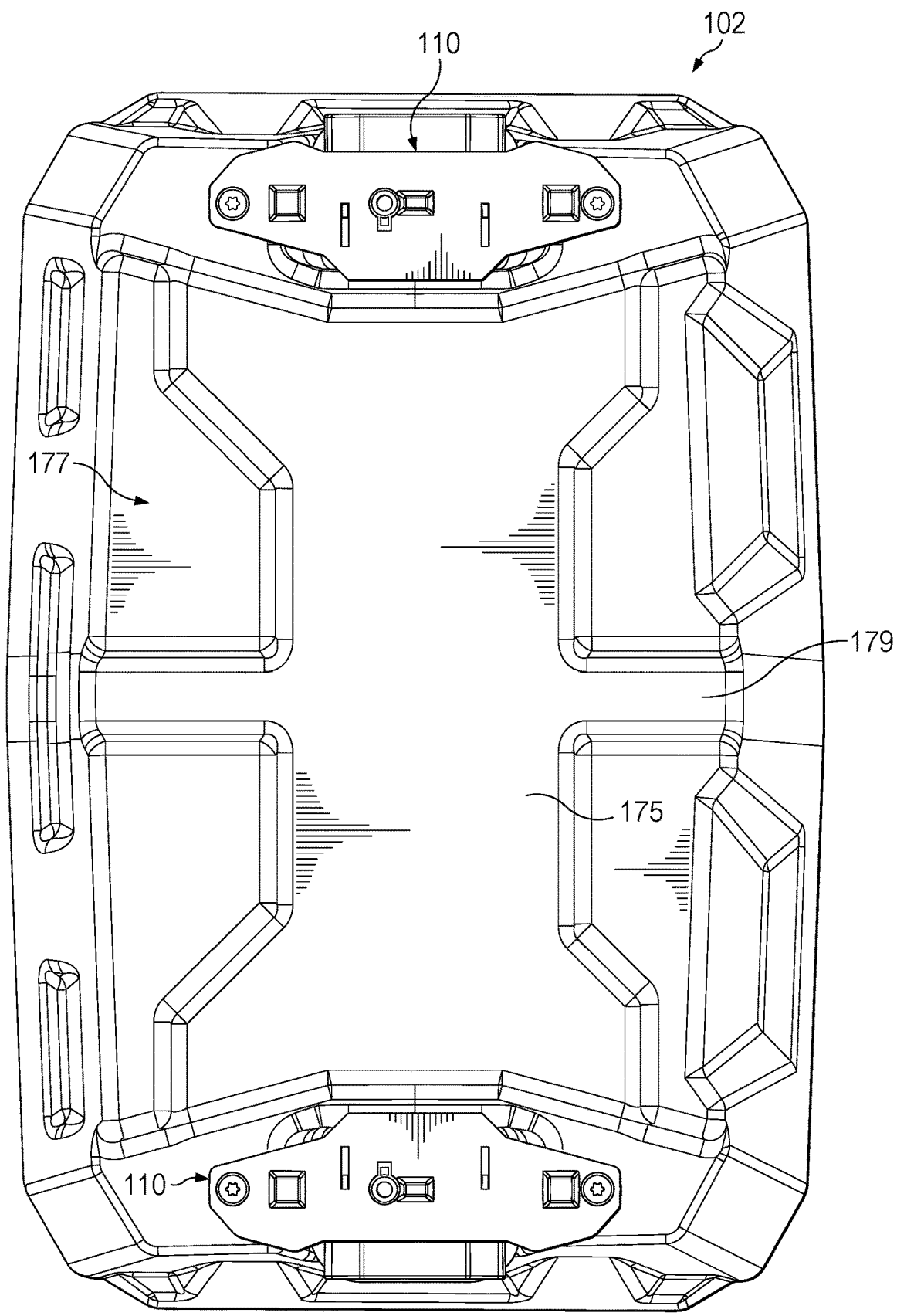
FIG. 52D is a bottom view of an accessory including a mounting plate, according to some embodiments.

As illustrated in FIGS. 52A-54B, in some embodiments the accessory 102 may include a top surface 402 configured to secure a mounting plate 400. The mounting plate 400 may include one or more mounting bracket portions 422 configured to secure to the connector 110, thereby attaching an additional accessory 450 to the accessory 102 (see e.g., FIG. 53). The accessory 102 and the additional accessory 450 may each be recessed along the sides near the bottom to define a chamber that receives the connector 110. As shown in FIGS. 52A, 52B and 52D, the connector housing 126 spans the chamber, and removable and reusable fasteners are inserted through the mounting holes 182 and into the bottom surface of the accessory 102 to retain the connector 110 in the chamber. Accordingly, the connector 110 and the release actuator 132 may be at least partially shielded by the sidewalls of the accessory 102 and/or the additional accessory 450. As shown in FIGS. 52B and 52D, the end portions of the underside of the accessory 102 and/or the additional accessory 450 adjacent to the mounting holes 182 of the connector housing 126 may be vertically offset from the bottom to receive the mounting bracket 122 and/or the bracket 168.

In some embodiments, the handle portion 408 may be offset from the mounting bracket portion 422 by a vertical distance equal to the vertical distance between the tunnel 104 and the mounting bracket 122. In some embodiments, the respective mounting bracket portions 422 may be separated from each other by a horizontal distance equal to the horizontal distance between the respective mounting brackets 122 disposed on the tunnel 104. In other words, the mounting plate 400 may be configured to have the same geometric proportions as the mounting brackets 122 secured to the tunnel 104 to allow the additional accessory 450 to be stacked on the accessory or secured to the mounting brackets 122 disposed on the tunnel 104.

Each of the one or more mounting bracket portions 422 may include a mounting bracket 122 as described in this disclosure (e.g., the mounting bracket 122 shown in FIG. 4). The mounting bracket portion 422 may include one or more apertures 120 configured to receive a post portion 114, a connecting pin 112, and/or a locking pin 124 of the connector 110. The one or more mounting bracket portions 422 may be adjoined via a base member 412. The mounting plate 400, including the one or more mounting bracket portions 422, a handle 408, and the base member 412, may be formed of a single body, i.e., a single extrusion, mold, cast, etc. The mounting plate 400 may be secured to the top surface of the accessory via one or more attachment points 414. In some embodiments, the one or more attachment points 414 are disposed on the base member 412 adjacent to the one or more mounting bracket portions 422. The handle portion 408 may be positioned lower than the upper surface of the mounting bracket portions 422 to provide clearance between the handle portion 408 and the underside of the additional accessory 450 positioned on the accessory 102.

The top surface 402 of the accessory 102 may include a recess 404 to receive the mounting plate 400 therein. The recess 404 receives the handle portion 408 of the mounting plate 400. Accordingly, the handle portion 408 may not project beyond the top surface 402 of the accessory 102, to avoid interference with the bottom of any accessories stacked on the accessory 102. A channel 406 is defined in the top surface 402 that extends along both sides of the handle portion 408 to provide access to grip the handle portion 408. In some embodiments, a fuel inlet port 410 may be positioned on the top surface 402 such that a substantially flat plane is formed. For instance, the fuel inlet port 410, and a cap threadingly engaged therewith, may be disposed in the channel 406, such that the top end of the fuel inlet port (or the cap secured thereto) does not extend above the top surface 402, and optionally is positioned lower than the underside of the handle portion 408. Positioning of the fuel inlet port 410 in the channel 406 allows the fuel inlet port 410 to be positioned on the upper side of the accessory (as opposed to a side wall), while still allowing for an additional accessory feature to be attached on the top surface 402 of the accessory 102. Positioning the fuel inlet port 410 on the top surface of the channel 406 may provide enhanced protection to the fuel inlet port 410, as the fuel inlet port 410 is guarded from external abrasions, scuffs, or other impact forces.

Figure 53:
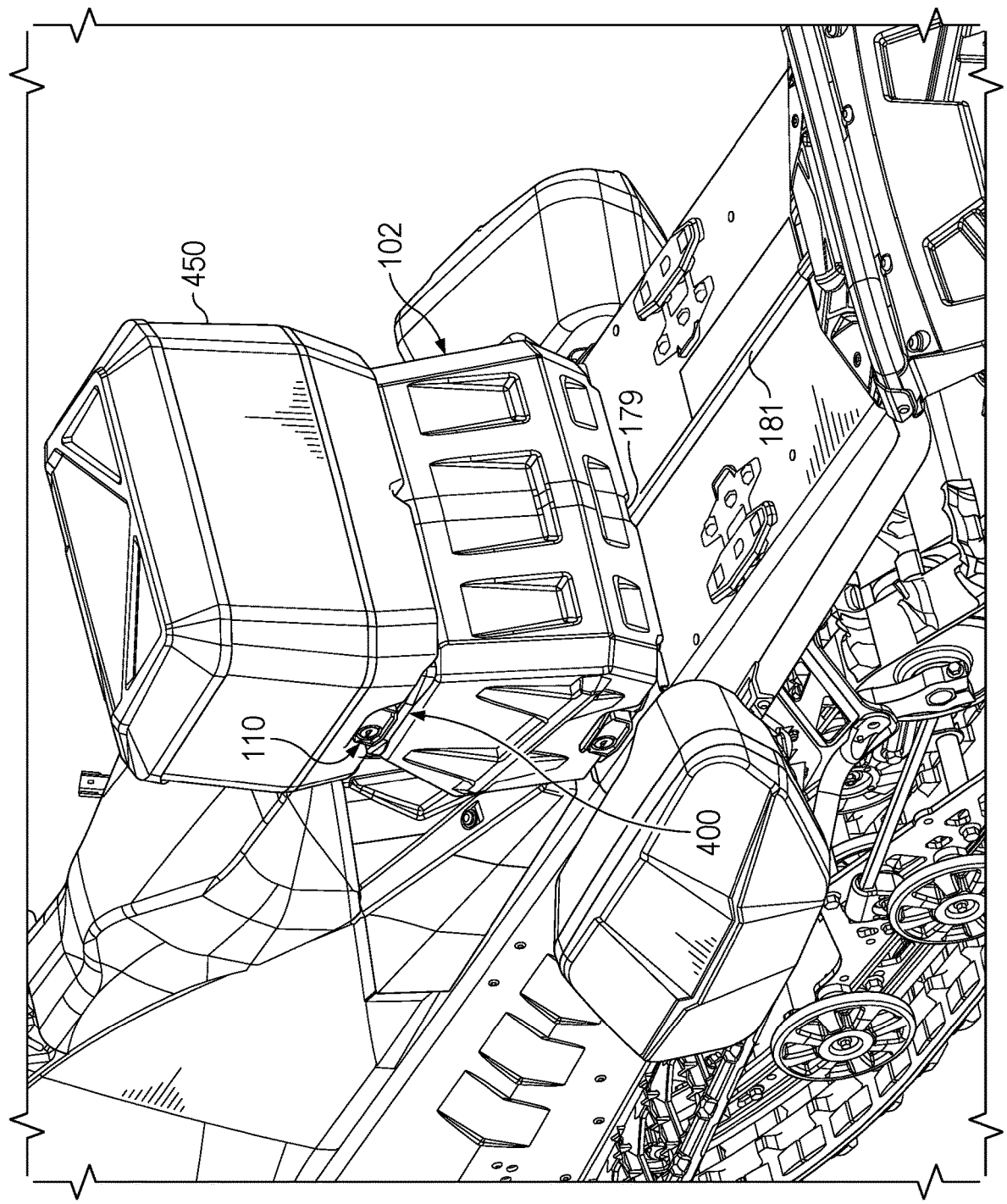
FIG. 53 is an isometric view of an accessory including a mounting plate with an additional accessory mounting on a top surface of the accessory, according to some embodiments.
Figure 54A:
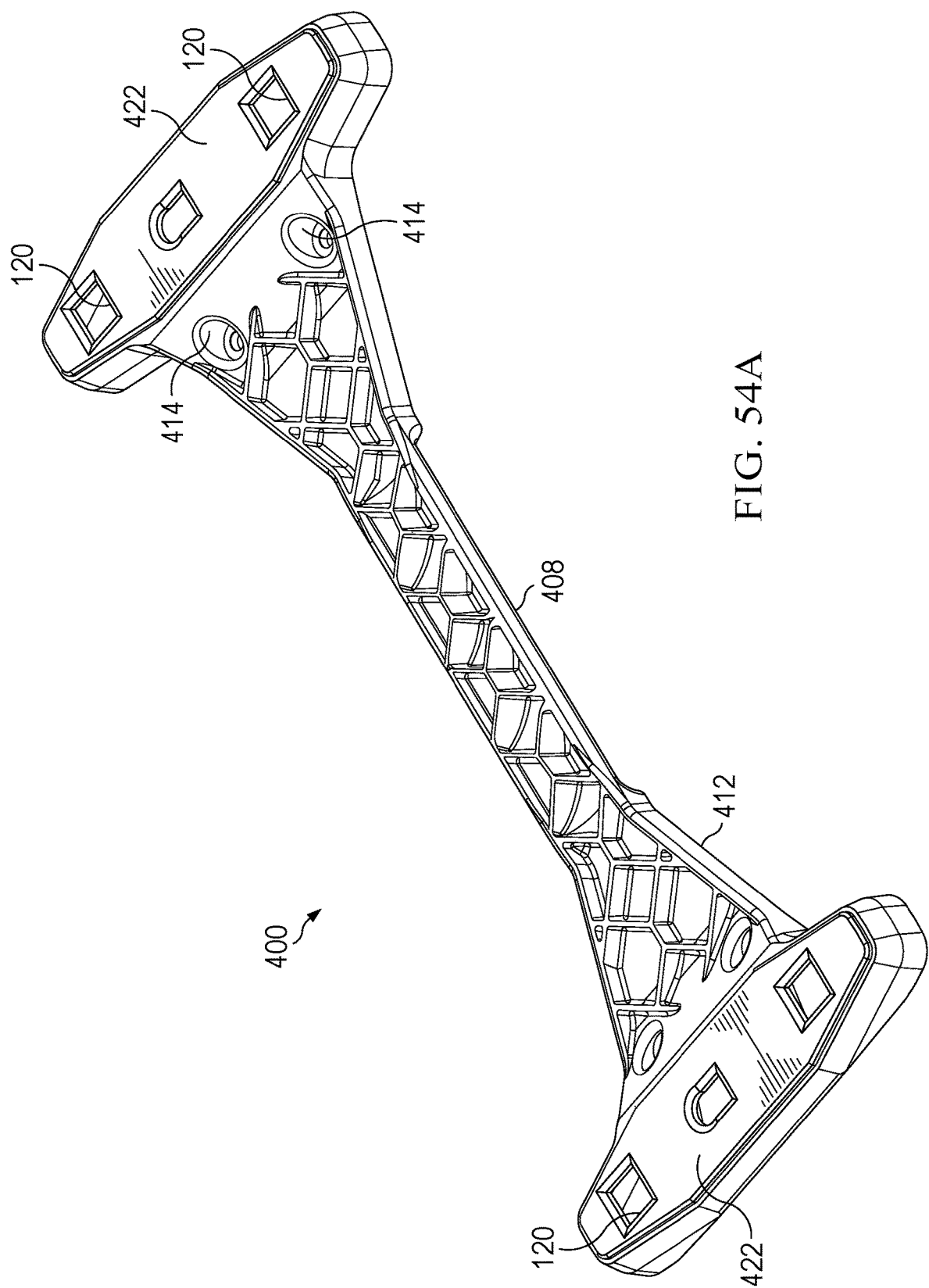
FIG. 54A is an isometric view of a mounting plate, according to some embodiments.
Figure 54B:
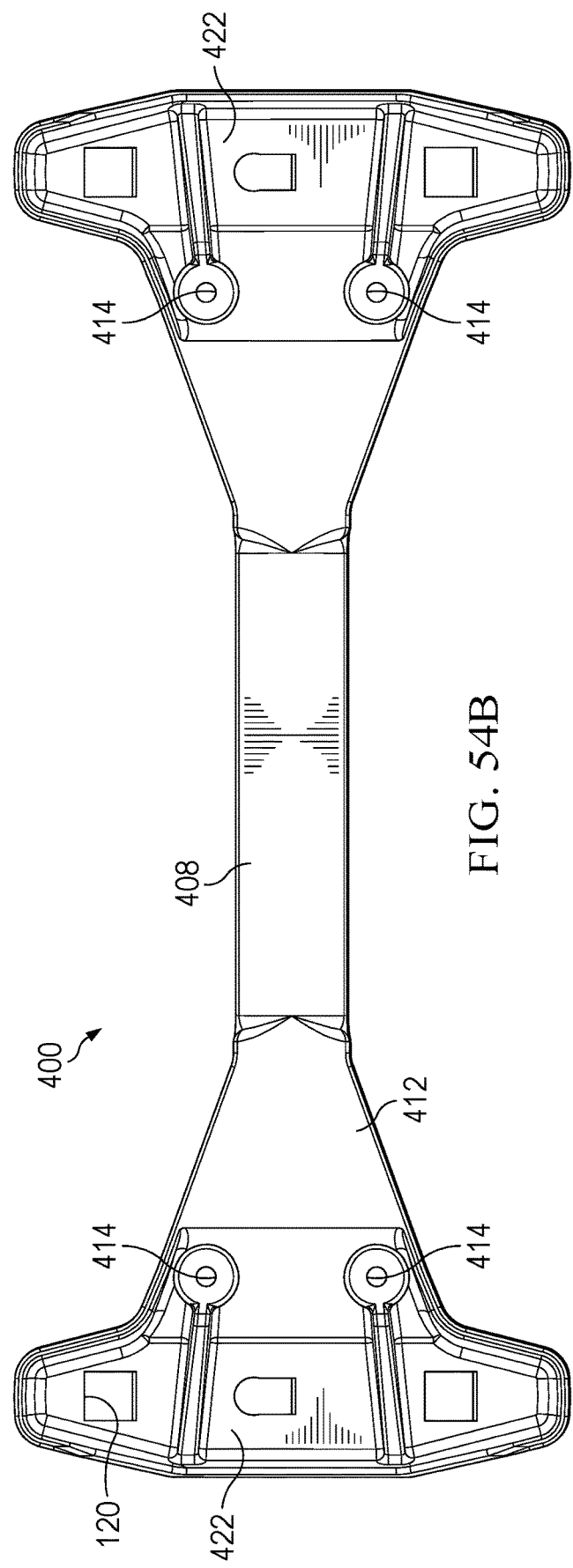
FIG. 54B is a bottom view of a mounting plate, according to some embodiments.

For instance, FIG. 53 illustrates an exemplary embodiment of an additional accessory 450 mounted onto the mounting plate 400 of the accessory 102. The additional accessory 450 may include a fuel tank, a dry storage compartment, a cooler, a seat feature, etc. The additional accessory 450 may include the connector 110 disposed on a bottom surface of the additional accessory 450. In some embodiments, the additional accessory may be configured to secure to the mounting bracket 122 disposed on the tunnel 104 of the vehicle 106 and may be configured to be secured to the mounting bracket portion 422 of the mounting plate 400 disposed on the top surface 402 of the accessory 102. In other words, the additional accessory feature 450 may be used alone and used with the accessory feature 102. Thus, the rider may customize the configuration of accessory(s) used on the vehicle 106.

As illustrated in FIG. 55, in some embodiments an accessory 502 may be secured to four connectors 110. For instance, a pair of front connectors and a pair of rear connectors as illustrated in FIG. 5 may be secured to the accessory 502.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A fuel tank assembly for a vehicle, the fuel tank assembly comprising:
   a fuel tank including:
      a mounting surface located on the fuel tank, and
      a fuel inlet port disposed on the fuel tank;
   a connector removably securing the fuel tank to a frame of a vehicle; and
   a mounting plate secured to the mounting surface of the fuel tank, the mounting plate including a first mounting bracket having one or more apertures,
   wherein an accessory is removably securable to the mounting plate,
   wherein the mounting surface on the fuel tank includes a recess to partially receive the mounting plate therein.

2. The fuel tank assembly of claim 1, wherein a connecting pin of the accessory is received within the one or more apertures of the first mounting bracket to removable secure the accessory to the mounting plate.

3. The fuel tank assembly of claim 1, wherein the mounting plate includes:
   a second mounting bracket having one or more second apertures,
   a base member having one or more attachment points configured to secure the mounting plate to the mounting surface, and a handle disposed between the first mounting bracket and the second mounting bracket.

4. The fuel tank assembly of claim 3, wherein the mounting surface includes:
a channel aligned with the handle of the mounting plate, and
wherein the fuel inlet port is positioned on the recess of the mounting surface.

5. The fuel tank assembly of claim 4, wherein the first mounting bracket and the second mounting bracket form a mounting plane therebetween, wherein the handle, the base member, and the mounting surface are positioned entirely below the mounting plane.

6. The fuel tank assembly of claim 5, wherein the mounting plane is approximately parallel to a ground plane of the vehicle.

7. The fuel tank assembly of claim 1, wherein the connector is disposed on a bottom surface of the fuel tank, wherein the bottom surface of the fuel tank is approximately parallel to the mounting surface of the fuel tank.

8. A stackable fuel tank system for a vehicle, the system comprising:
a fuel tank including:
a fuel inlet port,
a mounting surface disposed on the fuel tank, and
a bottom surface;
a connector secured to the bottom surface of the fuel tank, wherein the connector is securable to a frame of a vehicle;
a mounting plate secured to the mounting surface of the fuel tank, the mounting plate including a mounting bracket having one or more apertures; and
an accessory stackable on the fuel tank and removably secured to the fuel tank,
wherein the fuel inlet port is positioned on the mounting surface and entirely below the mounting plate.

9. The system of claim 8, further comprising a bracket secured to the frame of the vehicle, the bracket including a bracket aperture, wherein the connector includes:
a locking pin vertically movable from a locking position to a release position, and
a pin configured to extend into the bracket aperture in the locking position.

10. The system of claim 8, wherein the mounting plate includes:
a base member having one or more attachment points configured to secure the mounting plate to the mounting surface, and
a handle.

11. The system of claim 10, wherein the mounting surface includes a channel positioned underneath the handle to provide access to grip the handle.

12. The system of claim 11, wherein the fuel inlet port is positioned in the channel and positioned lower than an underside of the handle.

13. The system of claim 8, wherein the accessory includes a second connector including:
a second locking pin vertically movable from a second locking position to a second release position, and
a second pin configured to extend into the aperture of the mounting bracket in the second locking position.

14. The system of claim 13, wherein the accessory is removably securable to the fuel tank via the second pin matingly coupled with the aperture of the mounting bracket.

15. An accessory system removably securable to a vehicle, the accessory system comprising:
a mounting plate securable to a vehicle, the mounting plate including a mounting bracket having an aperture; and
a connector secured to a first surface an accessory, the connector including:
a locking pin vertically movable from a locking position to a release position, and,
a connecting pin configured to extend into the aperture in the locking position.

16. The accessory system of claim 15, wherein the mounting plate is positioned on a fuel tank removably securable to a frame of the vehicle.

17. The accessory system of claim 15, wherein the locking pin is received within the aperture with the connecting pin when in the locking position.

18. The accessory system of claim 17, wherein the locking pin inhibits lateral movement of the connecting pin when in the locking position.

19. The accessory system of claim 18, wherein the locking pin is removed from the aperture when in the release position thereby allowing lateral movement of the connecting pin within the aperture.

* * * * *